United States Patent
Wu et al.

(10) Patent No.: US 10,721,859 B2
(45) Date of Patent: Jul. 28, 2020

(54) MONITORING AND CONTROL IMPLEMENT FOR CROP IMPROVEMENT

(71) Applicants: Dolly Y. Wu, Plano, TX (US); Timothy A. Deutsch, Newton, IA (US)

(72) Inventors: Dolly Y. Wu, Plano, TX (US); Timothy A. Deutsch, Newton, IA (US)

(73) Assignee: Dolly Y. Wu PLLC, Plano, TX (US)

( * ) Notice: Subject to any disclaimer, the term of this patent is extended or adjusted under 35 U.S.C. 154(b) by 0 days.

(21) Appl. No.: 16/258,618

(22) Filed: Jan. 27, 2019

(65) Prior Publication Data

US 2019/0150357 A1  May 23, 2019

Related U.S. Application Data

(63) Continuation-in-part of application No. 15/424,809, filed on Feb. 4, 2017, now Pat. No. 10,255,670.
(Continued)

(51) Int. Cl.
*A01C 21/00* (2006.01)
*B60R 11/04* (2006.01)
(Continued)

(52) U.S. Cl.
CPC .......... *A01C 21/007* (2013.01); *A01C 21/005* (2013.01); *B60R 11/04* (2013.01);
(Continued)

(58) Field of Classification Search
CPC .... A01C 21/007; A01C 21/005; H04N 7/188; H04N 5/2252; H04N 7/181; B60R 11/04;
(Continued)

(56) References Cited

U.S. PATENT DOCUMENTS

| 4,015,366 A | 4/1977 | Hall et al. |
| RE31,023 E | 9/1982 | Hall et al. |

(Continued)

FOREIGN PATENT DOCUMENTS

CN    201410115976    7/2014

OTHER PUBLICATIONS

Hamrita et al., Towards a robotic farming vision: Advances in sensors and controllers for agricultural system applications, Jan. 1, 1996, 1996 IEEE, 1678-1686.*

(Continued)

*Primary Examiner* — Marnie A Matt
(74) *Attorney, Agent, or Firm* — Dolly Wu

(57) ABSTRACT

An example machinery includes an automated crop management motorized vehicle having an intelligent, modularized image sensor (e.g. camera or video) system that is portable to other crop management vehicles such as a combine, planter or a tillage machine. The image sensor system includes a framework having a bank of procedures for monitoring and control of navigation, spray application, weeding, seeding, machine configuration, in real time as the machines go through a crop field throughout a crop cycle. One example implementation includes electronic circuits, with more than one set mounted on a platform that facilitates moving the setup to other agricultural machines. The framework captures, preserves and corrects the captured images for real time analysis and response, and for spray management to improve crop yield that is correlated with the machine settings and crop management practices.

20 Claims, 36 Drawing Sheets

Related U.S. Application Data

(60) Provisional application No. 62/443,784, filed on Jan. 8, 2017.

(51) Int. Cl.
*H04N 7/18* (2006.01)
*H04N 5/225* (2006.01)

(52) U.S. Cl.
CPC ........... *H04N 5/2252* (2013.01); *H04N 7/181* (2013.01); *H04N 7/188* (2013.01)

(58) Field of Classification Search
CPC ..................... G06T 7/73; G06T 7/0004; G06T 2207/30188; G06T 2207/10028; G06T 2207/10021
USPC .......................................................... 348/89
See application file for complete search history.

(56) References Cited

U.S. PATENT DOCUMENTS

| | | | |
|---|---|---|---|
| 5,118,058 A | 6/1992 | Richter | |
| 5,260,875 A | 11/1993 | Tofte | |
| 5,442,552 A | 7/1995 | Slaughter et al. | |
| 5,485,161 A * | 1/1996 | Vaughn | G08G 1/096725 342/357.31 |
| 5,763,873 A | 6/1998 | Beck | |
| 5,842,307 A | 12/1998 | May | |
| 5,974,348 A | 10/1999 | Rocks | |
| 6,009,354 A | 12/1999 | Flamme | |
| 6,336,051 B1 | 1/2002 | Pangels | |
| 7,388,662 B2 | 6/2008 | Cantin et al. | |
| D574,204 S | 8/2008 | Carnevali | |
| 7,854,108 B2 | 12/2010 | Koselka et al. | |
| 8,544,161 B2 | 10/2013 | Carnevali | |
| 9,030,549 B2 | 5/2015 | Redden | |
| 9,064,173 B2 | 6/2015 | Redden | |
| 9,213,905 B2 | 12/2015 | Lange et al. | |
| 9,288,938 B2 | 3/2016 | Cavender-Bares | |
| 9,511,958 B2 | 12/2016 | Bonefas | |
| 9,532,499 B2 | 1/2017 | Anderson et al. | |
| 9,658,201 B2 | 5/2017 | Redden et al. | |
| 9,740,208 B2 | 8/2017 | Sugumaran et al. | |
| 9,769,974 B2 | 9/2017 | Cross et al. | |
| 10,255,670 B1 * | 4/2019 | Wu | H04N 5/2252 |
| 2002/0176571 A1 | 11/2002 | Louh | |
| 2009/0099737 A1 | 4/2009 | Wendte et al. | |
| 2013/0211675 A1 | 8/2013 | Bonefas | |
| 2013/0235183 A1 | 9/2013 | Redden | |
| 2013/0238201 A1 | 9/2013 | Redden | |
| 2013/0325242 A1 * | 12/2013 | Cavender-Bares | A01C 21/002 701/25 |
| 2014/0048297 A1 | 2/2014 | Bassett | |
| 2014/0124227 A1 | 5/2014 | Sauder | |
| 2014/0180549 A1 | 6/2014 | Siemens et al. | |
| 2014/0230391 A1 | 8/2014 | Hendrickson et al. | |
| 2014/0277959 A1 | 9/2014 | Wagers | |
| 2015/0015697 A1 | 1/2015 | Redden et al. | |
| 2015/0027040 A1 | 1/2015 | Redden | |
| 2015/0027041 A1 | 1/2015 | Redden | |
| 2015/0027043 A1 | 1/2015 | Redden | |
| 2015/0027044 A1 | 1/2015 | Redden | |
| 2015/0245554 A1 | 9/2015 | Redden | |
| 2016/0084813 A1 | 3/2016 | Anderson et al. | |
| 2016/0084987 A1 | 3/2016 | Anderson et al. | |
| 2016/0157414 A1 | 6/2016 | Ackerman et al. | |
| 2016/0175869 A1 | 6/2016 | Sullivan | |
| 2016/0255778 A1 | 9/2016 | Redden et al. | |
| 2016/0338267 A1 | 11/2016 | Anderson et al. | |
| 2016/0368011 A1 | 12/2016 | Wu | |
| 2017/0206415 A1 | 7/2017 | Redden | |
| 2017/0219711 A1 | 8/2017 | Redden et al. | |
| 2017/0357267 A1 * | 12/2017 | Foster | A01B 79/005 |
| 2018/0108123 A1 | 4/2018 | Bauer | |
| 2020/0029490 A1 * | 1/2020 | Bertucci | A01B 69/008 |

OTHER PUBLICATIONS

Xuewen Wu, et al. Title: A Detection Method of Weed in Wheat Field on Machine Vision. Publisher: Elsevier, www.sciencedirect.com, SciVerse ScienceDirect, Procedia Engineering 15 (2011) pp. 1998-2003, abstract only. Published on the worldwide Internet in 2011 and possibly in Nanjing China before that.

Mahbubur Rahman, et al. Title: Smartphone-based hierarchical crowdsourcing for weed identification. Publisher: Elsevier, https://www.sciencedirect.com/science/article/pii/S0168169914003226, Computers and Electronics in Agriculture. vol. 113, Apr. 2015, pp. 14-23, abstract only. Published on the worldwide Internet.

Jung-Lei Tang, et al. Title: Weed Detection using image processing under different illumination for site-specific areas spraying. Publisher, Elsevier, https://www.sciencedirect.com.science/article/pii/S0168169915003981. Available online as of Feb. 3, 2016, published in Computers and Electronics in Agriculture, vol. 122, Mar. 2016, pp. 103-111.

N. Wang, et al. Title: A real-time, embedded, weed-detection system for use in wheat fields. Publisher Elsevier, http://www.sciencedirect.com/science/article/pii/S1537511007002243, Biosystems Engineering, vol. 98, Issue 3, Nov. 2007, pp. 276-285.

James E. Hanks, et al. Title: Sensor-Controlled Hooded Sprayer for Row Crops. Publisher: Weed Technology, vol. 12, No. 2 (Apr.-Jun. 1998), pp. 308-314. Published by Weed Science Society of America, www.jstor.org/stable/3988393.

W.S. Lee, et al. Title: Robotic Weed Control System for Tomatoes. Publisher: Precision Agriculture, 1, pp. 95-113 (1999), Kluwer Academic Publishers. Netherlands. 1999.

M.S. El-Faki, et al. Title: Weed Detection Using Color Machine Vision. Publisher: American Society of Agricultural and Biological Engineers, Transactions of ASABE, vol. 43(6), pp. 1969-1978 (2000), United States, 2000.

D.W. Lamb. Title: The use of qualitative airborne multispectral imaging for managing agricultural crops—a case study in southeastern Australia. Australian Journal of Experimental Agriculture 40(5), 725-738 (2000). Australia, 2000. https://doi.org/10.1071/EA99086.

Ali Haydar Goktog, et al. Title: A Rotary-wing Unmanned Air Vehicle for Aquatic Weed Surveillance and Management. Journal of Intelligent and Robotic Systems, Jan. 2010, 57:467. Australia, but first online on Sep. 19, 2009.

R. Gerhards, et al. Title: Practical experiences with a system for site-specific weed control in arable crops using real-time image analysis and GPS-controlled patch spraying. Weed Research, vol. 46, Issue 3, Jun. 2006, pp. 185-193. Germany. http://onlinelibrary.wiley.com/doi/10.1111/j.1365-3180.2006.00504.x/full.

R. Gerhards, et al. Title: Using precision farming technology to quantify yield effects attributed to weed competition and herbicide application. Weed Research, vol. 52, Issue 1, Feb. 2012, pp. 6-15. First published, Oct. 31, 2011. Abstract/Summary. http://onlinelibrary.wiley.com/doi/10.1111/j.1365-3180.2011.00893.x/full.

Mark M. Loux, et al. Title: Weed Control Guide for Ohio, Indiana and Illinois. 2016. Available at estore.osu-extension.org.

Jason Kulk, et al. Title: AgBot II Robotic Site-specific Crop and Weed Management Tool. https://research.qut.edu.au/digital-agriculture/projects/robot-platform-design-agbot-ii-a-new-generation-tool-for-robotic-site-specific-crop-and-weed-management/ Australia, Jun. 2015.

Anthony Kachenko, et al. Robot that Detects Weeds? What a RIPPA. http://www.queenslandcountrylife.com.au/story/4100671/robot-that-detects-weeds-what-a-rippa/ (University of Sydney), online: Aug. 19, 2016.

Christian Nansen et al. Title: Optimizing pesticide spray coverage using a novel web and smartphone tool, SnapCard App. Published in Agronomy for Sustainable Development. Australia, Jul. 1, 2015, online. https://espace.library.uq.edu.au/view/UQ:364896.

(56) References Cited

OTHER PUBLICATIONS

Takahashi. Title: Growbots promise to transform Australian agriculture. Published by Nikkei Aisan Review, Apr. 28, 2016, online. https://asia.nikkei.com/Tech-Science/Tech/Growbots-promise-to-transform-Australian-agriculture.

Kallee Buchanan, et al. Title: Weed-slaying robot could save farm sector $1.3billion a year. Publisher: ABC News, Oct. 20, 2016, Australia. http://www.abc.net.au/news/rural/2016-10-21/weed-killing-robot-could-save-billions/7954680.

Lei Tian. Title: Sensor Based Precision Herbicide Application System. Publisher: Computers and Electronics in Agriculture. 36, 2-3, pp. 133-149. USA, Nov. 1, 2002. Online: https://pdfs.semanticscholar.org/845e/e5e618fce401e33b4492f77cdc21b71606c6.pdf.

L. Tian. Title: Development of a precision sprayer for site specific weed management. Publisher: Transactions of the American Society of Agricultural Engineers. pp. 893-900. Jul. 1999, USA. Online: https://experts.illinois.edu/en/publications/development-of-a-precision-sprayer-for-site-specific-weed-managem.

Chen, Y., Tian, L., Zheng, J., & Xiang, H. (2005). Direct herbicide application with an autonomous robot for weed control. In 2005 ASAE Annual International Meeting. USA. https://experts.illinois.edu/en/publications/direct-herbicide-application-with-an-autonomous-robot-for-weed-co.

Yu, N., Li, L., Schmitz, N., Tian, L. F., Greenberg, J. A., & Diers, B. W. (2016). Development of methods to improve soybean yield estimation and predict plant maturity with an unmanned aerial vehicle based platform. Remote Sensing of Environment, 187, 91-101 (2016). https://experts.illinois.edu/en/publications/development-of-methods-to-improve-soybean-yield-estimation-and-pr.

Li, L., Fan, Y., Huang, X., & Tian, L. (2016). Real-time UAV weed scout for selective weed control by adaptive robust control and machine learning algorithm. In 2016 American Society of Agricultural and Biological Engineers Annual International Meeting, ASABE 2016 American Society of Agricultural and Biological Engineers. USA. https://experts.illinois.edu/en/publications/real-time-uav-weed-scout-for-selective-weed-control-by-adaptive-r.

Ball, D., Ross, P., English, A., Patten, T., Uperoft, B., Fitch, R., Sukkarieh, S., Wyeth, G., Corke, P. (2013). Robotics for sustainable broad-acre agriculture. 9th Conference on Field and Service Robotics (FSR), Brisbane, Australia: Australian Robotics and Automation Association, pp. 1-14. Australia 2013. Online: https://eprints.qut.edu.au/69162/.

David Ball, et al. Vision-based Obstacle Detection and Navigation for an Agricultural Robot. Journal of Field Robotics, vol. 33, Issue 8, pp. 1107-1130. Dec. 1, 2016. http://onlinelibrary.wiley.com/doi/10.1002/rob.21644/fullWorldwide. Internet.

Patrick Ross, Andrew English, David Ball, Ben Upcroft, Gordon Wyeth, Peter Corke. Novelty-based Visual Obstacle Detection in Agriculture. 2014 IEEE International Conference on Robotics and Automation, pp. 1699-1705. May 31, 2014. http://ieeexplore.ieee.org/abstract/document/6907080/?reload=true Worldwide. Internet.

Supom Pongnumkul, et al. Title: Applications of Smartphone-Based Sensors in Agriculture: A Systematic Review of Research. Journal of Sensors vol. 2015 (2015), Article ID 195308, 18 pages. Online, Jul. 9, 2015. https://www.hindawi.com/journals/js/2015/195308/ Worldwide. Internet.

Stephen L. Young and Francis J. Pierce, editors. Book title: Automation: The Future of Weed Control in Cropping Systems. Springer. 2013. https://books.google.com/books/about/Automation_The_Future_of_Weed_Control_in.html?id=yQ7IBAAAQBAJ Worldwide. Internet. Worldwide. Internet.

Thorlabs, Inc. Mounting Basics Selection Guide. No publication date listed. https://www.thorlabs.com/images/Catalog/V19_02_Optomech.pdf (downloaded Nov. 5, 2016). Worldwide. Internet.

Volvo. Volvo Service Manual (Mirror). Oct. 31, 1997, available in the USA.

Adafruit. Mini Pan-Tilt Kit Assembled with Micro Servos. Product ID: 1967. https://www.adafruit.com/product/1967?gclid=CjwKEAiAyO_BBRDOgM-K8MGWpmYSJACePQ9CjrAXt7-MrNFIL-gJoAbGz1vjzdqgzmxzxgTD0xn_PRoCxBzw_wcB (accessed Nov. 28, 2016). Worldwide. Internet.

Lorex Technology. PTZ Cameras. https://www.lorextechnology.com/ptz-cameras/N-n6lzjh (accessed Nov. 28, 2016). Worldwide. Internet.

Ela Pekalska and Bob Duin. Pattern Recognition Tools. http://37steps.com/faq/gridsize/ (accessed Dec. 4, 2016). Worldwide. Internet.

Steven Fennimore, et al. Technology for Automation of Weed Control in Specialty Crops. Weed Technology 30(4), pp. 823-837. Jul. 4, 2016. Worldwide. Internet.

Huajian Liu, et al. Development of a Machine Vision System for Weed Detection During Both of Off-Season and In-Season in Broadacre No-Tillage Cropping Lands. American Journal of Agricultural and Biological Sciences 9 (2): 174-193, 2014. USA. (Published Online 9 (2) 2014 (http://www.thescipub.com/ajabs.toc; doi:10.3844/ajabssp.2014.174.193 Worldwide. Internet.

National Products Inc., RAM Mounts Marine. Copyright May 2017. USA. https://www.rammount.com/ (Accessed Apr. 1, 2018).

Katherine Maitland. Selective spray units help war on weeds. Spring 2012. USA. The Cutting Edge publication. Weedit (spot spraying using sensor detection of chlorophyll). Also see Youtube upload Jun. 2, 2015. https://www.youtube.com/watch?v=fjSg0vl5NiE.

Trimble Navigation Ltd. WeedSeeker System Datasheet. Copyright 2010-2013. USA. Also see: NTechIndustries, WeedSeeker (optical sensing). Youtube upload Sep. 15, 2010. https://www.youtube.com/watch?v=C9iqxZuZOqc.

Supom Pongnumkul, et al. Jul. 2015 Egypt (on the Internet in the U.S.) Journal of Sensors, vol. 2015, Article ID 195308. Hindawi Publishing Corp. https://www.hindawi.com/journals/js/2015/195308/.

Abdellah. 2015. A feasibility study of direct injection spraying technology for small scale farming.

Ronneberger, O., et al. 2015. U-net: Convolutional networks for biomedical image segmentation. International Conference on Medical image computing and computer-assisted intervention, 234-241 (Springer).

Mendez-Aponte, P., et al. 2016. Software and hardware architecture in cooperative areal and ground robots for agricultural disease detection, 2016 IEEE International Conference on Collaboration Technologies and Systems.

Stamenkovic, Z., et al. 2016. Advanced wireless sensor nodes and networks for agricultural applications. 24th Telecommunications Forum TELFOR 2016. IEEE.

Aissaoui, Abdellah. 2015. Doctoral Thesis: A feasibility study of direct injection spraying technology for small scale farming: modeling and design of a process control system. French Community of Belgium. University of Liege-Gembloux Agro Bio Tech.

Bah, M. Dian., et al. 2018. (on the Internet). Deep Learning with unsupervised data labeling for weeds detection on UAV images. https://arxiv.org/pdf/1805.12395.pdf.

* cited by examiner

MONITORING AND CONTROL IMPLEMENT FOR CROP IMPROVEMENT

PRIOR APPLICATIONS

This application is a continuation-in-part of U.S. patent application Ser. No. 15/424,809, titled Image Sensor and Module Useful for Agricultural Crops and filed on Feb. 4, 2017, which claims the benefit of U.S. Provisional Application No. 62/443,784, titled Monitoring and Control System for Crop Management and filed on Jan. 8, 2017.

FIELD OF THE DISCLOSURE

Equipment and system for improving, monitoring, managing, and determining the yield of agricultural fields by using sensing devices and controlling agricultural vehicles throughout a crop cycle.

BACKGROUND OF THE DISCLOSURE

An agricultural cycle relates to the cyclic activities from the growth of to the harvest of crops such as wheat, corn, soybeans, rice, vegetables, and fruits. The activities include preparing the soil, removing weeds and plant residue and rocks, seeding, irrigating, fertilizing, moving plants when they grow bigger, killing bugs and fungus, wind-rowing, harvesting, baling, combining, storing, and other tasks. For example, large tillage cultivators turn the soil and prepare a seedbed. Sprayers apply nutrients, herbicides, and chemicals sometimes before planting or before plant leaves emerge (pre-emergence), and sometimes after the plant leaves emerge (post-emergence). Planters deposit seeds at measured intervals in rows that are spaced 20 to 30 inches apart. Combines gather crops and extract kernels. These agricultural, crop management machines are typically operated for many hours at a time, sometimes even into the night. The terrain may be uneven; there may be obstacles or soggy ground; there may be too much residue; the noxious spray drifts; there are weeds, fungus, insects, water shortage, and other problems. For the past thousand, individual methods and products exist to individually address some of these various problems. Then for the past fifty years when the computer became ubiquitous, there has been a push to analyze Big Data, but without improvements towards and calibration of the small data collection. There have also been problems related to managing large farms and fields and crop yield improvement.

SUMMARY OF THE DISCLOSURE

Embodiments include a portable imaging and sensing system that includes a decentralized framework for an organic, intelligent sensors system (e.g. cameras, CMOS image sensors or integrated circuit chips, solid state LiDAR integrated circuit sensors). The framework supports a bank of methods to feed, spray and manage crops and to detect crop and vegetable yield and field problems. Fine resolution, per row and per plant feeding, monitoring, control, correlation analysis is performed to determine best practices to improve crop yield, preserve the land, save water, and reduce the use of harmful chemicals in each crop field area.

An example embodiment of an autonomous agricultural vehicle includes the image sensing elements and local electronic circuit processors with memory to store and exercise specific targeted methods, prioritize the targeted methods and exercise procedures such as calibration, monitoring or on-the-go actions (e.g. project particular spray pattern and pressure).

BRIEF DESCRIPTION OF THE DRAWINGS

The detailed description refers to the following example figures.

FIG. 6 depicts an example method of using the images captured along a crop row to look for anomalous patterns among the plants based on location, height, mass and so on.

FIG. 14 depicts another example method of image capture using sensor units socketed to a mounting apparatus that is attached to a draper header. Socketing includes screw threads, a port to lock into, clamp, electrical "outlet," and so on.

FIG. 22 depicts another example sensor unit having one-sided sensors mounted on a single support plate all sheltered in an enclosure. A cutaway side view and a top view of the sensor unit are depicted. In FIG. 22, the protective enclosure supports only one side of the support plate. In other embodiments, the enclosure has other shapes (e.g. box-like, tubular, binocular).

DETAILED DESCRIPTION

Figure 1:
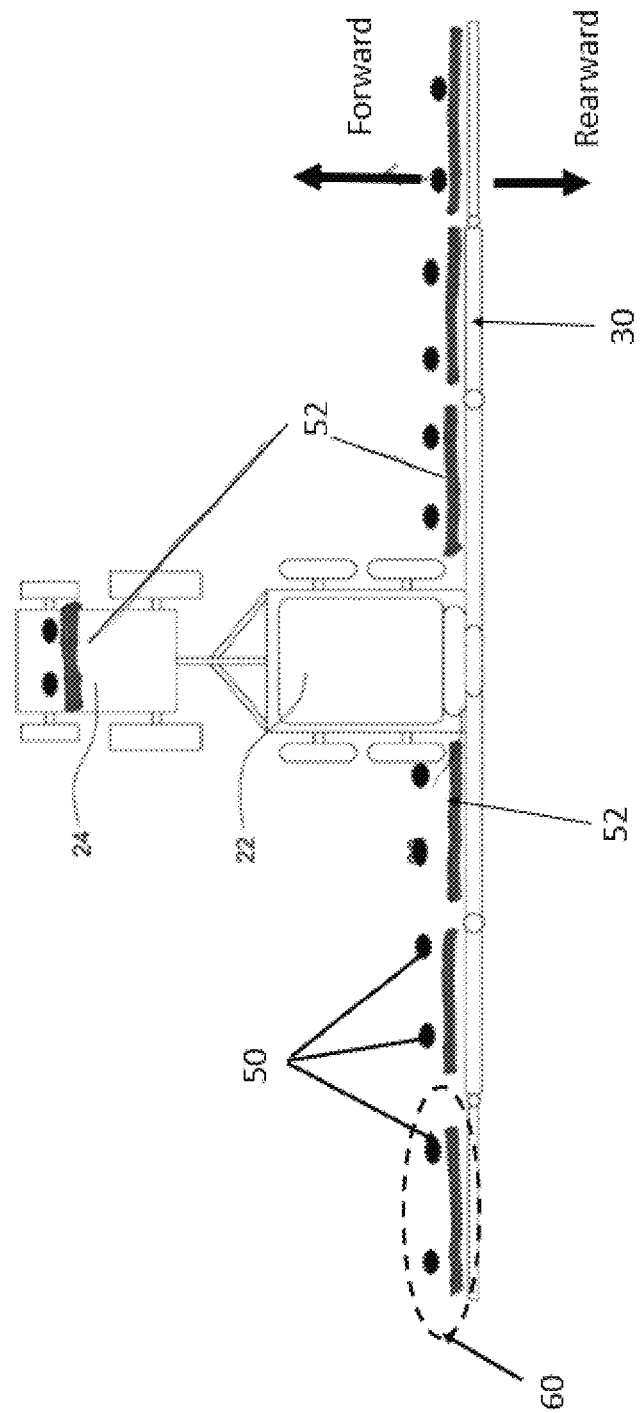
FIG. 1 depicts an example agricultural vehicle towing a fluid tank carrying an articulated spray boom having example image sensor units.

This disclosure relates to an organic, portable guidance and monitoring system framework and devices that can be mounted on agricultural vehicles (e.g. planters, spray tractors, tillage tractors, windrowers, combines, vegetable harvester) to control and exercise a suite of crop management practices by using a portable set of imaging devices (e.g. imaging devices, cameras, CMOS image sensors, solid state LiDAR sensing chips) rather than individual products on each agricultural vehicle as they have been traditionally done. High resolution data for the individual plants or individual crop rows, including unbiased data is sampled and processed either in real time to cause the agricultural vehicles to take action, or the data is uploaded to remote locations for offline analysis. By using the same image sensors to track the individual plants and crop row over a crop cycle or farming years, or even across different farms each year, crop growers have a cost-effective monitoring and control system that generates correlated or readily-correlated data with improved resolution (e.g. individual plant or crop row level, quality small data), which is good for big data analysis to obtain best practices to improve crop yield, to predict future crop results, reduce costs, enhance soil and water conservation, reduce the dependency on cancerous or deadly herbicides/fungicides, enable more automation and so on. Image data collected from different example applications or Master Applications that are described below, are correlated with the crop yield.

Other than for big data analysis and improving farming practices and improving the land, there are also immediate benefits to the crops and farmers. For example, instead of spending $100K (USD) on a weed detection system, the system framework includes weed detection along with other methods in the bank of procedures. During herbicide spraying the portable framework is mounted to the spray machine. But during seeding, the devices in the portable framework are moved and attached to the planter vehicle to exercise another procedure such as residue detection or depth control for seed placement. Advantages include the farmer or operator getting much better return on an investment of $100K, and without having to learn to use yet another equipment. Further, by using the same devices, the measurements are easier to correlate from plant to plant and field location to location as the plant grows, matures and is harvested. For example, electronic offsets or properties unique to a device are better calibrated out (e.g. pixel defects, light exposure, color) as the devices follow and track the same crop rows or plants throughout the crop cycle from the initial crop field/soil preparation, tillage, spraying, seeding, watering, growing, checking for insects, etc., all the way through harvesting of the crops, then residue management.

Example physical embodiments of the real time crop management system includes intelligent local image sensor units 50 (sometimes referred to as camera units, smartphone units, small tablets, PDAs, image sensor units, or (sensor) units 50; the "unit" designation includes the sensor(s) and a housing and circuits; the sensors alone are referred to as 1910; two specific sensors are referred to as 1910 and 1912). An image sensor system includes multiple units 50. The image sensor units 50 are mounted to a portable platform 52 (e.g. rod 52, or attachment fixture 1952) that can be moved, relocated and transferred from among different crop management vehicles. Alternatively, if the farmer operator keeps the framework on a single machine, she can subscribe to or download only the particular set of computer instruction programs suitable for that type of machine. Example units 50 include vision or mobile device or smartphone-type electronics, each making up a local image sensor unit 50 with a co-located CPU processor(s) (e.g. ARM processing chips with RAM and ROM). In many embodiments, two or more of the local modular image sensor units 50 are grouped together at a fixed distance apart and mounted together on a common platform structure (e.g. rod 52 or more generally, referred to as attachment fixture 1952) for easy portability to another agricultural machine. The image sensor system 60 (i.e. the platform 52 together with more than one of the sensor units 50 mounted on the agricultural equipment or machine) is organic and can have any number of image sensor units 50 (e.g. several units 50 of re-purposed smartphone-type electronics on a single rod 52). A local bank of methods or procedures accompanies or is remotely coupled to each local image sensor unit 50 in the portable sensor system (e.g. like the smartphones have a CPU and other processors co-located with the cameras on the smartphones). The bank of methods or procedures includes a set of electronic-software programs or algorithms that enable an end-user to add more monitoring or targeted procedures via a portal (e.g. screen or keyboard) to each of the local image sensor units 50. For example, rather than develop an APP at a high level that goes through a host interface, a mobile device operating system is programmed directly on, say, the Android OS, Windows or the Apple iOS platforms or on advanced operating systems (e.g. Artificial Intelligence AI) or a hybrid operating system. Alternatively, the processor integrated circuit chips (e.g. the central CPU, the imaging processor, the communications processor, or an integrated version of these chips) are accessed directly and programmed via system calls or its native language or machine language. In some embodiments, the image sensor (e.g. camera) or smartphone-type electronics system 60 or the local image sensor units 50 cause a real time procedure to be executed. For example, a spray boom 30 is reconfigured to match the land topography, candidate weeds are spot sprayed with herbicide, dry fertilizer is redistributed in real time to create more even spreading, and so on. A master method prioritizes the targeted methods or exercises single procedures such as calibration, monitor or real time actions. In other embodiments, the image sensor or smartphone-type electronics system or local image sensor unit 50 is more passive and captures data in real time and sends the data to computer servers for further processing. To reduce the amount of data logged and to speed up the transport, an electronic circuit or software trigger is implemented to decide whether the data should be saved to process later on.

Embodiments include having individual intelligent image units 50 (e.g. camera or smartphone-type electronics) or image system 60 mounted on an agricultural machine or vehicle. In some embodiments, the modular image units 50 include an image sensing element that is both forward looking and rearward looking in a single unit (to obtain both front and rear views, or selectable views with different magnification or resolution). A local processor is adjacent to or part of each of the units 50; the processor includes memory to store instructions and master methods to exercise a bank of targeted methods to manage and monitor the crops. A communications transceiver and an optional accompanying light source is also part of or adjacent to each of the units 50. In some embodiments, the image sensing system includes rotatable or pivotable cameras or video devices. When 180 or 360 degree camera systems become cheaper, some of the sensor units (e.g. at the end of the spray boom) include the 180 or 360 degree cameras.

In yet other embodiments, not only are the sensor and/or image attachment fixtures 1952/platform 52 portable, but the computing device (external to but in communication with the image sensor units 50) containing or overseeing the algorithm framework banks is also portable and can plug into a larger, powerful, more centralized controller of the vehicle, where the centralized controller also manages or performs other machine tasks. For example, the computing device comprises a computerized tablet, ASIC, smaller CPU or a memory device pre-loaded with the methods ("algorithm bank"). Rather than high level APPs, lower level programs or instructions that access system functions are loaded on the image sensor units 50 or at least co-located within the housing for the sensor units 50. The instructions (e.g. subroutines or application program interface API including system calls and or actual system calls to perform system level functions) directly communicate with and exercise the operating system of the processor chips, programmed directly on, say, the Android OS, Windows Mobile, the Apple iOS platforms or a hybrid version of a mobile device OS and some other operating system. For example, the instructions access or modify the state machines to schedule and execute the different programs. As another example, instructions containing system calls to a field location manager goes to a GPS transceiver circuit or module to get the field coordinates. In particular, direct operating system level or chip level access to the imaging and camera or video processors or modules help to gain more control the color or lighting intensities, the granularity or grouping of the pixels for an image capture, and so on—if the APIs for an Android OS, Windows or Apple iOS do not provide sufficient control to the lower level chip circuit and sensor capabilities.

In some embodiments, the tablets, smaller CPU or memory device are portable and plugged into a central computer (e.g. cab controllers with Intel or AMD processors) in the cab of the vehicle of one agricultural machine (e.g. soil tiller), then unplugged and moved to a planter machine during planting, then unplugged again and plugged into a controller for a sprayer machine during field spraying, a windrower during harvesting, and so on. A portable plug and play computing device facilitates continuity and ease of use. The programs and information remain on the computing device free of constantly needing additional downloads or uploads. Or the information/software on the portable computing device can be updated or transferred to a central computer at the end of the day or end of a field trip. Or the portable computing device can be transferred, associated with and de-associated from each image sensor unit 50 in turn in order to perform calibration or setup each image sensor unit 50.

In some embodiments, the modular sensor units 50 are mounted to a rigid attachment fixture 1952 or other mounting plate. This facilitates keeping the modular units a fixed distance from one another (e.g. to generate images suitable for stereo 3D or distance determination) or facilitates moving the attachment fixture 1952 or plate from machine to machine or to different locations on the same machine. For example, the modular units 50 are spaced at regular intervals along a stick or paddle that is sized to fit along each boom wing of an articulated spray boom or along each sectional wing of a towed planter, or the frame of a cultivator (e.g. to check mud buildup). In some embodiments, the modular units are bolted or mounted to a rotatable and telescopic or retractable attachment fixture 1952, one or more of which are mounted to the cab (e.g. side of the cab, roof, fender) of a tractor or vehicle that is moving or towing the spray tank, applicator tank, dry spreader, cultivator, seeders etc. Since the same devices have the same properties and calibration constants (e.g. color correction constants), then the same correction and adjustment travel from machine to machine through the different stages of crop growth and production. Additionally, information garnered from the previous pass through the field are stored in the memory circuits and the information can be taken into consideration to make subsequent decisions (e.g. location where the seeds were planted). As for mounting the units 50, example platforms include attachment fixtures 1952 or paddles mounted on top of the cab so as to telescope up and down vertically. Alternatively the attachment fixtures 1952 are lying horizontally on the roof of the cab so that they telescope in and out to the side or at an angle (e.g. 45 degrees). The telescoping extends the reach of the sensors 1910 so that they can detect or see the near side of the vehicle along with forward and rearward. During road or highway transport of the vehicles, the attachment fixtures 1952 or paddles are retracted and made effectively shorter so that they do not hit trees or electric wires. Each image sensing element is stereoscopic; alternatively, two or more image sensors 1910 are spaced apart (e.g. over two inches) to provide parallax or depth calculation in conjunction with calibration and a GPS system (or other location services or position triangulation or RTK) on the vehicle. Alternatively, two image sensors 1910 and 1912 (e.g. cameras) or smartphone-electronics are placed apart farther to increase the sensitivity to the depth-distance estimate. For instance one image sensor 1910 or smartphone-electronics is placed on the cab room near either side of the cab. On a spray boom, two adjacent image sensor 1910 and 1912 or smartphone-electronics can serve to estimate stereo. Spray nozzles are often spaced 15 to 30 inches apart depending on the crop row spacing; adjacent image sensor (e.g. cameras) or smartphone-electronics are placed at least as far apart. For some of the applications, images from image sensor 1910 or smartphone-electronics symmetrically on either side of the boom may be used to determine an action. In some embodiments, the attachment fixtures 1952 include power conductors and backup communication links. The attachment fixtures 1952 are plug and play and socket to each other or to a power port (or optionally to a communication port, e.g. (gigabit) Ethernet or power over Ethernet or sensor hubs or IoT gateways); the attachment fixtures 1952 are further secured to the vehicle. Because the modularized attachment fixtures 1952 are plug and play, a farmer buys a set of these and can move them from one crop management machine to another (e.g. tractor to sprayer) or even from one part of the vehicle to another. In the smallest version, a modularized attachment fixture 1952 contains only one modularized image sensor unit 50. In larger versions, a modularized attachment fixture 1952 or plate includes image sensor or smartphone-electronics units spaced apart depending on the crop-row spacing. The modular attachment fixtures 1952 may also be bolted or strapped to smaller vehicles (autonomous scout or aerial drone).

Having two or more image sensors 1910 enable a three-dimensional (3D) view of the surroundings, either vertically (e.g. a hill) or horizontally (e.g. distance determination). By affixing the sensor units 50 on attachment fixtures 1952, e.g. sticks, paddles, platforms, maintains the exact distance between pairs or multiples of sensors, which aids calibration for depth for mapping or correcting small variations among individual sensors. In addition, by affixing the sensors eases moving the attachment fixtures 1952 or paddles from one machine to another machine for re-use. If a 2D image or sensing is adequate, the information from only a single sensor or video/image sensor is analyzed. Otherwise, a single sensor unit or image sensor unit 50 alone is mounted to the attachment fixture 1952 or paddles. Alternatively, the image sensor unit 50 and other sensor (e.g. proximity sensor) are mounted together on the attachment fixture 1952 or paddle in order to perform different detection functions or to cover a fuller range of scenarios (e.g. night versus day).

Although the image sensor unit attachment fixtures 1952 can be mounted to the spray booms, in other crop management vehicles, there is no boom or long seeder units (planters). For example, for tillage, a pair of image sensor units (stereo) is mounted on top of the cab. The retraction of the image sensor unit is performed by telescoping, elevator (e.g. scissor up and down) or a foldable stick. To gain response time in the direction of motion of the vehicle, a retractable stick attachment fixture 1952 can also be used to move the image sensor or smartphone-electronics ahead of the vehicle, or a combination of upward and forward positions.

In some embodiments, the images are from videos. For example, when the vehicle is traveling, the video is constantly filming. At very specific intervals or upon a command to send images, a particular image from the video is extracted for analysis. To synchronize different image sensor (e.g. cameras), a single image from the different videos are picked off based upon a particular time stamp on the image. Images from adjacent or near adjacent image sensor units 50 are stitched together to map the terrain or crop row 12 to form a 3D image.

Master Applications

Embodiments of example state machine govern periodic tasks such as monitoring, in situ calibration, and data logging. Aside from periodic tasks, there are master tasks or applications that govern the presence of something (e.g. weed, hill, residue), or conditional tasks that are undertaken if a condition is set (e.g. to log data, operator presses start). Each master application is associated with hardware actions based at least in part on the captured image. For example, identification of weeds that triggers spray release from spray nozzles, where each nozzle is in communication with one or a few associated image sensor unit 50.

Guidance for and visual check by the operator. An operator in the vehicle cab selects or gets automated feeds and visually sees images from particular image sensor (e.g. cameras) or smartphone-electronics attachment fixtures. The operator can look at information analyzed by the algorithms or an operator can do a visual monitor of spray skipping, clogged soil, obstacles, and so on. Even at night time or low visibility conditions (fog, dust, spray mist), the operator monitors what is occurring ahead, behind or underneath of the vehicle.

Nutrient monitoring and control of the nutrient's application or of the soil content (e.g. spread of type of soil or additives)

Soil condition monitoring. For example, the moisture content of the soil can be detected through the use of the antenna detected signals from the naturally occurring black body radiation emanating from the soil surface. The detected spectrum depends on the amount of moisture in the ground. Smartphone type devices used as the image sensor systems have antenna receivers/transmitters built into them to capture/transmit signals in the microwave to radar frequencies. The antennas include microstrip or directional antenna arrays pointed towards the ground. If signals are too weak for the onboard antenna, signal boosters or external dongles are attached or plugged into the image sensor systems to improve the sensitivity of the reception. Boosters include antennas integrated with low-noise signal amplifiers (LNA's) and sometimes with an ADC (analog signal to digital signal converter) so that the signal-to-noise ratio is improved and there is less signal loss before the analog signals are digitized and preserved for subsequent analysis. The measurements are converted to soil moisture observations by assessing the amplitude of the peaks and troughs of the signals as compared to a baseline calibrated signal level or an expected signal level of moisture. Alternatively, the signal is averaged or integrated and compared to an expected value.

In alternative embodiments, instead of capturing the broad spectrum of naturally emanating black body radiation from the soil, the image system can also detect moisture by first transmitting a signal towards the ground and then capturing and analyzing the reflected signal. Instead of sending out signals for communication, the imaging system sends out microwave-or-radar frequency signals toward the ground (e.g. L-band that smartphones are equipped with). The antenna on the units picks up the reflected radar pulse reflected back, the backscatter measurement. The brightness temperature signals are based on how much microwave radiation is reflected from the ground. The measurements are again converted to soil moisture observations by comparing the amplitude of the peaks and troughs of the signals with a baseline calibrated signal level or an expected level of moisture. Alternatively, the signal is averaged or integrated and compared to an expected value.

Dry soil may be lighter in color and sandier as compared to more moist soil. In some embodiments, in addition to the microwave detected signals, the coloration and dumpiness or texture of the soil as detected by the image sensors can also be correlated with the microwave/radar measurements to gauge the amount of soil moisture. Alternatively, using the coloration and texture information, alone, from image signals detected in the visible spectrum (i.e. by a camera or a video image in the visible spectrum), the moisture content is assessed. When the soil moisture is deemed low by any one or more than one of these methods, the amount of residue on the ground is maintained rather than turned over by the tillage equipment. Alternatively, a sprayer machine releases water or fluids to the ground.

Weed monitoring and control

Fungus monitoring and control to detect fungus and spray select areas to contain the fungus using fogging nozzles. Similarly to kill pests (e.g. aphids) underneath the leaves, a fogging spray nozzle or a drop nozzle (with nozzle tips pointing upwards).

Insect monitoring and control

Spray drift monitoring and control: the rearward-looking image sensor (e.g. camera) units can track if the dyed fluid has gone past permitted boundaries.

Monitoring uniformity of seeding, tilling process and then provide feedback to the central controller or operator to automatically or manually adjust the performance of the machine operation.

Aid in monitoring problems behind the vehicle, boom, nozzle, or planter (e.g. plugs or clogs, mud or soil build up)

Monitoring environmental conditions (e.g. forward looking image sensor (e.g. camera) units to monitor obstacles, hilly terrain, water patches, residue)

Detect and assess the amount of residue on the ground in order for a cultivator or planter to adjust the pressure on its implements.

Detect and assess whether dry spreader (e.g. dry fertilizer) has been spread evenly on the ground or whether it has been cast past a boundary. The color of the solid dots or pellets is contrasted against the soil color. Alternatively, specially colored pellets are mixed in with the usual pellets. As the specially colored pellets are spread and carried by wind and air, they are readily detected due to their color.

Spray boom control reacting to the look-ahead conditions, to tilt the boom, rotate the boom, retract or fold up part of the boom.

Provide information to aid navigation (e.g. hazard detection, backing up the vehicle, looking ahead to speed up or slow down). For example, at night or foggy conditions, the data from image sensor (e.g. cameras) (e.g. infrared) assist in navigation. As another example, the image sensor attachment fixtures can be mounted to the rear gang tube of a tillage machines such as a cultivator to perform multiple functions 1) aid backing up the cultivator such as to mate its rear hitch drawbar to the a pull-type applicator tank; 2) monitor soil flow, leveling or tilling behind the disks or rolling basket.

Provide information for autonomous driving, wheel adjust, height/suspension adjust. Even if there is no operator or if the image (sensor) system is placed on a drone or ground robot or tall robot (e.g. irrigator system), this system can be used to aid autonomous driving, or remote controlled driving.

Alarm or warning system (e.g. alert the operator)

Row identification and end-row identification and control

Calibration and setup for operating under low light conditions.

Calibration and setup for operating in sunlight

Data taking, triggering to buffer data for monitoring and further analysis (e.g. soil analysis, moisture content).

Correlation of image sensor (e.g. camera) data with data from other sensors to improve future techniques, crop yield, cost management, and so on. A history of the data year over year is accumulated to determine best practices for the following year.

Portability of these image sensor "attachment fixtures" includes putting the attachment fixtures underneath the vehicle to check for events underneath the vehicle.

Driving and safety guidance. Because the agricultural vehicles are large or have trusses, booms, and other objects that obstruct the view, an extended vision system greatly improves an operator's vision for oncoming traffic, trees, ground objects (e.g. animals, rocks), things in the rear, and so on.

Alternatively, correlating the image sensor data with data from other sensors (e.g. laser, sonar, radar, distance (proximity) sensors, weather sensors, row detectors, UAV or autonomous scout systems that have gone ahead) help determine how to improve comfort and drive or spray conditions for a vehicle operator. The image sensor data can better capture sensations that an operator may have difficulty perceiving. Some companies offer an overview or birds-eye view or sensors to watch the tractor vehicle itself or the area directly within a few feet around the vehicle or underneath the vehicle.

Autonomous vehicles can readily use this image sensor system plus some of the same algorithms as a sprayer or other crop management vehicle.

Automatic and automation and autonomous (e.g. avoid operator fatigue) monitoring to automate control and operation. The images are used for an endless number of not only applications, but also corrections such as auto counterbalancing of observed conditions. The lighting is auto corrected; if light or light source is detected to be behind the crops or plants being viewed, a light source in front of the crops or plants is automatically turned on to illuminate the object being viewed and whose image is being captured. Image pixels or elements are analyzed for differences in color intensity (e.g. an object with a light behind it appears to be very dark and its captured image elements or pixels are also dark). If such clusters are surrounded by a halo or lighter intensity pixels, a light source is turned on to shine on the clusters. In other embodiments, the color intensity on the image is automatically made lighter (e.g. software on Samsung Galaxy smartphones or higher end digital cameras).

Make prediction based on previously collected crop data.

Yield analysis in real time or offline. Follow-up actions by the agricultural equipment or image sensor units include adjusting the combine reel speed, harvester cutting rate, and uploading the data to a central computer or cloud.

Adaptive systems: adaptive algorithms having an associated image system learn from the "past" or from stored data. For example, the terrain on each farm does not change much (e.g. trees, rocks, the poor crop regions, where weeds tend to grow, shape of good leaf versus bad leaf) and the sprayer can be ready as it gets near the system even if the sprayer is being operated in the darkness and the image system may produce less clear images. Also by storing some of the image data and analyzing offline, the processes can adapt to shapes or situations (e.g. low moisture) on a particular farm.

Mapping the field using the image sensor (e.g. camera) data versus the location traversed from the GPS/RTK data. Creating new prescription maps for the next round of travel across the field.

Software upgrades to extend the life and purpose of the hardware. Because the system communicates with a cloud server or with a central computer, future improvements to the algorithms and software are also downloadable for enhanced operation. In some embodiments, the software is user-programmable to add algorithms or applications, to make easy revisions to factory-installed code, to add features, e.g. to tag and track rice seeds instead of soybeans pods, update databases that contain data on the physical features of weeds or new forms of weeds.

Example methods to prioritize these master applications include the time sensitivity of the application and speed to enact resulting action. Alternatively, the monitoring type of application is periodically processed by the state machine and secondary to the other type of applications where a resulting action is taken only if a condition is met (e.g. existence of a candidate weed). In addition, the construction industry vehicles sometimes have similar issues of visibility and the invention may be applied to cranes, lifts and booms.

Shared Setup for the Master Applications or Other Applications

Shared properties for any of these aforementioned methods or other applications include the following: The example image elements sense the visible spectrum as well as a spectrum for low light conditions (e.g. infra-red) and the sense array (e.g. number of image sensor pixels) may be operated in either coarse mode or fine mode. Alternatively, if there are a large number of pixels and a coarse mode (coarse grid or array for the captured image) is desired, some of the signals in adjacent pixels are summed together; or only a subset region of the pixels is analyzed. This patent disclosure will use the word "image sensor (e.g. camera)" irrespective of the spectrum of the electromagnetic signal. The coarse mode has fewer pixels for fast buffering and analysis of an image. For example, a coarse grid or array includes a 256×256 grid or set of pixels that capture a view of the ground. If the coarse grid or data indicates a "hit" or a possible activity (threshold detect), then a fine grid's data centered on the coarse grid may be stored or analyzed instantaneously. Alternatively, the fine mode of the image sensor (e.g. camera) includes a full set of pixels with much higher resolution (e.g. 8 megapixels). The vehicle with image sensor units may travel up to 25-30 miles per hour so that a fast communication and processing system buffering data from fewer pixels are used. The images that are taken are several vehicle lengths ahead of the vehicle to account for latency of data processing and analysis. The image sensor units have access to both wired CAN-bus that is used on agricultural vehicles and to a higher speed communications system operating, for example, under wireless 802.11, LTE, mobile 5G, or Bluetooth, or wired gigabit Ethernet. Alternative standardized communications include low power (e.g. comparable or less than Wifi's), short range (e.g. size of the vehicle or distance from the boom to nozzle or cab), and low communication latency (e.g. lower than Wifi). In some embodiments, the image sensor units or adjacent image sensor units have local processing circuits to instantly, locally analyze the image and then pass the triggering decision to the hardware or mechanical devices to respond to the decision (e.g. spray nozzle).

In some embodiments, other types of sensors supplement the image sensors. Multiple or pairs of image sensors provides stereo to gauge distances and height (i.e. provide 3-Dimension assessment). Alternatively, for example, LiDAR, proximity sensors or lasers are used to detect distances or height of crop leaves in the directions where the image sensors do not have coverage. The image sensors are focusing on the forward and rearward views if the sensor attachment fixtures are mounted to the top of a spray boom or planter unit. To detect distance of the boom to the crop height right below the boom itself, proximity sensors are used to point directly downward. As another example, if the visual imagery is poorer for night time operation, infrared sensors are used instead of visible-spectrum sensors. Or for example, chlorophyll detectors can be used to supplement or check the visible-green detection.

Other shared procedures include calibration. Example calibration includes factory calibration for each individual sensor and modular units 50 to correct for variations among sensors and units 50. Example calibration of the pixels or grid members is performed before a field run to normalize the intensity signals of the different grid members. When the image sensor (e.g. camera) receives reflected light or other EM signals, those representing the foreground (nearby) and those representing the more distant objects would not occupy a comparable number of grid members or pixels. Photographing the field area from an angle and projecting the image onto a flat Euclidean grid entails calibrating and then normalizing or equalizing the signals in the grid members, depending on the angle at which the image is taken. Alternatively, triggering off of distant objects in the image versus nearby objects in the image is equalized by scaling the threshold for each pixel or grid member to constitute a "hit"—an indication that something shown in the image should be acted upon (e.g. a weed protruding from the soil). In addition, a farmer user would use the on-board computer (on the modular units 50) to perform in situ configuration calibrations to equalize the effect of differences in configurations (e.g. how the farmer configures his system, choice of attachment fixture position, number of sensor on an attachment fixture, distance from neighboring attachment fixtures, and where the attachment fixtures are bolted to the agricultural machine.

In some embodiments, calibration or re-calibration is performed on the fly such during a vehicle turn or when the vehicle is re-fueling or re-filling with e.g. herbicide, seeds. In some embodiments, when the vehicle is slowed sufficiently or stopped, there is automatic calibration for in situ conditions such as color to adjust for detected lighting or time of day, to adjust the height of the boom during field operation based on calibrated crop height, and so on.

Other shared setups or procedures that are implemented also include stereo correction (from two image sensor (e.g. cameras) or lenses) and stitching together images from adjacent or up to next-nearest adjacent image sensor (e.g. cameras) on a boom. Additionally, the image sensor (e.g. cameras) may be oriented so the image is vertical with the long side parallel to the crop row if the farmer or operator operates the vehicle to travel parallel to the direction of crop row.

Yet other shared procedures include de-jittering or filtering out effects on the image due to any bouncing motion of the vehicle or the spray boom. Also, the image sensor (e.g. camera) field of view are correlated to the speed of the vehicle and GPS/RTK and geometrical position of the image sensor (e.g. camera) on the vehicle in order to know when the vehicle and vehicle device (e.g. spray nozzle) will reach a precise location depicted in the captured image.

Example Application: Targeted Methods for Weed Control

Using weed and fungus monitoring and control as an example of the framework, FIG. 1 depicts an agricultural vehicle 24 such as a sprayer tractor towing a tank 22, both traversing the field during the pre-emergent stage and also during the post-emergent stage. Example image sensor unit 50 or "smartphone" electronics units on the mount fixtures (e.g. rods) that capture images both forward 16 and rearward 18 directions. Forward 16 is in the direction of travel and encompass 180 degrees of view; whereas, rearward 18 is opposite the direction of travel and encompasses the other 180 degrees of view, for a total of 360 degrees for both views. An image sensor unit 50 that captures an image, facing the forward direction may not have sufficient peripheral vision to capture all 180 degrees of view and may capture only a portion of the 180 degrees. In some embodiments, the mounting fixtures 52 remain fixed in place and the sensor units 50 are moved from vehicle to vehicle (e.g. sprayer to harvester). Alternatively the fixture and image units are re-mounted together. Reference to "smartphone" is illustrative of an example inexpensive device with many of the electrical and software capabilities that are re-purposed, re-shaped, ruggedized, re-programmed to use in the monitoring, analysis and/or control of the agricultural hardware and vehicles. Other examples include software and electronics being developed for self-driving cars where the feature sets are repurposed, ruggedized, re-programmed for agricultural applications. Another embodiment includes reprogramming the software on self-driving cars and installing the new software on "smartphone." Rearward facing sensor units 50 monitor spray skipping, over-spraying, spray drift, and capture images for both online and offline analysis. Offline analysis includes determining the uniformity of the spray and amount of spray for a particular crop field location. Importantly, the spray activity provides vehicle 24 another opportunity to traverse the crop field and capture images of the status of the field and any emerged crop plants 10 (corn, beans, vegetables, fruits). The health of the soil and plants are visible and with their image captured, further activity may be planned (e.g. add more spray, add special types of spray, damaged crops may be revived).

Figure 2:
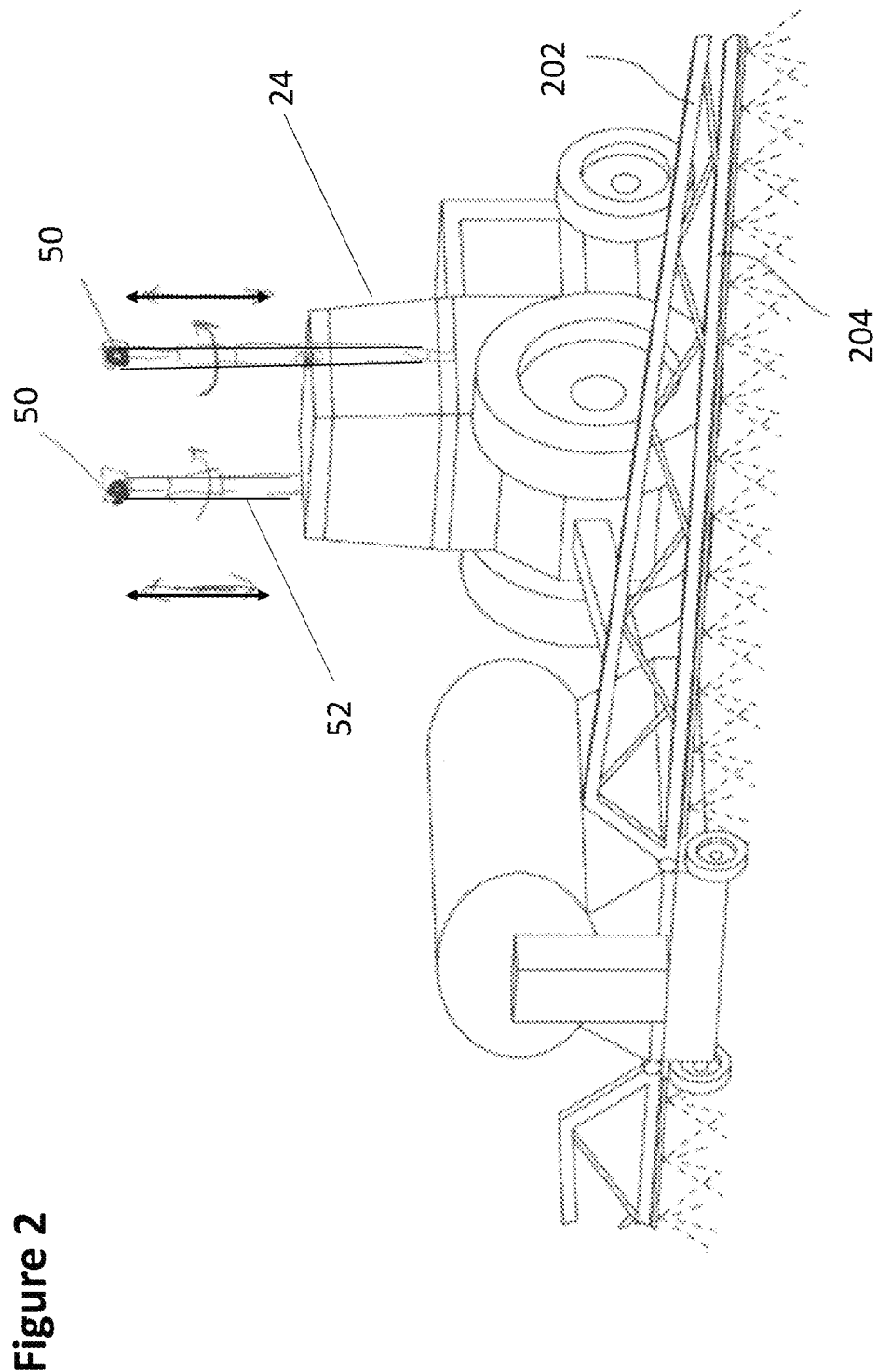
FIG. 2 depicts another view of the example vehicle where example image sensors (e.g. camera or video) or smartphone-type electronics are mounted on a platform (e.g. attachment or mounting fixture, e.g. rods).

FIG. 2 depicts another possible way to mount image sensor units 50 such as for smaller agricultural vehicles or narrow-width vehicles. Example imaging or smartphone-electronics rods 52 are attached for example above a tractor cab 24, on side of the tractor cab frame, and so on. In the example, only one image sensor unit 50 or smartphone-electronics unit is attached to the end of each rod 52. The camera or smartphone units 50 look forward and rearward. The example camera or smartphone rods 52 are extendable or telescopic (up, down or outward), or can be rotated, tilted or are articulated to bend up to 90-180 degrees (e.g. 180 degrees for folding the rods 52 on the side of the cab). In some embodiments, a pair of image sensors 50 are mounted on top of the cab 24. In some embodiments, the image sensor units 50 on top of the cab are installed in addition to the ones located on the spray boom (upper side 202 or lower side 204) or on another agricultural vehicle (e.g. windrower).

Figure 3:
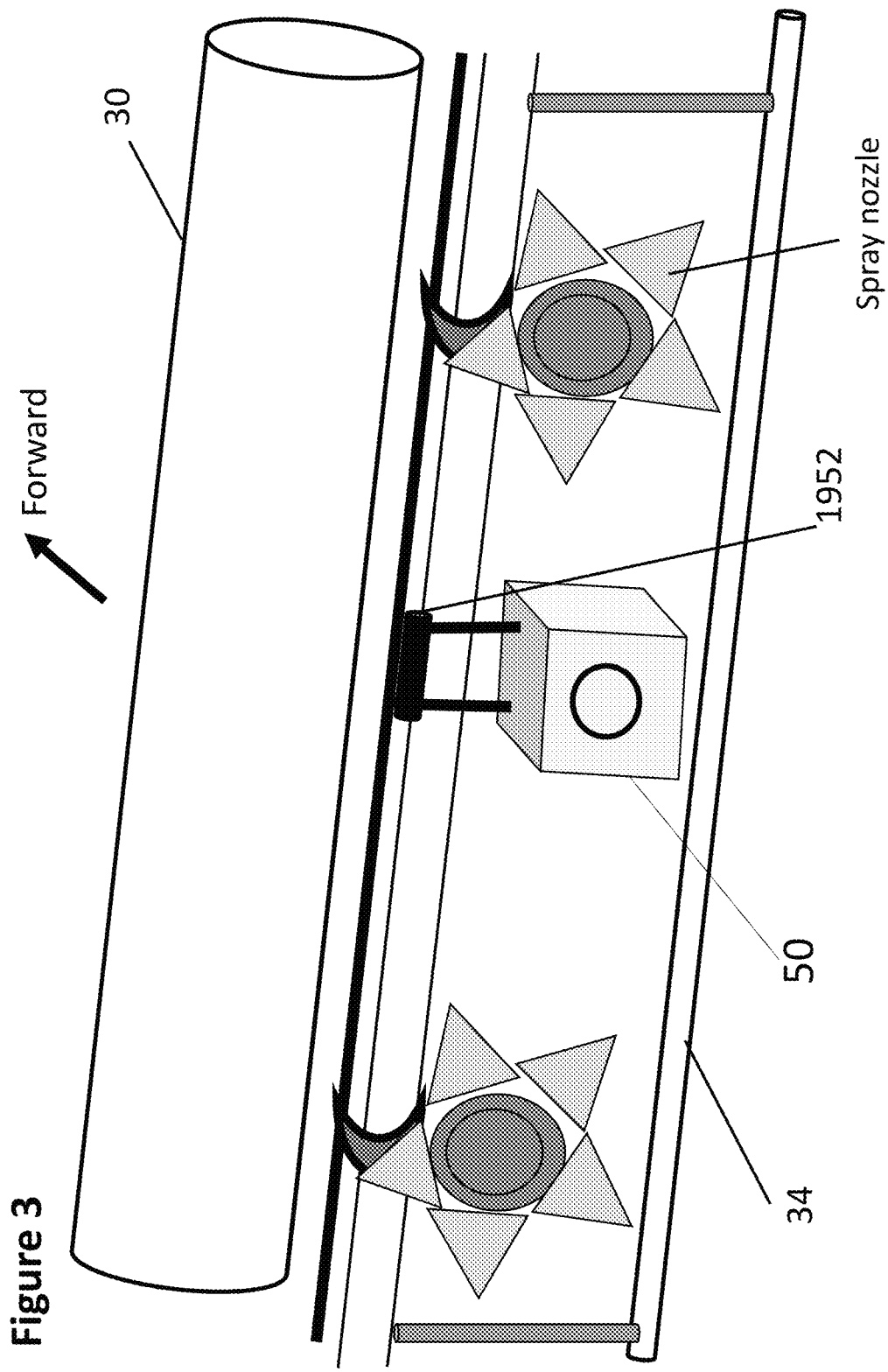
FIG. 3 depicts an example tubular or suspension-type spray boom with example image sensors (e.g. camera) or smartphone mounting attachments tucked underneath. If rear view images are not used, the attachment fixtures can be mounted on the front face of the boom sections.

FIG. 3 depicts example image sensor attachment fixtures 1952 (e.g. camera rods 52) that are attached for example above the skids below a tubular boom, or on top of the tubular boom. For booms with trusses (e.g. FIG. 2), the camera rods 52 are mounted within the triangular truss, the camera rods 52 are mounted parallel to the fluid distribution pipe, for example above the fluid distribution pipe. Alternatively, image sensor units 50 are mounted directly on the agricultural equipment (e.g. boom) without using a universal attachment fixture 1952, but the fixture facilitates electrical and mechanical connections and perform the function of being a universal adapter for different vehicles. In some embodiments, the attachment fixtures 1952 (e.g. FIG. 19) include a hollow or have embedded circuit traces to conduct electrical signals and power. The sensors and their housing are plug-and-play socketed or screwed or otherwise attached to the attachment fixtures 1952 that includes a sensor hub or signal gateway (e.g. IoT gateway). In another embodiment, the image sensors units 50 are electrically-coupled (e.g. wired or wireless) directly with the spray nozzles or even mounted on top of a housing of the spray nozzles or on the top of the drop style spray nozzles in order to reduce the latency to get the spray nozzles to react or respond to decisions and calculations performed by the image sensor units 52. In some embodiments, the sensors are located above the boom plumbing and above each or every other spray nozzle. In other embodiments, the sensor is positioned between two spray nozzles. When there are fewer sensors than crop rows or nozzles, the sensor analysis assigns a particular sensor's primary responsibility for its images to a particular crop row or rows and particular nozzle or nozzles. When some sensors have wide peripheral vision, its data can also be used to provide redundancy to analyze other crop rows or when the sensor assigned to other rows fail.

Figure 4:
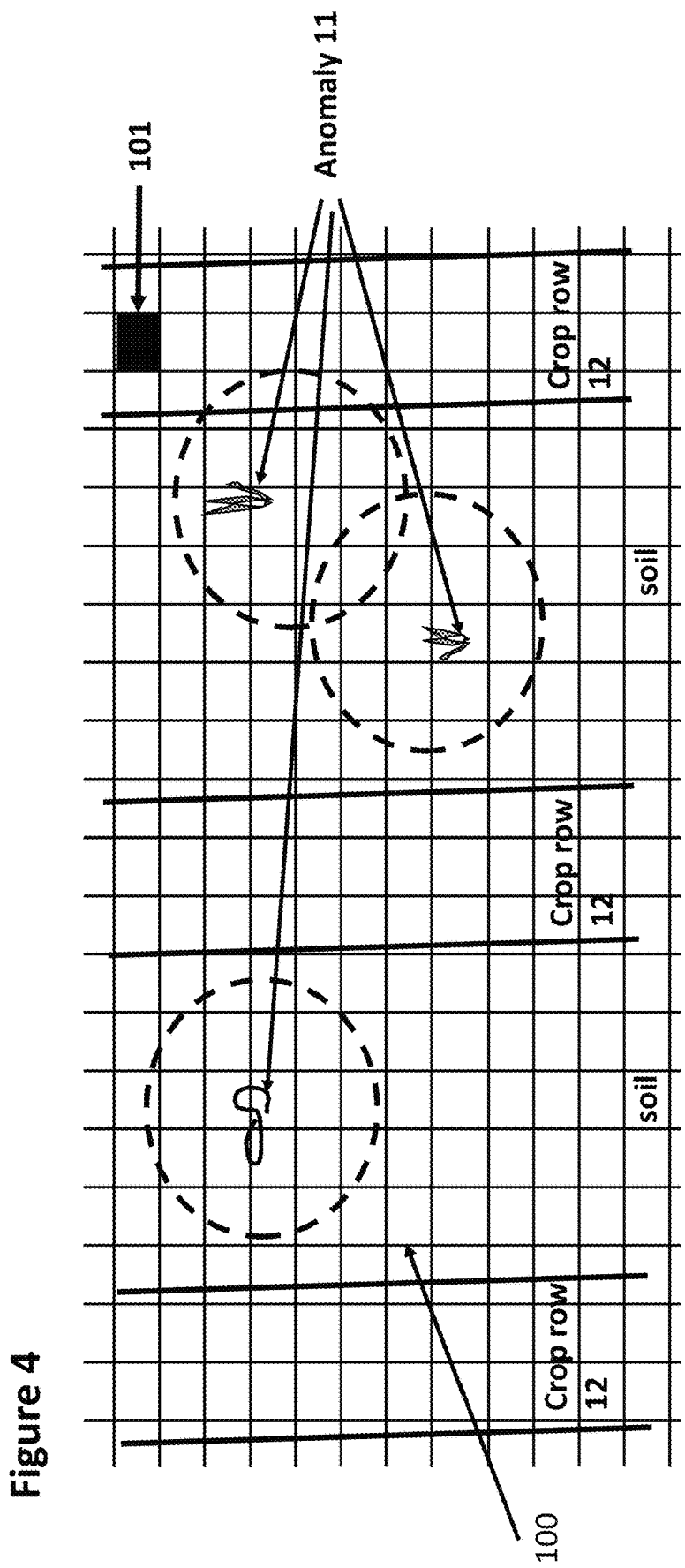
FIG. 4 depicts an example method of associating a grid map over the image of the crop field to look for anomalous patterns in a not-yet planted field or between crop rows ("soil") in a planted field.
Figure 5:
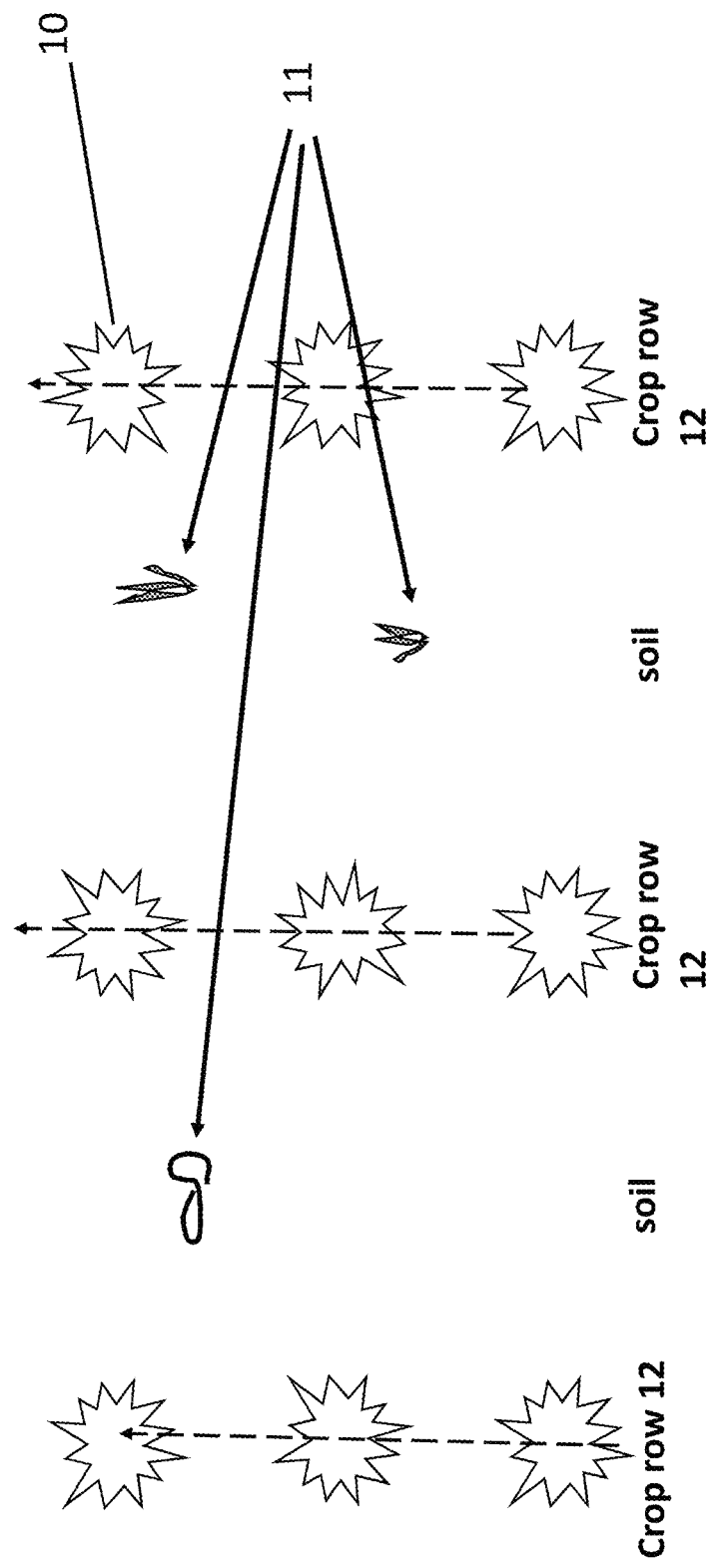
FIG. 5 depicts an example method of using the images from cameras/videos or smartphone-type units to look for anomalous patterns in a field or between crop rows of a post-emergent field.

FIG. 4 depicts an aerial view of part of a crop field with an example virtual image grid 100 overlaid on the crop field (e.g. FIG. 5). The virtual image grid 100 represents a way to divide up a captured image into individual array elements 101 (colored black). The grid 100 represents the adjacent image pixels being grouped together electronically or in software. Each array element 101 is depicted as a square in the image grid 100, although the squares could be rectangles, parallelograms, isosceles parallelograms, circles, include multiple image pixels and so on, in different embodiments. Each array element 101 represents a small area on the crop field (e.g. 1 inch by 1 inch, 5 inch by 5 inch). For discussion purposes, the center of an array element 101 is associated with the center location of the small area of the crop field. In FIG. 4, the image grid 100 is overlaid on or be associated with the soil, but can also be overlaid on the crop rows 12, or whatever image is captured by the image sensor units 50.

In some embodiments of FIG. 4, at the circuit or electronics level, the array element or unit squares 101 represent image pixels or neighboring pixels that have been grouped together after decoding and addressing a row number and column number of each pixel or bitmap of the captured image ("row number" referring to the image array or raster, not to the "crop rows"). Programs stored on the processors of each image sensor unit 50, address each array element to collect image information regarding the element (e.g. color or intensity), then perform calculations for each algorithm, to come to decisions, determine whether further action should be taken (e.g. notify the shanks, disks, spray nozzle to take action). Example programs include weed, fungus or disease identification to detect anomalies (e.g. difference in expected color, height, size, shape) in otherwise-expected patterns of soil. A priori field calibration or majority neighbor-pixel colors help determine expected colors, protrusions, and patterns. The vertically-running rows represent crop rows 12. The wider region in between represents the ground soil between crop rows 12. In FIGS. 4 and 5, three weeds happen to be in the area between crop rows 12 where ideally they would not be expected. In some programs, the found unexpected objects are sprayed with herbicide, represented by a dashed circle; the object and circled location information are stored and uploaded for yield analysis and future crop cycles or offline identification of the type of weed.

During pre-emergent stage of planting (crop leaf has not emerged from the soil), the following example methods or electronic triggers include 1) threshold detection in individual pixels (e.g. element 101) for off-color objects (e.g. greenish objects against brown or tan soil or residue); 2) threshold detection among pixels for protrusions (e.g. lump or height) from the ground; 3) aggregated percentage of pixels that do not match some baseline expectation (e.g. mass (density), color, shape, height); 4) enhance green and protrusions or mass; 5) filter out noise; 6) optionally, correlate results from multiple images; 7) pinpoint the location of any identified weed; 8) spray the area when the spray vehicle reaches the weed location. After the pixel data (images) are captured, the processor exercises these methods to decide whether to release the herbicide. As soon as one pixel (or element 101) triggers one or more than one of these conditions and indicates a likelihood of weeds, the spray vehicle releases herbicide from the spray nozzle that is associated with the image sensor (e.g. camera) unit 50 and processor that flagged or identified a "weed." In some embodiments, to reduce the likelihood of false triggers, multiple pixels or at least a selected number of pixels are each required to satisfy one or more of the conditions stored or programmed into the computer processor in order to fully trigger the spray nozzle to actually release herbicide to kill the weeds. As an example, the selected number of pixels include adjacent pixels within a region of interest or distance among the pixels (e.g. all pixels within 10 pixel distance), and a peak value can be taken as a maximum average value among these pixels within such region of interest. In some embodiments, satisfying two or more particularly-selected conditions would trigger a herbicide spray response. For example, some types of weeds would likely be both a different height and have different number of leaves (bushiness) as compared to the crop plant. Then to reduce the likelihood of false triggers, both conditions would be passed in some embodiments in order for herbicide to be released. In some embodiments, no further processing of the image pixel data in that local area is performed once one trigger is satisfied. That is, the spray nozzle's spray would provide coverage (e.g. release spray for) that particular local region and it would not matter if there are multiple weeds in that region; all of the weeds would be simultaneously sprayed in that region. Example spray nozzles include integrated solenoid valves or ball valves that open and close valves to release fluid, based on a signal command. For example, U.S. patent application Ser. No. 14/506,057 (Hybrid Flow Nozzle and Control System), TeeJet and Hypro have many example remotely controlled spray nozzles.

In some embodiments, the planned crop row 12 is first or subsequently sprayed/spread with fertilizer after the herbicide spot spraying. If the planter and the sprayer use the same GPS/RTK system for precision seed planting, the planned crop row location information can be coordinated among vehicles, the sprayer and planter, and the planned crop row is optionally band sprayed with fertilizer.

During the post-emergent stage of planting (crop leaf has emerged from the soil), various references describe looking for weeds and spot spraying between the crop rows 12. However, unlike past references, this disclosure relies on the location of the emerging crop leaf being either known (e.g. from the information of the seeding vehicles, auto-track previous drive) or the crop row location is identifiable by the leaves (e.g. localized straight line fit to the location of the leaves and or image guidance described in FIG. 29 or by other guide markers, e.g. end of row or field markers). Once the crop row 12 is identified, anything that is not on a crop row is classified as a "weed" and is sprayed. The average width of a crop row can be entered by the operator before driving through the field, and anything that is not within, say, one or two standard deviations from a center/midpoint of the width would be sprayed.

In some embodiments, the quantity of spray is reduced or altered. For example, the crop row 12 may be sprayed with one type of herbicide and any anomaly between crop rows may be sprayed with a stronger herbicide. Presently, example multi-head nozzle bodies have all the active outlets pointed downward. Some of the outlets may instead point at an angle to facilitate spraying in between crop rows 12. For example, Arag and Amazonen have produced angled nozzle outlets on a nozzle body, bodies having a variety of outlets with different pointing directions that may be combined with outlets that point mostly downward toward the ground.

Figure 6:
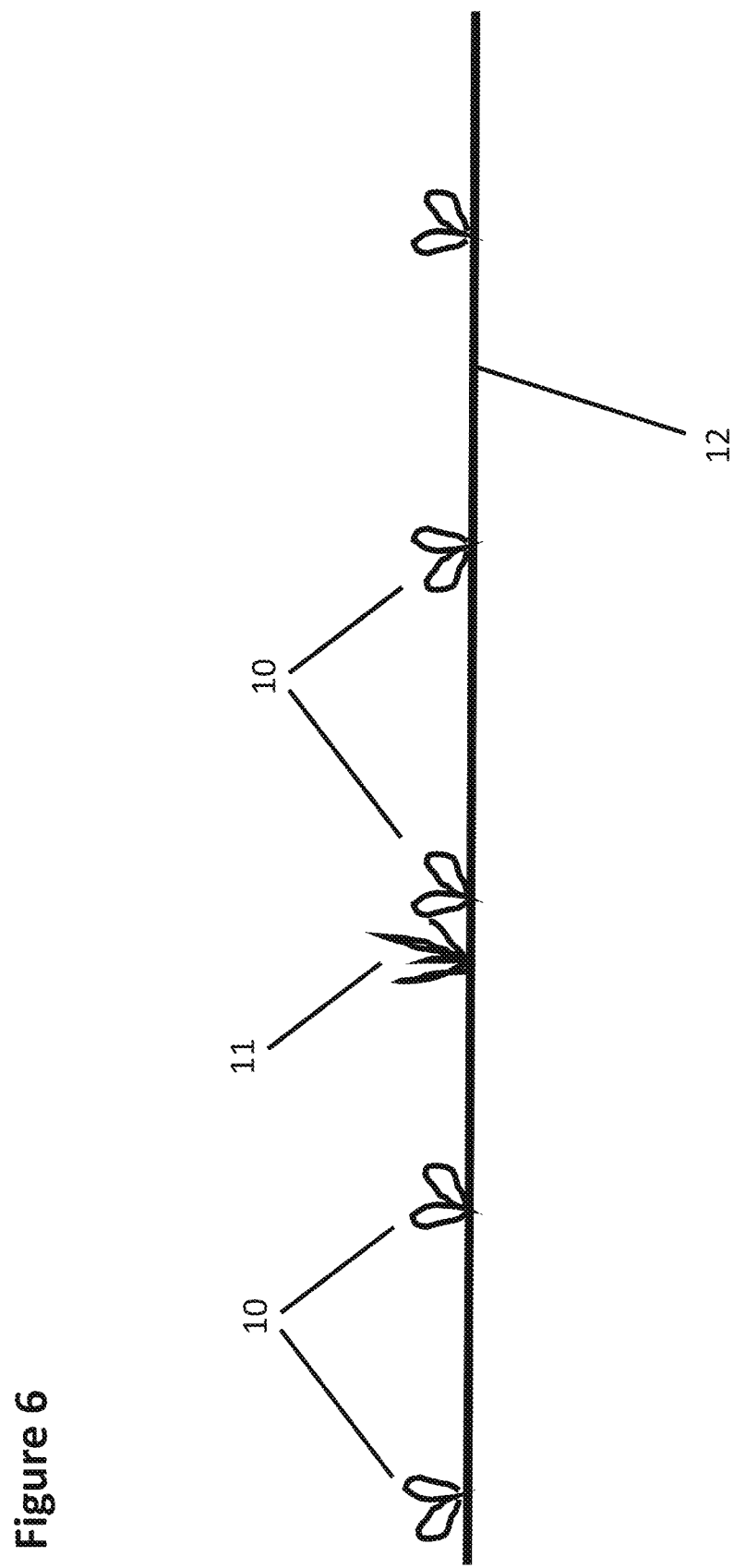

FIG. 6 depicts another embodiment method to find anomalies 11 from captured images for detecting and getting rid of or deterring anomalous objects 11 found among plants 10 along a crop row 12. Anomaly 11 include unexpected plant location, height, number of leaves, shape, color, or non-plants (e.g. garbage). The example anomaly shown in FIG. 6 is located in an unexpected distance from or region where seeds were planted; as shown, it is also anomalous in height compared to the other plants. The target items to spray are based on the anomalous patterns in the grid array that are different from expected patterns. For example, different distributions of color, position (location) of leaves, or color, height, mass (density), texture, or any combination of these things. Captured images are uploaded along with information regarding position, amount of spray, wind and travel speed, temperature, and other variables. Offline analysis can be performed to identify the type of weed, monitor the location in future crop cycles, correlate how the weeds and spray may affect yield, water usage, the environment, and so on. In some embodiments, a smaller vehicle that is closer to the ground than a tractor or self-propelled sprayer is used to detect weeds or other anomalies 11 in between plants 10. When the plants 10 grow high enough, they may camouflage the anomalies 11, or the anomalies 11 may be hard to see from an angle. In some embodiments, a smaller vehicle can detect an anomaly 11 when it travels closer to the location of the anomaly 11 and the adjacent plants 10, capture an image that shows something is in an unexpected location, height and so on. Alternatively, for a larger vehicle such as a tractor carrying the image sensor units 50, even from a distance, the sensor units 50 can perform statistical analysis of the crop row 12 from the captured image—e.g. the average mass or color density is different in the location where there is an anomaly 11 due to more leaves, differences in height and so on.

In some embodiments, anomalies 11 in a crop row 12 are sprayed with herbicide. To avoid needless spray (e.g. crop residue, twig), such objects are calibrated out by void pattern instructions performed on an image captured. Alternatively, a crop row is identified and spray is applied along the entire row 12 itself. In some embodiments continuous filming is performed. Alternatively, where higher resolution is used for analysis, snapshots are taken. If an image sensor unit 50 has good peripheral or fore-aft view, the snapshot intervals are taken to reduce overlapping images and is based on a travel speed of the vehicle. Fewer images also reduces the amount of data that is uploaded for further analysis offline.

In other embodiments, the field may be well cared for already or the crop rotation is such that there are few weeds so that the amount of spray can be further reduced by spot spraying the entire field. Where the crop row itself is not entirely sprayed, during the early stages, since the crop leaves are small and the seeds were placed at regular intervals (e.g. every 12 inches along a row), any anomaly in the regular interval pattern is taken to be a possible weed, and herbicide spray is released in that area. (See e.g. FIG. 4, dashed circles). Depending on the height of the spray apparatus from the ground, the conical or targeted area covered by the spray release is usually at least a feet or more in diameter or width so that more than just the identified candidate weed is sprayed. In some embodiments, once the area is sprayed, there is no further searching for further candidate weeds in that area, which then allows the processing circuit to move on to process images associated with farther or the next swaths of land.

In other embodiments, it takes more processing time to identify a crop leaf from a weed leaf if there are many types of weed leaves or are very similar to a particular crop's leaves. In this scenario, fast triggers are instead used to detect height differences, mass (leaf density, number of leaves), and deviations from an expected pattern to determine whether to release herbicide. For example, statistical deviations from an a priori determined normal pattern are used to indicate an anomaly and the area is sprayed. Alternatively, the statistics are accumulated in the field. As the vehicle is traveling, the sensors or image sensor assess pre-determined variables (e.g. number of leaves, coloration) in each grid element(s). For each variable, the difference in values among the grid elements provides a trigger whether an anomaly is observed or detected. If the differential value is past a threshold value or, for example, four sigma deviation, this is characterized as an anomaly and a spray is applied to treat the anomalous area.

In some embodiments, after the crop row leaves have emerged, the crop row is identified to perform nutrient (fertilizer) band spraying along the crop row. Using the captured images, the elements of the image first pass a calibrated color threshold (e.g. green). The rows are identified by either a local straight line fit to the pixel images where greenish-colored pixels line up. Outliers beyond two or three sigma distance are removed and a straight line fit is repeated to obtain a more exact estimate of the row location. Other sensors (e.g. row feeler guidance) or the information from the planting vehicle (auto track with RTK information) can be used in other embodiments to provide the location of the plants. If the farm land is hilling or there has been much rain after planting, the seeds may move a little and subsequent straight line fit to the crop leaf location can be used in conjunction with the a priori known information.

In some embodiments, to enhance green (e.g. to detect weeds or crops), yellow (e.g. to detect residue) or other colors (e.g. to detect solid fertilizer, dyed spray), lens filters or software filters (e.g. Matlab or Java libraries color enhancement functions, manipulating the pixels and luminosity) are used to sharpen the contrast between the desired color and other colors, and then select the desired color itself. Alternatively or in combination with filtering, since the tractor, boom or nozzles have lights or LED lights, special light colors are applied to enhance certain colors (shine on the object with a particular light spectrum to enhance the desired color). Then in addition to color, other factors shape, height, quantity or mass, and location are taken into consideration to identify a desired target.

In some embodiments, chlorophyll sensors or detectors are used to supplement or corroborate the visible-spectrum image sensors. Chlorophyll detection correlates with the amount of green content of plants. Chlorophyll detection relies on light being absorbed by anything with chlorophyll molecules and then looking for the fluorescence emitted by the electrons making energy-level jumps or for missing spectral lines. Chlorophyll detection also correlates with the amount of nitrogen or healthiness of a crop. Low chlorophyll indicates nitrogen deficiency so that as a sprayer traverses the crop field, if there is statistically lower chlorophyll than a pre-determined expected level per leaf size or crop height, more nutrients can be added by spreaders or by sprayers carrying fertilizers having e.g. ammonium phosphate, urea. Instead of chlorophyll detection, the intensity of the greenness of plant leaves can be measured using image sensors. Calibration is initially performed to set the default expected magnitude of green intensity. When the detected intensity is low compared to the default expected amount, the plant is spot sprayed or spot spread with fertilizer. In addition, if the leaf size is too small or if the leaves are ragged in shape, fertilizers may be applied (spread or spot sprayed) to the particular plant or area of plants.

In some embodiments, if the chlorophyll sensors (detectors, e.g. greenness intensity measurement in the visible spectrum or a chlorophyll fluorometer) are used, they can also distinguish weed. During the pre-emergent phase, if there are any indications of chlorophyll, then a herbicide can be applied to the ground area (spot sprayed or spot lasered) because the assumption is that if there are any plant life before planting, they would be considered a "weed." During the post-emergent phase, the chlorophyll sensors can be used to detect for plant life between crop rows. The location of the crop row is determined in the same or a similar way as the aforementioned techniques or numerous other techniques (e.g. U.S. Pat. Nos. 8,019,513; 6,686,951) or based on the known-seed planting location, or a combination of these techniques. In between the crop rows, if chlorophyll is detected, it may be assumed to be a "weed" or something undesirable, and herbicide is then applied to the weed. Along the crop row, if too much chlorophyll is detected in a patch or in a location between where the seeds were planted, a weed may be assumed to exist in that area, and then again herbicide is applied to that area. Alternatively, the entire strip of crop row is sprayed so that any weed may be killed. The type of herbicide that is crop tolerant so that the crop does not get killed along with the supposed-weeds. The chlorophyll detectors are mounted on the attachment fixtures so as to keep them in fixed locations relatively to one another to ease calibration of the individual detectors and moving the attachment fixtures from one machine to another machine. Affixing them on attachment fixtures 1952, stick or linear platforms also help to match up the detectors or sensors with the relatively-fixed (measured) distance from crop row to the next crop row.

In some embodiments, instead of chlorophyll detection sensors, near infrared signal transmission and detectors/antennas sensors are implemented in a manner similar to the microwave signal and antennas for moisture. Near infrared signals are sensitive to the nitrogen content in the soil. Before planting or in the plant pre-emergence stage, the tillage machines often passes over the field to turn the soil and residue. Alternatively, a spray machines passes over the field to apply weed killers. While doing so or later in the crop cycle, the tillage or spray machines can also check the nitrogen content of the soil to see if nutrients need to be applied. The nitrogen detection includes sending near-infrared signals towards the ground and then detecting the reflectance using doped semiconductors that act as antennas.

Figure 7:
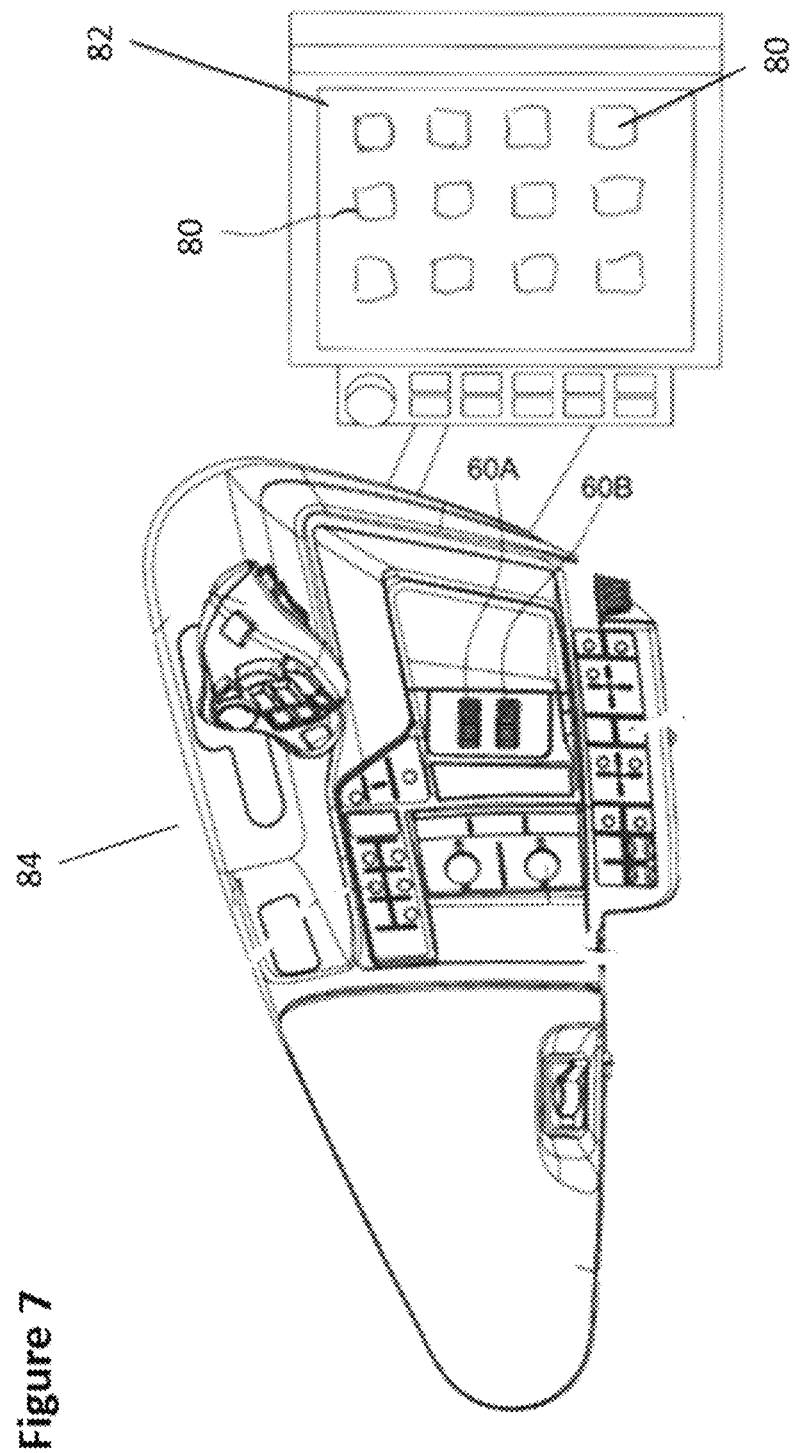
FIG. 7 depicts an example (removable) tablet display having selectable applications.

Agricultural weed detection and herbicide spraying is only one of the endless number of applications that can be implemented on the image sensor units 50. FIG. 7 depicts one example way of organizing and displaying the different applications. Example icons 80 represent the different Master Applications or other processes, and the icons are displayed on a screen 82, console screen, a laptop screen, a tablet and so on. By voice command or by tapping on a touchscreen, the operator selects an icon 80 to select a Master Application, or once the operator selects a Master Application, additional options are selectable (e.g. to select different image sensor units 50 for a visual check, monitoring or control, or calibration purposes). In FIG. 7, the console is grouped or co-located with the command arm console 84 having an in-cab controller and additional switches 60A, 60B (e.g. dip switches, rotary switches, knobs, buttons, thumbwheels) to control the different agricultural equipment and vehicle.

Figure 8:
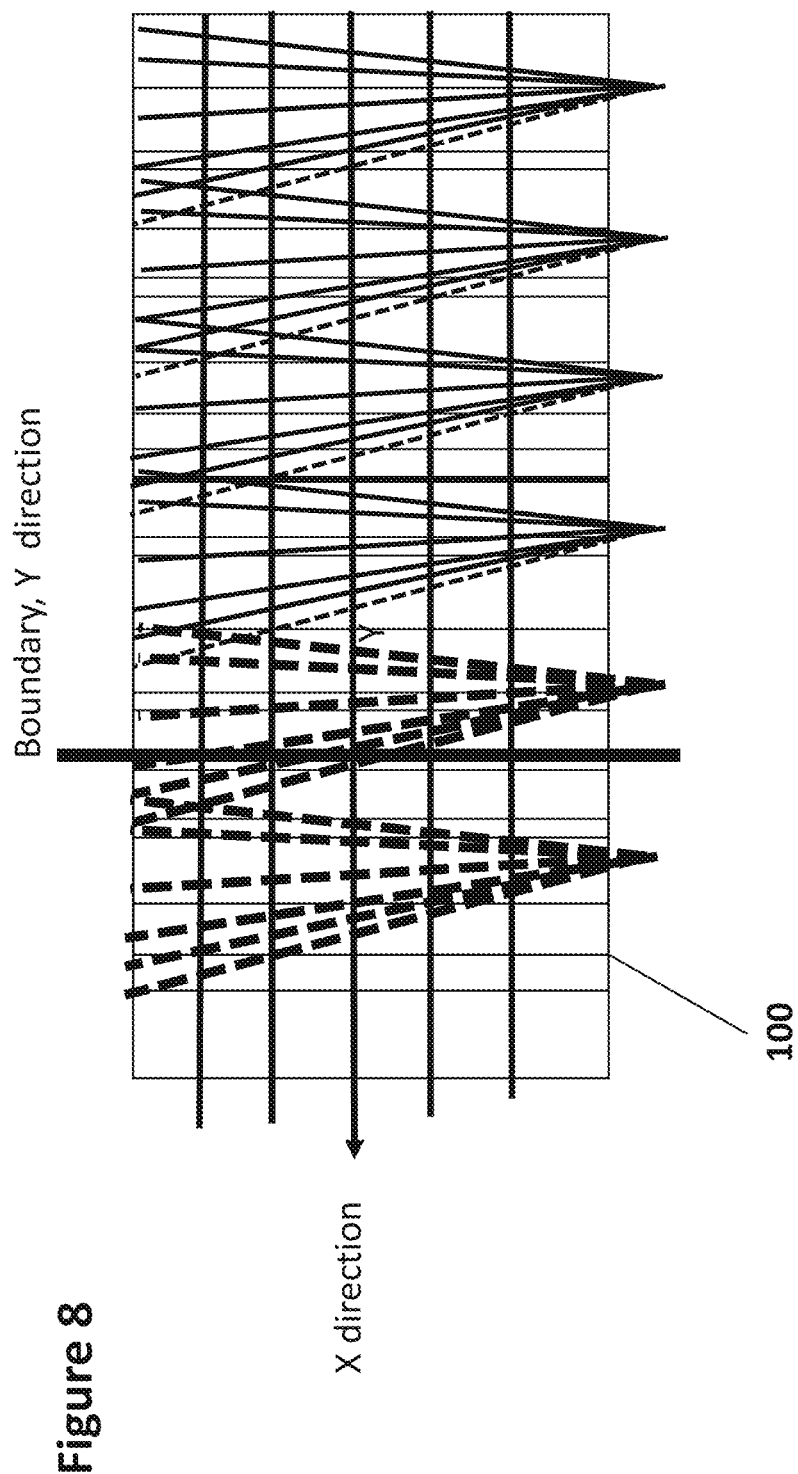
FIG. 8 depicts an example method of using images from the image sensor to detect spray patterns or drift of spray patterns based on color or electrostatic/reflectance or foam properties injected into or mixed with the spray in each spray nozzle.

FIG. 8 depicts another example Master Application, which is used to detect spray drift and the spray pattern landing on the ground of a crop field. Dyed end-unit spray are released (e.g. from the two endmost spray nozzles on the left in FIG. 8) or other visual detection means such as foam added to the spray are released. The procedure includes instructions that are stored in memory and exercised by a processor on the image sensor units 50 or stored on and exercised by the control center computers of a spray vehicle. The procedure includes capturing the image, associating or overlaying a virtual grid 100 over the captured image, then check whether (dyed) spray went past a boundary "Boundary" associated with one of the Y-direction lines of the grid 100. Drift detection can be used to determine spray overlap, as well, based on the image captured. The virtual grid 100 makes it easier to predict or calculate the trajectory of the spray droplets: the procedure has instructions check the observed results from the captured image against the computed expected trajectory in X direction (transverse to travel direction, or in both X and Y directions, where the Y direction is parallel to travel direction. Under some circumstances, shining a light on the spray droplets, or shining a light on the spray boom help improve the contrast of the spray droplets against the air or against the ground (soil or crop canopy). The contrast is improved even during the day time if the color of the light is selected to increase reflectance (high LRV, light reflectance value) and contrast against brown soil/green leaves. If the vehicle is operated when there is low light or it is nighttime, the additional light is particularly useful. The light is also useful to detect the path of spray in light, if there is a tilt or curvature in the detected spray versus the light beam cone direction (so that curvature of the spray trajectory becomes noticeable when contrasted against the straight light beams). High powered light on the spray nozzles or ends of the boom or each boom arm or section reflects back from the spray droplets and the image captured of the spray shows the path of travel of the light and if there is a curvature in the travel of the droplets, indicating that the spray is going out of an acceptable or predicted area. The travel path of the droplets is corrected for factors such as wind direction, local eddies, vehicle travel direction, speed of vehicle, and humidity to determine or to correct for spray drift cone versus expected or ideal spray travel cone, and is also correlated with droplet size (where larger droplets do not veer as much) and the chemical composition (where additives in the spray fluid can also reduce spray drift).

Figure 9:
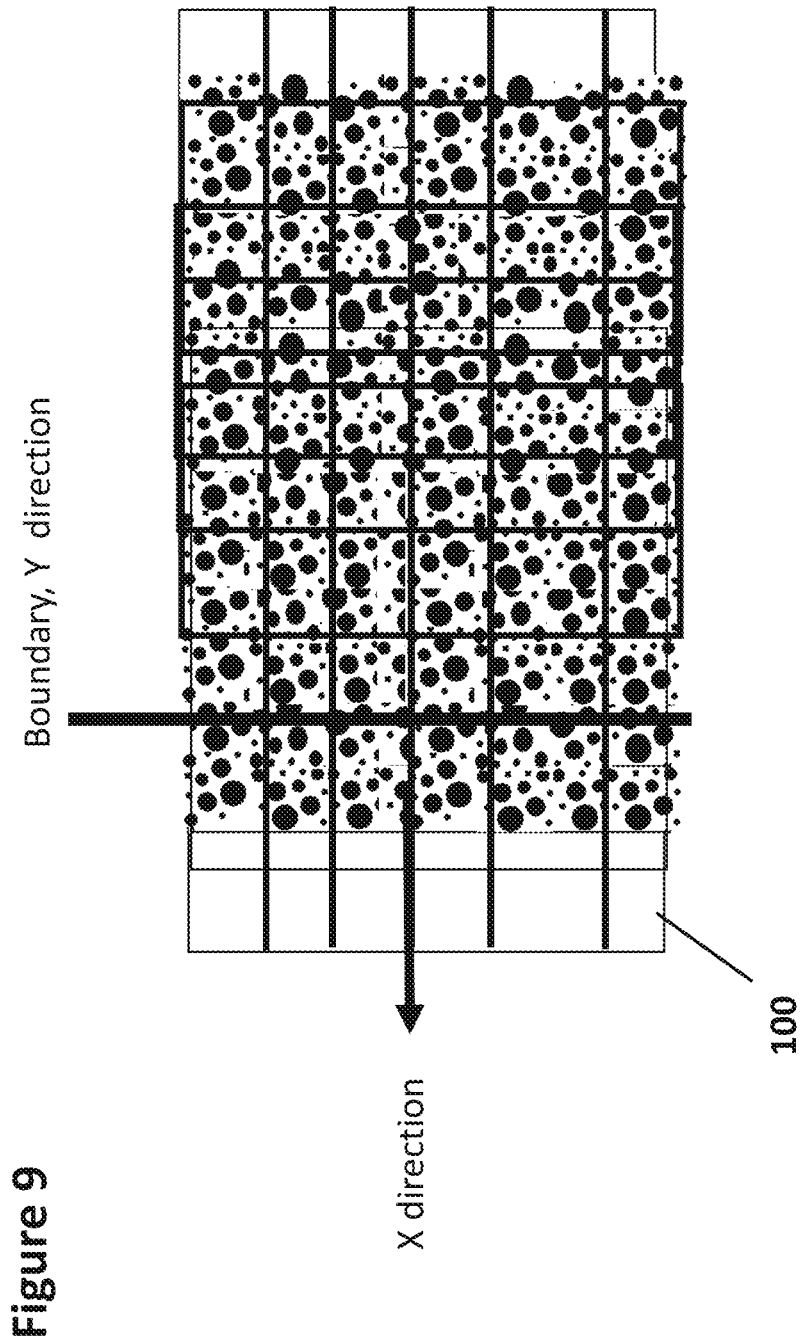
FIG. 9 depicts an example method of using images from the image sensor to detect spread patterns of dry fertilizer, of residue or other objects on the ground. For example, the pattern recognition instructions selectively enhance stalk-like shapes (e.g. residue) or rounded objects (e.g. fertilizer pellets).
Figure 10:
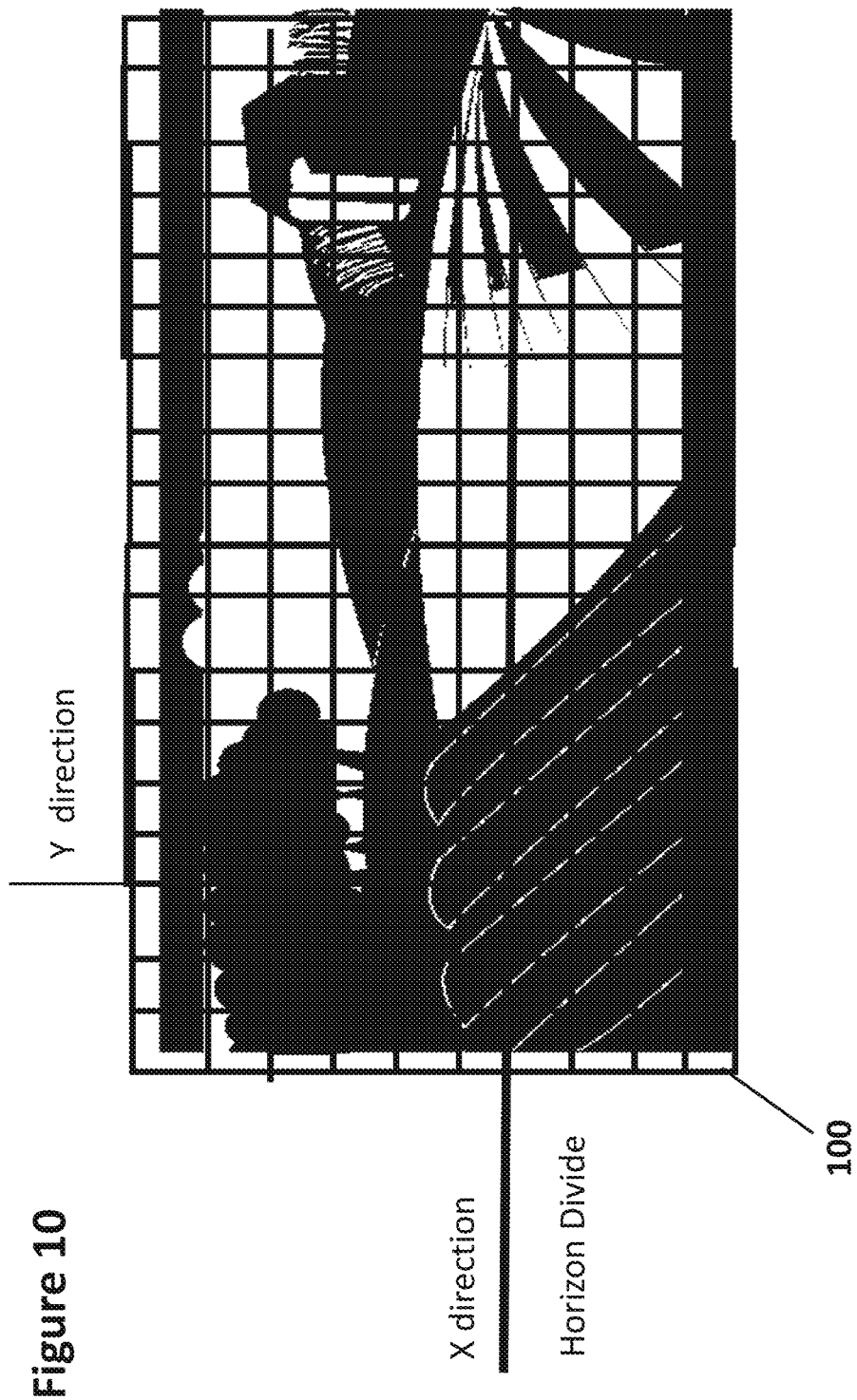
FIG. 10 depicts an example method of using images from image sensors to create 3-D or depth images to determine the terrain, location of end-rows, obstacles, distance so a vehicle can prepare to respond before reaching the location. For example, if the terrain or crop height is changing, a spray boom can start to rise or lower or bend to respond to the upcoming field topology, elevation, or crop surface.

FIG. 9 depicts another example Master Application, an embodiment of a method to determine the uniformity of the spread of dry fertilizer or other objects (e.g. residue) based on using color or texture or shape contrast. For example, residue is often lighter or yellow or greenish compared to soil. Innocuous color additives can be added to dry fertilizer to distinguish it from soil. In addition to color, there is texture contrast or shape contrast. For example, residue is thin sticks, spiky, stubs, or dried leaves compared to soil that is more uniform and refined. As another example dry fertilizer, slow-release granular fertilizer are larger in size than soil and thus are distinguishable from soil. An algorithm having instructions is stored in the memory of the image sensor units 50, and exercised by the local processor on the units 50 when the solid-fertilizer analysis application is selected by an operator. The image sensor units 50 are located on the rear of the vehicle, for example, above each of the dry fertilizer boom openings or dry spreader openings. The image sensor units 50 notify the cab electronics or local boom electronics of the results. If the vehicle is traveling slow enough that the vehicle's cab or centralized controller can command and exercise the algorithm and correlate the different captured image from each image sensor unit 50, then this is another way to implement the analysis. The algorithm analyzes the captured image elements to verify if the spread statistics are correct, and spread uniformly within, say, less than 10% difference among the captured images either in the other crop regions or the crop rows that have already been traveled by the vehicle and spread with fertilizer. In some embodiments, the instructions also checks if the fertilizer spread has gone past some designated Boundary. Corrective action and or alarm levels are raised based on a threshold of undesirable spread. The data from the captured images are also saved or uploaded to a cloud server or to the cab computers, then later used for offline analysis to correlate with the crop yield in that area of the field.

Several of the Master Applications have shared procedures. For example, weed identification and residue identification have some shared methods. Both have filters and enhancements to magnify the distinction between "friend" and "fiend." These procedures have the potential for efficiency (i.e. to eliminate all weeds even if it means spraying more crops accidentally) and fast decision making as compared to trying to identify individual weed (broad) leaf versus background (broad) leaves. The more sophisticated and complex procedures are left to an analysis on the slower cab or remote computer server in order to identify patches or areas of problems. Alternatively, high speed electronics (high speed CANbus and 5G) plus an analog electronic circuit is implemented because analog can be made to process input signals in parallel to speed up decision making and eliminate the latency associated with ADC's to convert between analog signals and digital signals, and with serial data buffering.

Example procedures to trigger on green include a pre-run calibration, in-field identification, and in-field threshold check. During the daytime, calibration is optional, green is reasonably identifiable by checking for the intensity of the green (e.g. in RGB wiring, or digitized image signals) component of the pixels. If green is past some threshold in an area of the ground grid, this triggers the nozzle associated with the particular image sensor (e.g. camera) to release herbicide. For night spraying, a pre-run calibration is performed to eliminate the shadow effect of the different lights shining on the ground (e.g. the headlights of the vehicle and boom lights illuminating the ground). The pre-run calibration also sets a threshold of what is considered "green" during the nighttime conditions. The night-time color that is associated with "green" is contrasted against the expected background color. When there is a large enough contrast signal past a pre-determined threshold value, a candidate object would trigger the herbicide to be released in the area of the candidate object.

Example procedures to trigger spraying on height or density (bushiness or extra number of leaves) include a pre-run calibration, in-field identification, and in-field threshold check. For example, if there are no weeds, the density of crops leaves is more sparse than if there are also weed leaves. A pre-run calibration is performed to measure the baseline density if there are no weeds. The pre-run calibration also sets a threshold of what is considered more dense during the nighttime conditions. For density and height detection, a cluster of adjacent pixels are analyzed by first honing in on the pixels with highest intensity of a preselected color and then checking the intensity of signals in the pixels (or grid elements) adjacent to the pixel with highest intensity. When multiple pixels (or grid elements) have high intensity, then the candidate pixels with signals levels beyond some pre-set intensity value are analyzed to verify if there are clusters around the candidate high intensity pixel (or grid element).

The example aforementioned weed procedures may be run standalone or combined with a verification (null check) that the found location is not where the crop leaves should be (in expected locations) based on the geometry (local straight line fit to where the rows are, an input of the seed spacing, or from the GPS/RTK auto track data stored from planting). Once the grid of where the crop leaves is calculated even if the sprayer is not traversing parallel to the rows, but traversing cross wise or at some other angle to the crop rows, the field can still be spot sprayed. An example method includes skipping across the pixels or array elements where the crop rows are located.

In parts of the field where there is not a row pattern (e.g. near the edge of the field) and the location of the plant leaves is not readily calculated, one example procedure includes spraying that entire section (e.g. if there appears to be many weeds to the operator). The central computer controller can be programmed to automatically release the spray in that area of the field. For example, where the crop location is not calculable, a flag can be set in the computer memory, and this flag triggers full spraying from all the spray nozzles or the portion of the spray nozzles covering that region.

The tillage residue techniques include methods to emphasize an image versus a background, erosion and dilation of nearby pixels around pixels generating the highest intensity. With fast processors these may be added to the aforementioned procedures. Otherwise, these and more precise leaf shape identification are left to post processing (away from the field) in order to cross check or fine tune the different procedures applied to the images. The leaf shape identification is optionally exercised if the vehicle is traveling slowly. Thus, in some embodiments, the vehicle speed triggers which procedure is exercised. In some embodiments, the leaf shape identification system is implemented as a negation-procedure (e.g. NOT corn leaf shape, or NOT soy bean leaf shape, or NOT wheat leaf shape). As such, anything not considered to be the targeted shape, would be sprayed.

The threshold settings for these triggers may be adjusted depending on how weed-prone a field is. For example, a relaxed trigger threshold is selected if there are many weeds or if the farmer wants to reduce the risk of weed spread. Alternatively, a more stringent threshold is selected if a farmer wants to reduce the amount of spraying or if there are few weeds and lower risk. To reduce false triggering (e.g. electronic noise), the intensity of pixels adjacent to the triggering pixel are checked. Other embodiments include building in hysteresis, filtering, averaging or multiple checks for the comparator electronics or software procedure, spanned over two or more clock cycles.

Example Targeted Methods for Fungus Monitoring and Control

A method for controlling fungus includes identifying the existence of fungus on the leaves and then spraying that area to prevent the spread of the fungus. In some embodiments, fungus identification include inverting the procedures: instead of looking for green objects against brown or yellow, the method entails looking for hints of brown or yellow on green (i.e. leaves). In other embodiments, there are methods to detect other forms of discoloration (e.g. powdery white) or leaf retardation or unexpected shape or stunted height. For these example embodiments, the location of the crop row is first identified such as from GPS planter records, auto-track, a straight line fit, or a method such as described in U.S. Provisional Patent App. No. 62/088,235, titled "Scouting Systems." Instead of crop row, other embodiments identify repetitive patterns of clusters to locate the crops. Green clusters (i.e. leaves) are first identified such as by the method described above (highest intensity single pixel is used as the seed to look at adjacent pixels). Once the crop location is identified, the image array elements that are associated with the crop leaf positions are analyzed. In the circuit or software instructions for weed identification, the threshold values for "green" and background values are swapped to provide candidate fungus identification among the clusters (leaves). To prevent fungus from spreading, some embodiments start the release of fungicide from the spray nozzles even before the vehicle reaches the location of the candidate fungus. In addition, a swath of spray nozzles may be turned ON, and then not turned OFF until the sprayer vehicle travels several yards or meters after the location of the identified candidate fungus.

In other embodiments, the location of crop rows are identified by using a procedure similar to identifying traffic lanes; for example, by recalling stored maps of crop location where the seeds were planted and width between crop rows, using GPS data and estimating the location of the endpoint horizon (e.g. the vanishing point) to determine parallel rows with the known width between crop rows, using the captured image to determine color differences between crop plants and the valley (shadow or color change) indicating the field strip between crop rows, or a combination of the methods.

As another example, plants and crops have an expected shape and size that can be stored in memory (e.g. storing expected height or several 2D coordinate points that outline a leaf shape). This stored expected-pattern is compared with the detected plant leaves and plant height in the strip of land where the seeds were planted (crop row). If the shape or height does not match the expected shape, this is often an indication that something is wrong, not enough nutrients, a fungus, or the leaf is not the planted crop but a weed. Upon such determination, a fungicide or fertilizer or herbicide, or some combination may be applied to the plants. If the fertilizer is a type that also feeds the growth of fungus and weeds, then fungicide and herbicide alone are applied.

The foregoing paragraphs have been focused mostly on images related to two dimensional issues, things on the ground. But in some embodiments, the ground elevation plays a role in determining the best action to take or how the elevation affects the crop yield. For instance, if the ground is part of a "valley," the soil tends to collect more e.g. water and herbicide and the crop yield there may not be as good. Some agricultural tasks or vehicle tasks (e.g. adjusting a tilt or the image sensor units 50, adjusting the spray angle by adjusting the boom height or rotating the spray nozzles) relate to a three-dimensional issue, and the ground elevation or altitude should be considered in addition to the two-dimensional area or location on the ground. In some embodiments, the crop field terrain is already a priori stored in memory of the controller memory of the vehicle—during the first pass through the field, a vehicle already recorded the terrain information based on its position and gyroscope sensors or altimeter. Alternatively, (governmental) databases like google Earth correlate altitude with GPS information that can be downloaded. When the captured image data is uploaded to memory or when it is analyzed by an image sensor unit 50, the ground elevation information is included in some embodiments in the analysis or to correlate with crop yield to determine future practices.

FIG. 10 is an example method to generate 3D images obtained from two or more image sensor units 50, to determine distance, depth and/or height values. A virtual image grid 100 is associated with the captured image to determine the vanishing point or horizon line. When the captured image of the horizon line of the ground goes above or below the expected or calibrated horizon line (labeled "Horizon Divide" in FIG. 10), then the elevation of the land is presumed changed. The amount of change above or below the Horizon Divide determines the amount of change in the ground elevation from a default height. The magnitude of the change is determined based on a priori calibration that correlates known elevation changes with a scale in the image grid 100, similar to the calibration performed to gauge a distance or depth using the calibrated scale in the image grid 100. In some method embodiments, the vehicle controller react and adjust boom height and angle to the landscape before the vehicle gets to the location of the determined depth and height. Additional sensors are optionally mounted on the boom to detect nearby distance to ground and crops. Sensor redundancy on-boom provides redundant information that reduces jerky physical or motion responses. Aside from using captured images, some embodiments include adding ground altitude information that may be obtained through GPS sensing or through governmental databases that coordinate surface location information with altitude so that a vehicle knows whether it is traveling uphill or downhill. Other embodiments include adding crop elevation (crop height distance to ground) information obtained from a previous travel pass through the field, such as based on a measured distance from a vehicle suspension ride height sensor that is mounted to the frame or suspension components of the vehicle, or such as from analyzing a previous imaging map of the field. Then, during an on-the-go pass through the field (i.e. the current pass through), the image sensor units 50 are processing the captured images and searching for changes in either the ground altitude or crop elevation from the previous pass due to new events, e.g. ground damage from a major rain, animal skirmish, and additional crop growth. In some embodiments, the search or analysis is for differences between the ground altitude or crop elevation or current image map versus the image map from previous years when the same type of crop was previously grown.

Example Spray Boom Control

Some spray booms have proximity sensors mounted on the underside of boom sections in order to check the distance between the boom and the ground or between the boom and the crop leaf. The spray boom sections then respond by moving up and down, for example, to maintain a fixed height above the plant leaves or ground height. For articulated booms, the boom sections bend and fold so that the height of each section of the boom follows or tracks the level of the terrain or crop height. By including information from the image sensor or videos, the vehicle or booms are able to look ahead: to anticipate changes in the terrain, hills, ditches, obstacles, and so on. Also by looking forward past the immediate location of the boom, the image sensors in some embodiments, provide information to the CPU to first assess the average height, average color, average mass and other characteristics of the crop. Deviations from the average values are used by the processors to detect anomalous conditions to decide subsequent action, e.g. release spray. The boom and spray nozzles pivot themselves to optimize spray release direction and location. In conjunction, the image processors determine the terrain profile, and the crop height in order to send commands to adjust the boom. Before the vehicle reaches the location, the boom prepares to respond and begins to move the boom sections up or down in height. If two or more lenses are used together to collect images and videos or if stereo image sensor are used, the upcoming terrain is reconstructed in 3 dimensions. The distance and the height of the approaching objects, crops, land are estimated and calculated to determine the magnitude of the desired boom response (e.g. pivoting the joint hinges between boom sections, adjusting the lift height of the floating center frame to which the boom is attached). The proximity sensors mounted on the boom to sense objects substantially below or mostly below the boom add their own information to fine tune the desired boom response. By proactively responding reduces the jerky motion that a boom would otherwise ensue. In some embodiments, since the image sensor/video provide images, the texture or shape of the detected objects are also taken into consideration to determine an appropriate response by the booms. For example, if a moving rabbit or soft objects are detected, the boom height may not need to be adjusted. By contrast, if a ditch or hard object is identified ahead, the boom is poised to adjust its position.

In some embodiments of the boom control, although there are sensors to look ahead (or behind e.g. with the rear view image sensor (e.g. cameras) or videos) or detect surrounding objects, there are also proximity sensors mounted to the boom that are aimed directly downwards towards the ground, covering a forward area within a distance and direction that will be covered by the traveling vehicle and boom. In a stationary reference frame, the proximity sensors would be pointing directly downward to detect a cone area or rectangular area centered directly (vertically) down on the ground. But since the agricultural vehicle is speeding forward, it is in a moving reference frame relative to the ground. Thus, depending on the speed of the vehicle or range of travel speed, the proximity sensors point forward by an angle that is proportional to the speed to cover the area of travel and response time of the boom position adjustment.

In some embodiments, the proximity sensors (e.g. laser) mounted to an underside of the boom include more than one sensor. That is, for each sensor that has typically been only one sensor, multiple sensors are now instead employed in order to provide redundancy and corroboration. The surroundings that were detected by one sensor, now includes multiple sensors so that the results are averaged or are correlated with one another in order to reduce the sudden herky-jerky motion of the booms when only one sensor is mounted to (one side of) the boom. In addition, having multiple sensors provides better resolution and signal to noise ratios (e.g. reduce false reads), and also provides redundancy for failures.

In some embodiments, the proximity sensors are mounted to the external side wall of the boom or to the trusses of the boom so as to have an unobstructed signal detection path towards the ground. In yet other embodiments, the proximity sensors are mounted to a side wall of a wheel of the vehicle or to the lower half of the front fender (or hanging down from the fender) of the vehicle. When the crop height is low and the ground is still visible to the image sensors mounted to the boom, the image sensors capture information about the terrain (e.g. hill), the top surface of the crop and the ground. The computational processors can determine height of the crop, whether the wheels of the vehicle and vehicle will be traveling uphill, downhill, on flat terrain, into a ditch. and command the vehicle and boom to adjust accordingly (e.g. raise or lower or bend boom sections to follow the terrain). However when the crops are larger or packed together so that its canopy covers the ground, the image sensors on the boom may not be able to gauge a ditch or ground terrain changes underneath the canopy. The proximity sensors that are located lower down on the vehicle have a clearer line of sight so as to detect the ground terrain below the canopy. In some embodiments, instead of proximity sensors, image sensors are mounted on a lower part of the vehicle so as to be able to detect or have direct line of sight to the ground and stalks, residue, below the canopy. In order to detect problems underneath the vehicle, some embodiments already include visual sensors (image sensor attachment fixtures) mounted to underneath the vehicle. They can serve multiple functions, to give the operator a visual perspective underneath the vehicle and also to monitor conditions near the ground, the terrain, the soil moisture, close up view of the plants and so on.

Safety

Agricultural practices, tilling, spraying are often conducted into the night. Because some agricultural machinery span a wide swath, it is difficult for the operator to rely on her eyes alone to detect problems, soil or terrain changes. In particular the image sensors have zoom ability or low-light detection ability (e.g. on a smartphone image sensor; or increased signal amplification during low light). The imaging system and framework also alleviates or compensates for operator fatigue. The processors associated with the lenses are programmed to detect certain things and create an alert condition when the condition is detected (e.g. a ditch). Alternatively, the image sensors are used simply to provide images back to the operator. Since they have zoom, low light amplification, color enhancement, contrast features (e.g. by using a re-purposed smartphone with image sensor), the images alone (without algorithms) are useful to the operator so that she can determine what to do. The image sensors can be positioned under the vehicle, on top of the cab, in the rear, and so on.

Crop and Vegetable Yield

Figure 11:
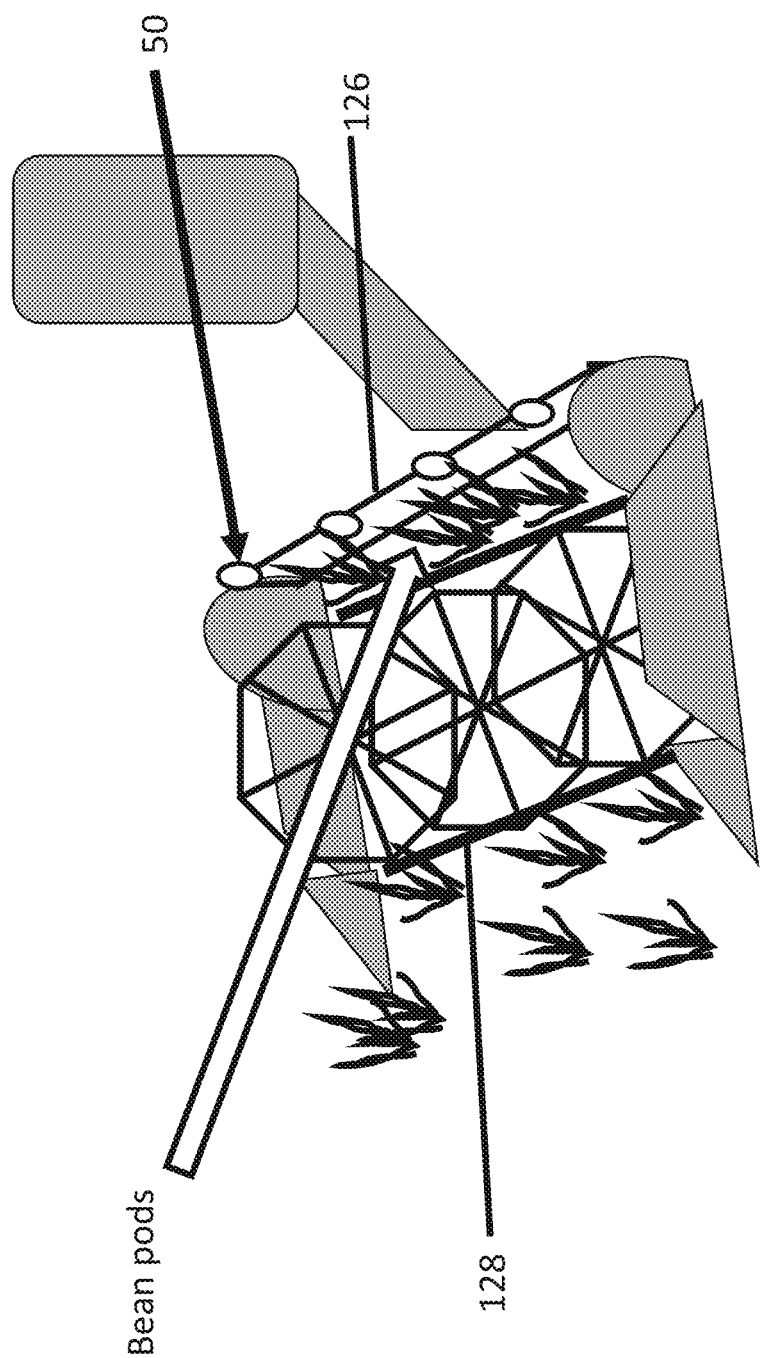
FIG. 11 depicts an example method of real-time image capture analysis and response using sensor units mounted on a top bar of a harvester header for small crops (e.g. soybeans).

One aspect of the invention embodiments is to enhance the crop yield (including vegetable yield) by estimating the size and amount of crops produced in each area of a field. In addition to crop yield, there is also harvest lost analysis that can be performed in real time—if the crop is not being cut or gathered optimally, some of the seeds, vegetables, corn ear, beans, are lost. In FIG. 11, the image sensing units 50 are mounted on an upper back plane 126 of a soy bean cut bar (or draper) behind the reel 128 of a bean header on a combine. In the example of FIG. 11, there is an image sensor unit 50 located above each section of the reel 128 (with four being shown in the example of FIG. 11). A forward and rear view image sensing units 50 (e.g. FIG. 18) have front lens tilted forward to capture image of the beans going into the combine, and rear lens tilted toward the ground to capture image of the residue left on the ground. In example FIG. 11, harvest loss analysis, performed in real time, based on providing an operator the real time visual images to check if the plants are cut appropriately while the operator remains in the cab. For example, an operator can see from the captured images whether the cutter bar rides over plants before cutting them off, stripping plant pods from the plants or leaving them attached to the stubble. Or if the reel 128 is moving too fast or too forward, the soybeans are shelled in front of the combine and fall on the ground without being gathered. Tall, uneven stubble, naked beans and loose pods on the ground indicate that the vehicle speed is too fast or the reel speed is too high—which is observed and analyzed from a ground image capture. Then manual or automated "fine-tuning" of reel speed and position occurs at higher ground speeds of the vehicle (e.g. over 10 mph). In some embodiments, the operator's visual check is automated by the sensor units performing analysis of the pattern of the cut plant, whether the image matches a predicted image for a properly-cut plant or for an expected ground residue image (or detecting if there are naked beans or loose pods on the ground in the captured image, or if the identified stalks are choppy and uneven in height). The decision of the analysis is transmitted to the cab or to the reel 128 to make adjustments or to alert the operator (e.g. different alert levels indicate severity of the problem). Alternatively, instead of the forward and rearward image sensors being housed in one unit, each image sensing unit 50 has only one direction lens with the one shown in FIG. 11 facing only forward direction towards the labeled bean pods. There are additional single lens sensing units 50 mounted on the rear of the combine to check capture images of the ground with the residue and possible lost beans or pods. The rearward facing sensors capture images to check for stubble height and uniformity to determine improper patterns and thus improper cutting. The uniformity in the image of the remaining ground stubble ("residue") also help determine compliance with soil erosion prevention requirements or government regulations.

As residue exits the combine, it is spread out by the chopper. Imaging alerts operators to uneven spreading and adjustments can be made to ensure uniform ground cover by the residue. Automatic adjustment is implemented by a comparison of whether residue pattern differs from expected values, then the reel speed/height are adjusted when the difference is beyond a selected percentage. The percentage of ground stubble can be detected by enhancing stubble color over soil color and/or slender protrusions or stalks over the planar soil in the captured image. In some embodiments, the sensor units 50 also analyze the amount of debris ("clogging") on the reel 128 and periodically raise or spin the reel to de-clog the reel 128. An image of the dark-colored reel 128 (clogged reel 128) in FIG. 11 is compared with the expected color of the reel 128 and the expected openness on the reel 128 to verify clogging.

Figure 12:
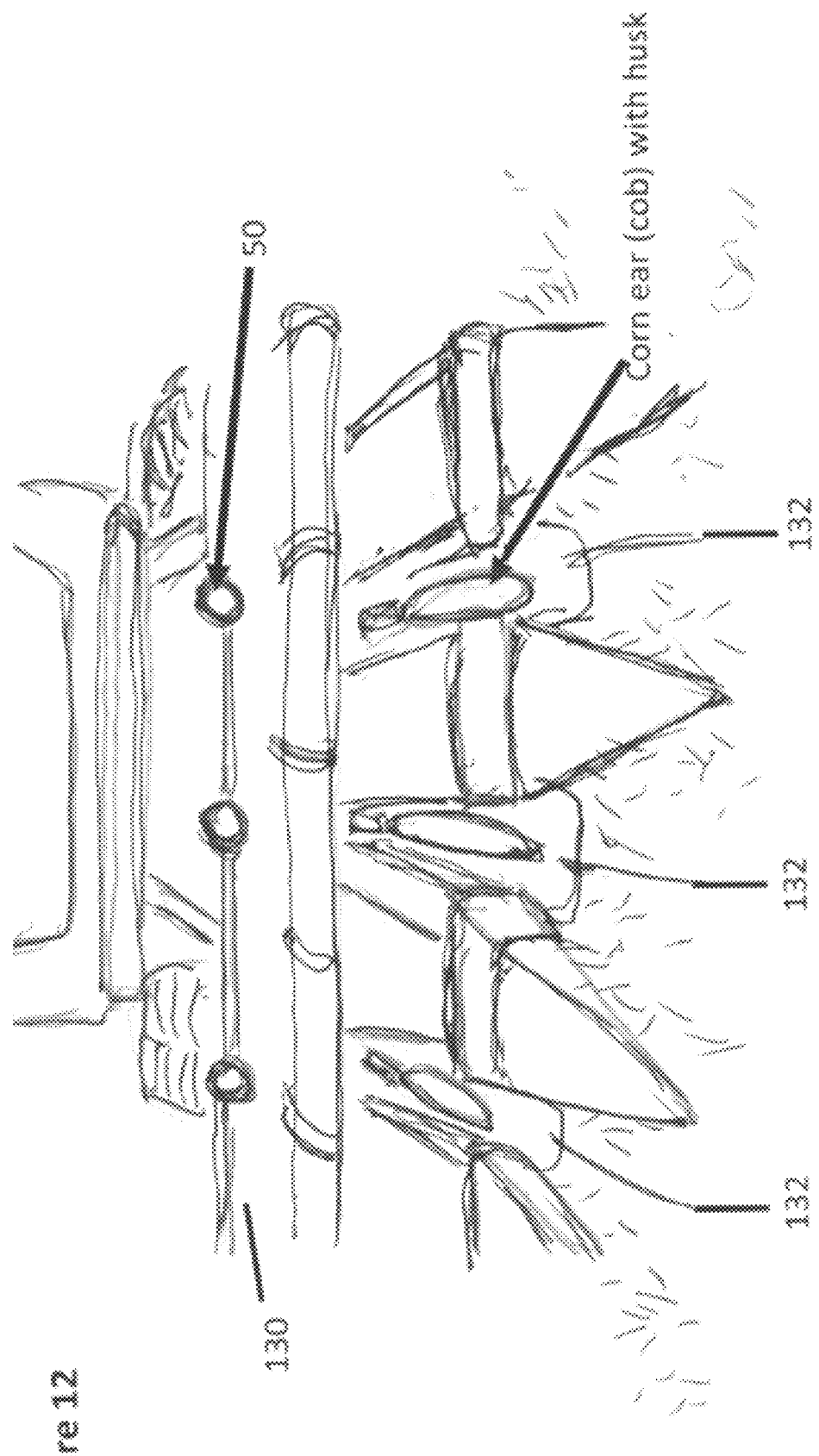
FIG. 12 depicts an example method of image capture using sensor units mounted on a top cross bar of a combine header.

FIG. 12 depicts another example yield analysis, performed in real time or offline, based on counting the number of products (e.g. ears of corn (per stalk)), and estimate of size of each product (e.g. short, thin corn ear versus long and fat). FIG. 12 depicts a front view of corn headers on a combine. Image sensor units 50 are mounted on the top bar 130 of the back plate of the header, spread out so that there is a sensor unit 50 above each gathering point 132. Periodically, as the ears of corn pass through the gathering point 132, the image sensor units 50 capture their image. If the header are not the same color as the corn, the corn is distinguishable even if the entire ear is not identified by a pattern recognition algorithm. For example, one embodiment involves counting the number of corn color pixels. If clustering is added, and even though the husk is on the corn ear, it is thin enough or even peeled off sufficiently so that the size of the corn ear can be estimated.

In other embodiments, the number of corn-colored pixels per image grid is taken as indicative of the size of an ear of corn. The image sensing is performed continuously (e.g. video format) when the resolution is good and a relevant still frame is selected for corn yield counting. For example, the travel speed of the vehicle and the spacing distance between seeds/plants help determine which still frames should be analyzed. In other embodiments, photographs are taken at a rate based on the vehicle speed and plant spacing distance. In some embodiments, the photos are taken at a fixed interval to capture images of every other or every N-th plant or corn ear, then the results are averaged or interpolated for the plant or ears of corn whose image is not captured. Example, mounted sensor units (e.g. camera, solid state LiDAR with accompanying electronics). In some embodiments, the sensor units facing the corn cobs are tilted downwards by 10 to 40 degrees depending on the height of the back horizontal bar and depending on whether broader forward image capture is desired.

Figure 13:
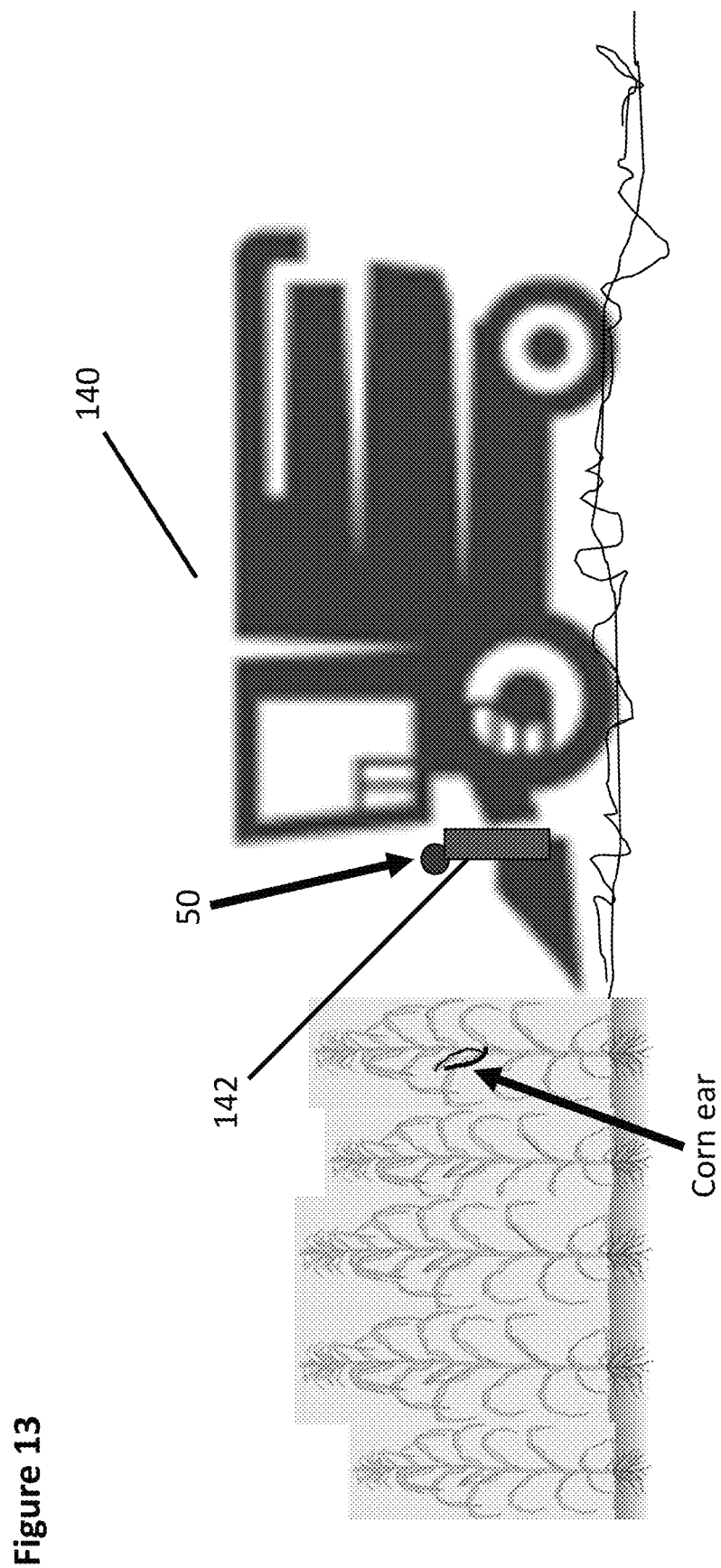
FIG. 13 depicts another example method of image capture using sensor units mounted on a combine header facing standing crops.

FIG. 13 depicts another example yield analysis for corn or crop that is still standing upright in the field, which is performed in real time or offline, based on counting the number of ears (cob) per unit distance along a crop row or per standing stalk, and estimating the size of each product (e.g. corn ear). The height of the corn ear depends on the type of corn seeds that were planted, and tend to range from 30-48 in high. In FIG. 13, the image sensor units 50 are mounted on top of the front plate 142 of the back plate of the header or another front plate (e.g. draper) of the combine 140. The image sensor units 50 are spaced apart so that there is a sensor unit 50 at every 15 or 30 inches or other crop row distance; the sensor units 50 are located above the expected height of the corn earn or at the same height, to capture the image of the corn ears head on. If any corn ears exist, they would be located at predictable region of the image grid, which eases identification of the corn ears. Exposed corn kernels tend to have a different shade of yellow as compared to the corn stalk and leaves (husks), which enables using the kernels as a nucleus for which to identify an ear of corn and to estimate its size (e.g. small, medium or large). Offline analysis permits more sophisticated algorithms, taking into account other factors such as the angle of a candidate corn ear (tilt angle relative to the stalk, e.g. in FIG. 13) or the presence of a trunk at the end of the corn ear (cob).

Figure 14:
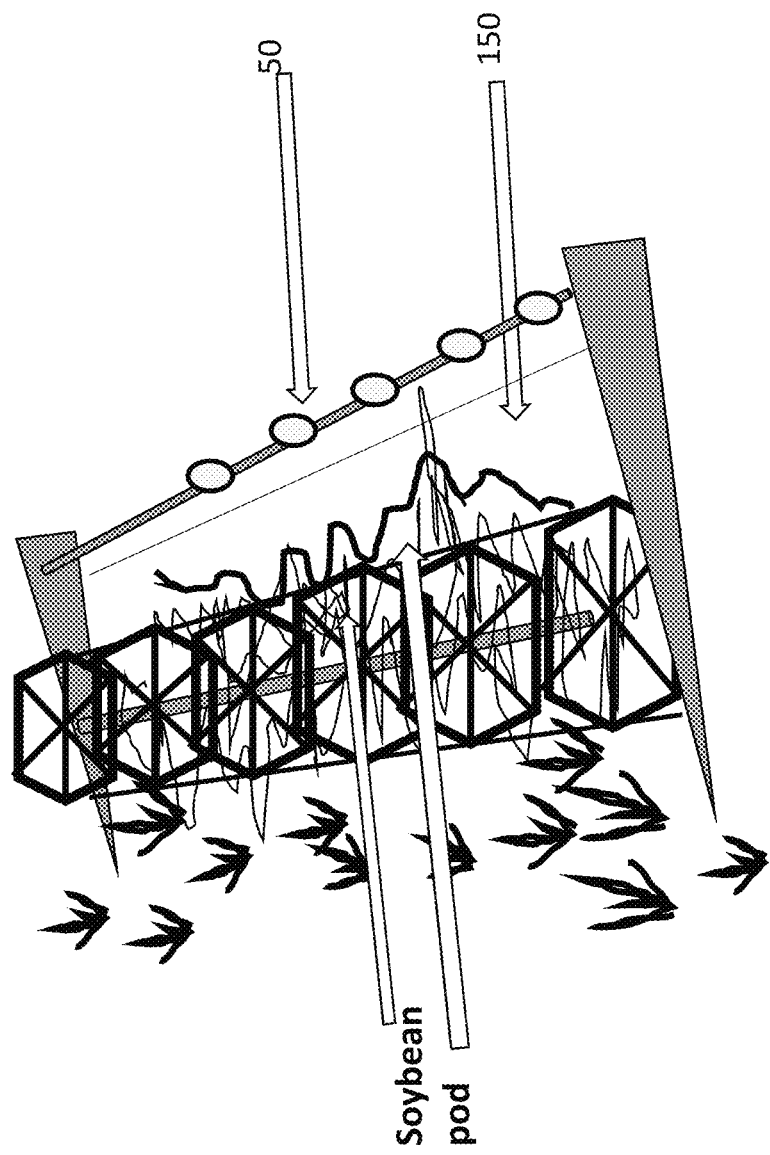

FIG. 14 depicts another example yield analysis for soybeans. The yield analysis is performed in real time or offline, based on counting number of pods and estimate of length of pod (e.g. soybeans) and/or estimate of mass or density content (pod, leaves, stalk) of yellow versus the color of the gathering equipment (e.g. draper header 150), for example, by counting the number of pixels that are off colored or different color from the draper's color: color density difference between plants (e.g. yellow) and the equipment (e.g. black). Example mounting location of the image sensor units 50 includes the upper rear beam that runs the length of a header or draper. To reduce the amount of data collected and uploaded fewer sensor units 50 can be used, especially if a sensor has good peripheral vision. For example, instead of one sensor unit 50 viewing per crop row, each sensor unit 50 captures images of multiple rows.

Figure 15:
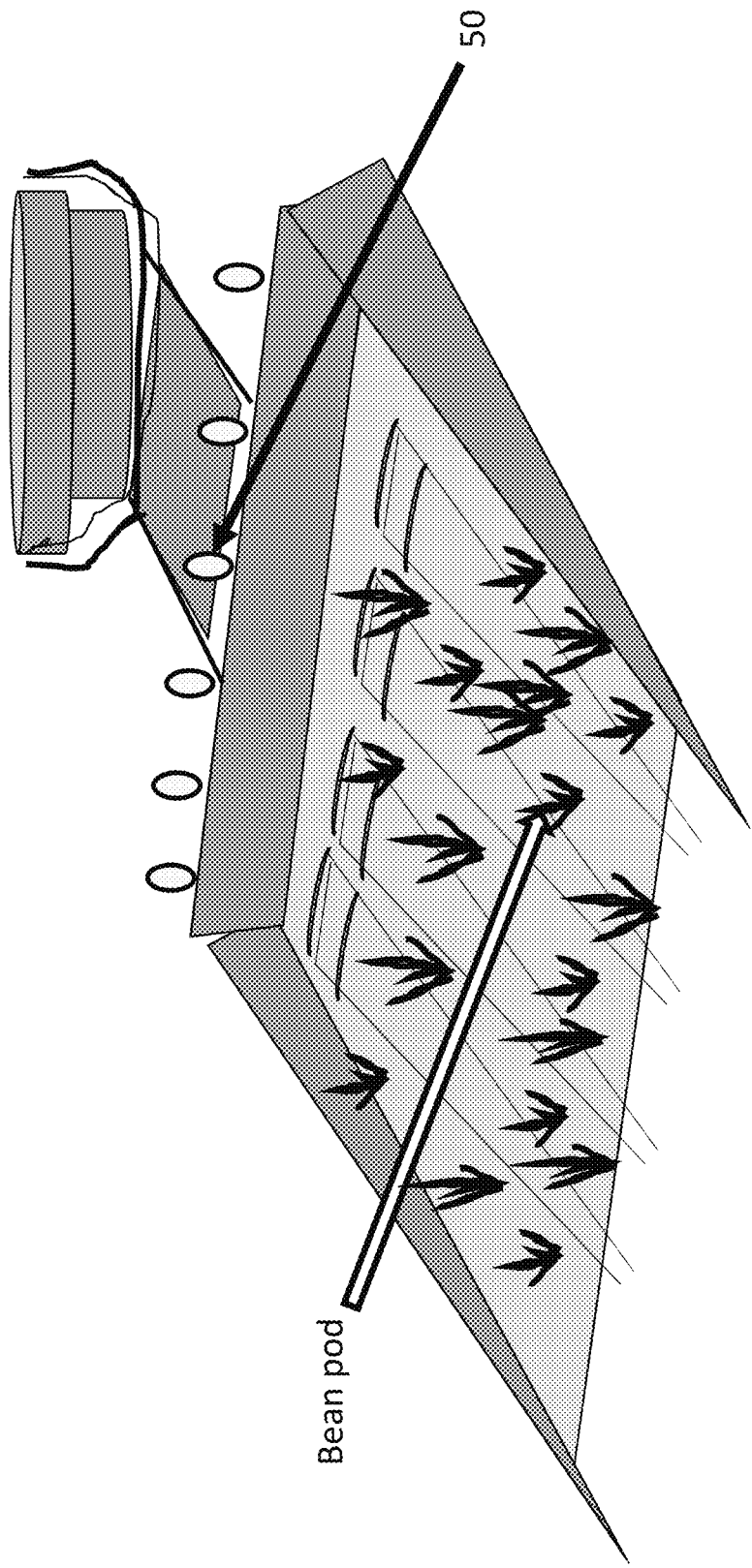
FIG. 15 depicts example method of image capture: sensor units mounted on a platform or plant header.

FIG. 15 depicts another example yield analysis for soybeans that are still standing upright. The particular model of combine header shown in FIG. 15 leaves the stalks standing, with the bean pods on stalks segregated and gathered by crop row. The mounted sensor units 50 (e.g. camera, LiDAR) are used to collect data. The example yield analysis is performed in real time or offline, based on estimating amount of standing tufts or clusters of beans or other small grain products (e.g. rice, wheat) that aggregate near the top of the plant stalk or right along the plant stalk. Other embodiments estimate the mass or density or height content of plant yellowish color versus the color of the gathering equipment. In some embodiments, the yield analysis may be done offline for the crops gathered by a combine. But meanwhile real-time analysis is performed in some embodiments to check for hazards (e.g. ditch) or for level adjustment of the draper headers or other headers.

Aside from corn and soybeans, vegetable also harvesters benefit from having image sensor units 50 mounted above the cutter or header opening to capture images of the head of lettuce, bok-choy, spinach, tomatoes and so on. The size of the head and number of heads determine yield in the same manner as for corn yield. Because the height of the heads are shorter than that of corn and there are no big stalks and husks surrounding the heads, many types of vegetable heads are easier to identify than corn cobs. They are also harvested when they are still very colorful (e.g. tomatoes, lettuce) compared to color of the soil. Tomato vines are cut and the vine and tomato travel up a conveyer belt, where images can be captured (the red tomato is readily distinguished from the vine and conveyer belt). Images captured during the crop cycle of these vegetables are correlated with the vegetable yield to determine best practices for the next crop growth cycle.

Figure 16:
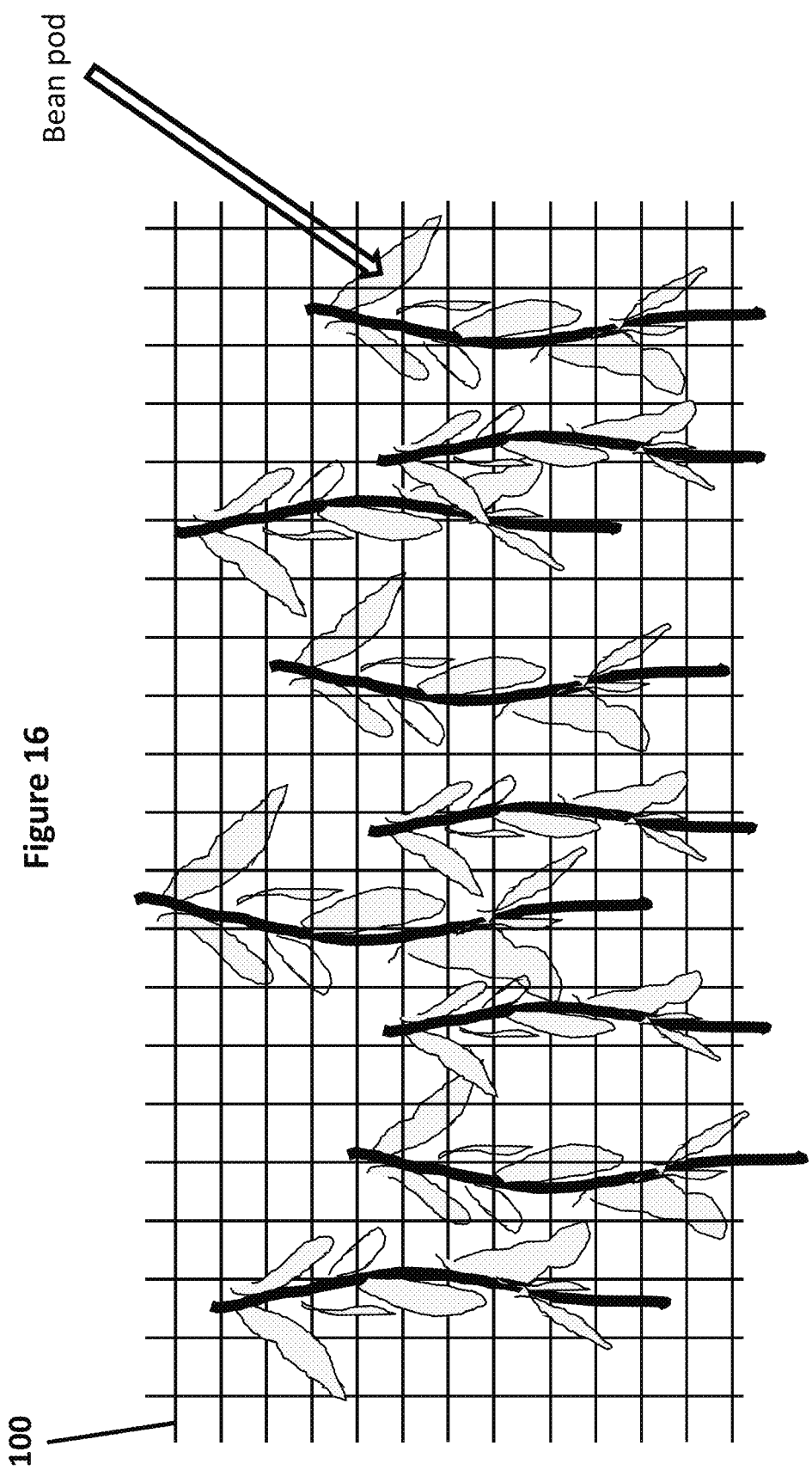
FIG. 16 depicts an example image capture of standing small crops (e.g. soybeans) where the bean pods are distinguishable to provide a crop yield per plant or per several plants in the captured image.

FIG. 16 depicts an example method of how a bean yield analysis is performed, based on a captured image. A virtual image grid 100 is associated with the captured image; grid 100 represents the adjacent image pixels that are grouped together. Yield analysis, performed in real time or offline, is based on distinguishing standing crop plants or on estimate of length of pod (e.g. soybeans) and/or estimate of cluster density content (pod, leaves, stalk) of yellow against color of gathering equipment. Optionally, after finding clusters, estimate length and/or number of seeds or pods in the clusters. Another example algorithm is based on the pods being aligned to a centerline of the stalk and the pods tend to being a shade darker and more massive than the leaves on the same stalk. Since the bean seeds are planted exactly along a crop row, the center of mass of each plant tends to fall along the crop row line where the seeds were placed. This additional data is optionally added to the clustering algorithm to reduce false hits. Yet another algorithm includes verifying the orientation angle and the consistency of the members of the clusters against an expected shape of a pod (e.g. curvature, uniformity of plumpness), before estimating a length of the candidate object that is surpasses a threshold to be determined to be a pod.

Figure 17:
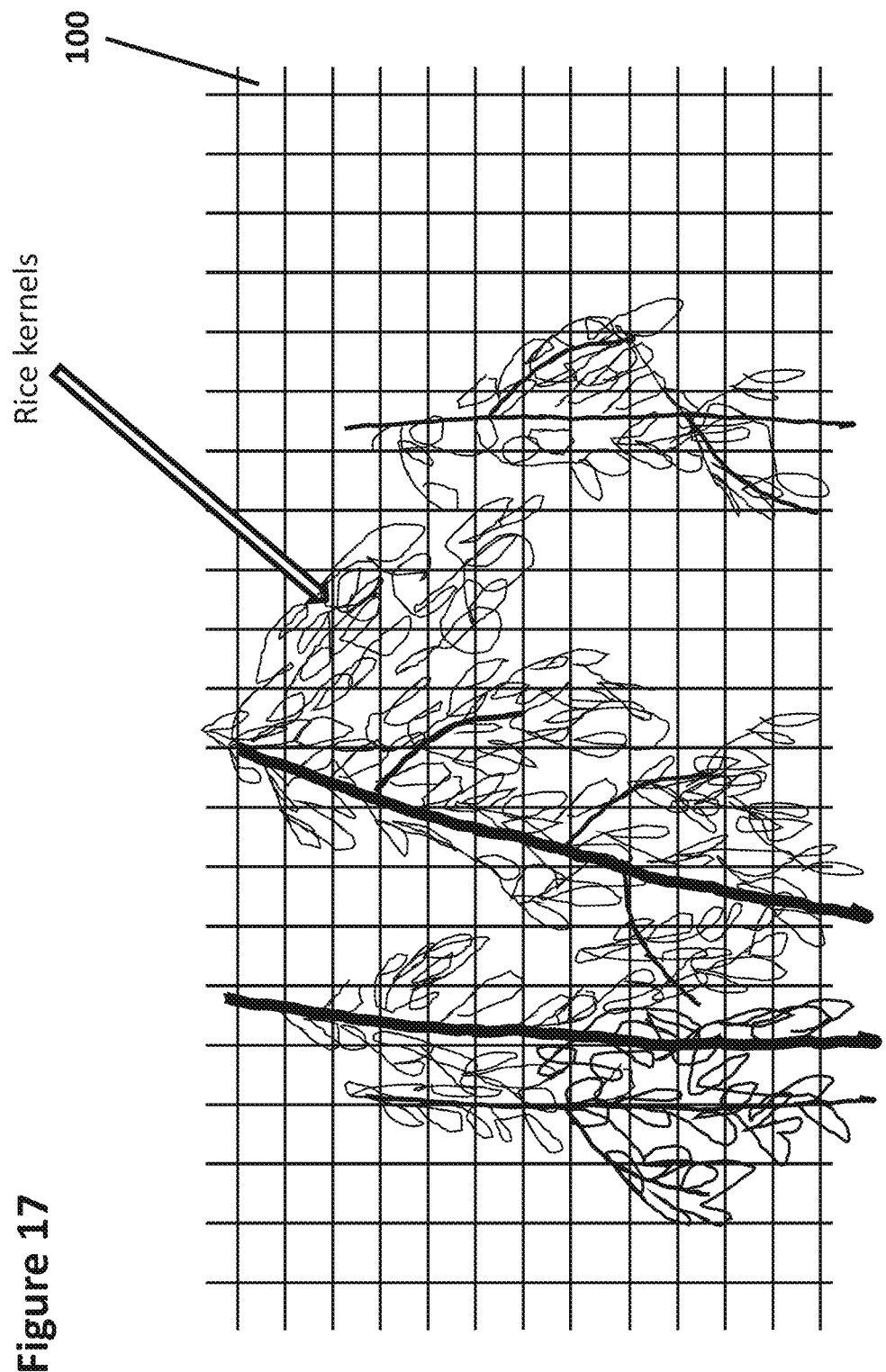
FIG. 17 depicts an example image capture of standing small crops (e.g. rice) where the captured image zooms in a top part of a plant as seen by image sensors on windrowers, rice harvester, and so on, to zoom in on a top part of the plant, optimally, for yield analysis.

FIG. 17 depicts an example yield analysis for small grains such as rice, which is performed in real time or offline, based on counting number of clusters (e.g. yellowish rice grains along a central axis such as the stalk or a crop row) in each square of an associated virtual grid 100. In the example of rice, the stalk is readily distinguished because it is a different color and the rice grains are bunched on the upper part of the plant. Optionally, after finding cluster, estimate length and/or of the rice grain in clusters. To aid in further extinguishing background clusters (on another stalk), the immediate cluster is identified based on the identified rice grains as being larger than a threshold size, or being attached to a largest stalk. In yet another embodiment, the rice yield for a fixed distance or section of a row is counted and it would not matter if the background and foreground rice plants' yield are counted together. Calibration is performed ahead of time to determine the fixed distance covered in a single snapshot or image grid size.

Example Image Sensor Units

Figure 18:
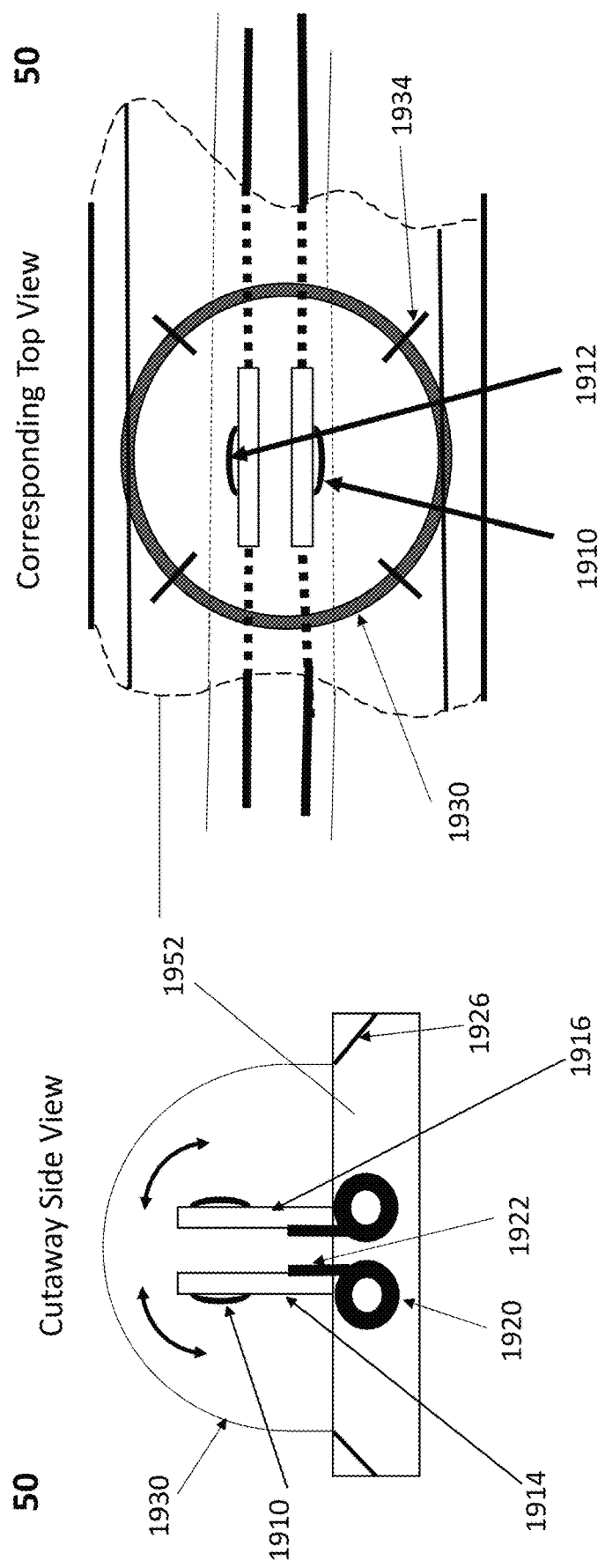
FIG. 18 depicts an example sensor unit having forward and rearward facing sensors each mounted on its own support plate. A cutaway side view and a top view of the sensor unit are depicted. In other embodiments, a tubular shaped housing substitutes for the half dome shaped housing depicted in FIG. 18.

FIG. 18 depicts an example embodiment of an image sensor unit 50, shown in a cutaway side view and a corresponding top view. This example includes both forward and rearward viewing image sensors, 1910 and 1912. Sensors 1910 and 1912 are mounted on their respective electronic circuit boards 1914 and 1916. The circuit board(s) 1914 have a voltage level shifting or current converter circuits to make the signal and power levels compatible with that of the agricultural vehicles (e.g. CAN bus, high speed CAN) or agricultural equipment so that the electric pins are conducting a compatible voltage/current level. The circuit board(s) 1914 have memory circuits to store instructions for the applications and Master applications and processing circuits to exercise the methods. For wireless transmission of signals—these voltage levels are compatible with WIFI, LTE, 5G, and so on standards. The circuit boards have a support stick 1922 to socket into the ducts 1920 or the support stick 1922 is an extension of the ducts 1920. The support stick 1922 have electric traces or pins on them to conduct electrical signals (currents/voltages). Alternatively, the circuit boards 1914 and 1916 have board fingers with metal pins or leads to socket directly into the wiring of the ducts 1920 (e.g. the way circuit boards socket into the backplane signal bus of a chassis). The ducts 1920 are part of the attachment fixture 1952, and they include a hollow to run electrical wires for power and signals or electrical traces to conduct power and signals. Data collected by the sensor electronics are transmitted wirelessly or wired. In some embodiments the ducts 1920 include a pivot joint (e.g. FIG. 23) to tilt the circuit boards 1914 and 1916, in order to tilt the sensors 1910 and 1912. In some embodiments, the circuit boards 1914 and 1916 have an individual protective cover or a case. In other embodiments, the circuit boards 1914, 1916 and the sensors 1910 and 1912 are all enclosed in a housing 1930. The example housing 1930 is half dome in shape and made of a transparent material (e.g. tempered glass, plexi-glass, low distortion clear plastic) and bolts (e.g. without use of tools by turn threading, or rotate and lock into place, or stop turning when guide markers 1934 align), snaps or clamps onto the attachment fixture 1952. Alternatively, the housing 1930 includes a bottom base or stand and this base or stand attaches to the attachment fixture 1952. Some embodiments have a beveled or rounded shelf 1926 so that dirt and debris fall off readily from the attachment fixture 1952. The bevel angle and dimensions of the attachment fixture 1952 do not obstruct and still provide direct line of sight between the sensors 1910 and the targets (e.g. plants, weeds).

Figure 19:
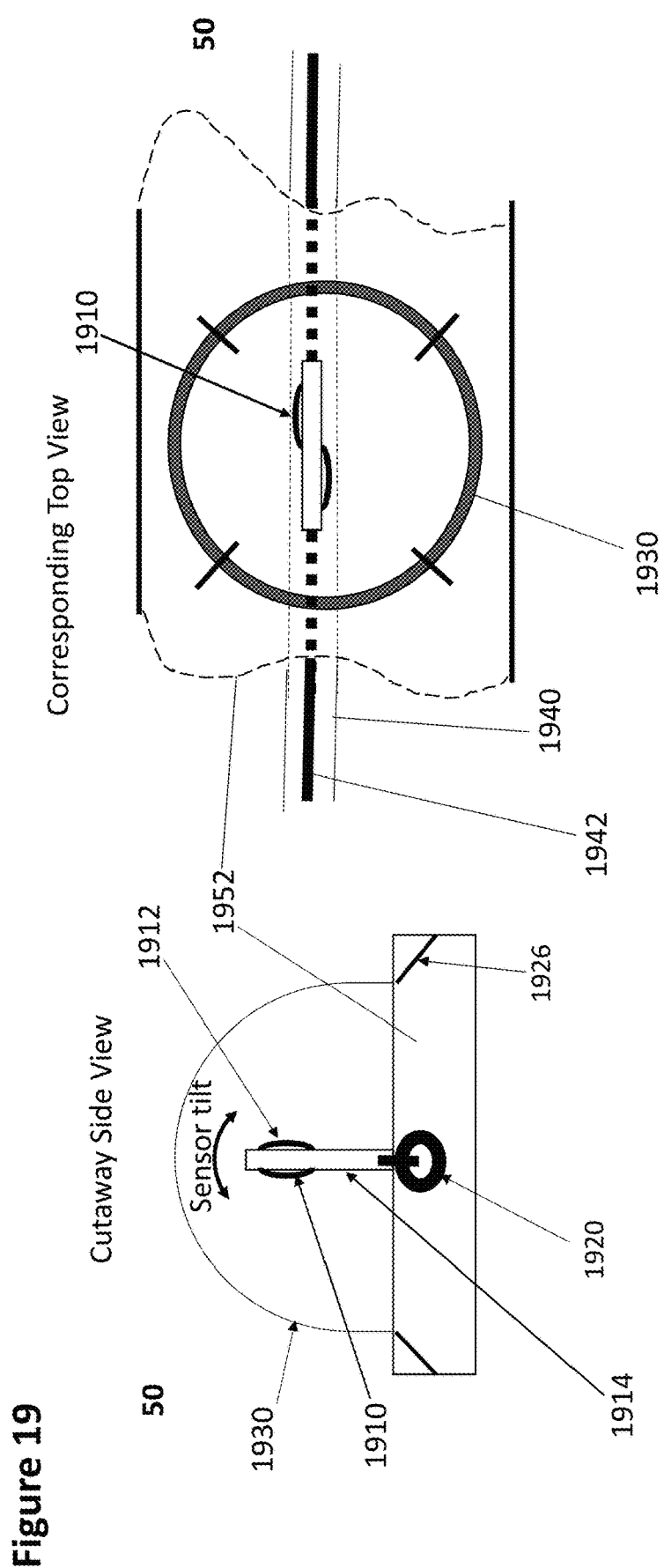
FIG. 19 depicts another example sensor unit having forward and rearward facing sensors mounted on a single support plate. A cutaway side view and a top view of the sensor unit are depicted. The housing is waterproof, see-through, free of edges that obstruct or bend EM or light rays. The selected shape (e.g. half dome) helps debris and dirt to slide off.
Figure 20:
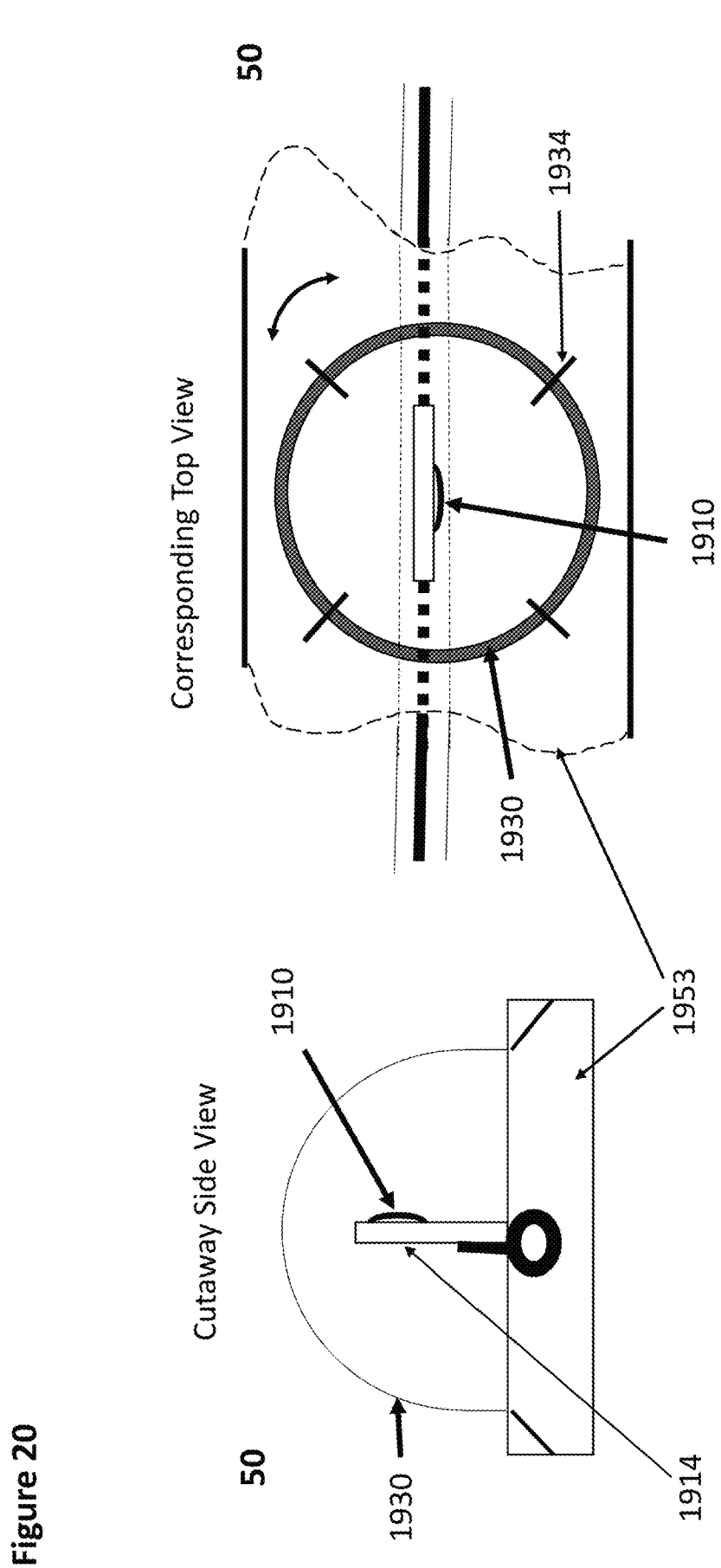
FIG. 20 depicts another example sensor unit having one-sided sensors mounted on a single support plate. A cutaway side view and a top view of the sensor unit are depicted.

FIG. 19 depicts another example embodiment of an image sensor unit 50, shown in a cutaway side view and a corresponding top view. In this example embodiment the forward and rearward image sensors 1910 and 1912 serve different purposes but they are both mounted on the same circuit board 1914. For example, on a spray vehicle, the forward sensors 1910 detect weeds, fungus, row anomalies; while the rearward sensors 1912 detect spray drift and monitor sprayed crops or field. In the example of FIG. 20, the forward and rearward image sensors 1910 and 1912 are offset from each other so that each can pivot about its own axes within the circuit board cutout where the sensors are mounted. Pivotal motion is enabled by micro-servo motors circuits included on the circuit board 1914. In another embodiment, MEMs sensor devices are used and pivotal motion is enabled by MEMs pivot gears. In FIG. 19, the other labeled elements are similar to those described in FIG. 19. The bar or surface 1940 represents any of the surfaces of the agricultural equipment that are shown for example in FIGS. 1, 14, 15, 25, 26, where the attachment fixture 1952 or image sensing units 50 are mounted to the surface 1940 (e.g. back plate of draper) of the vehicles. In some embodiments, the signal wires 1942 from the attachment fixture 1952 travel along the surface 1940, or underneath the surface 1940.

FIG. 20 depicts another example embodiment of an image sensor unit 50, shown in a cutaway side view and a corresponding top view. This is an example embodiment of image signal sensing in only one direction; the sensor 1910 faces only one direction. There is a housing 1930, an outer protective half-dome cover made of plastic or tempered glass. The sensor 1910 and electronics boardlet 1914 are first mounted on a base 1953, then covered by the half-dome cover housing 1930. The half-dome snaps into place (e.g. divet, detents), or the half-dome cover is screwed into place (e.g. threaded like light bulb) until the marking guides 1934 align. In some embodiments of these examples of FIGS. 18-20, the housing 1930 has anti-reflective coating to reduce glare or color or material index adjustment to reduce glare. Also, in some embodiments, the attachment of the housing 1930 to the base 1953 includes apertures with filters so that moisture buildup within the dome is reduced, but dirt and residue are prevented from entering the housing 1930.

Figure 21:
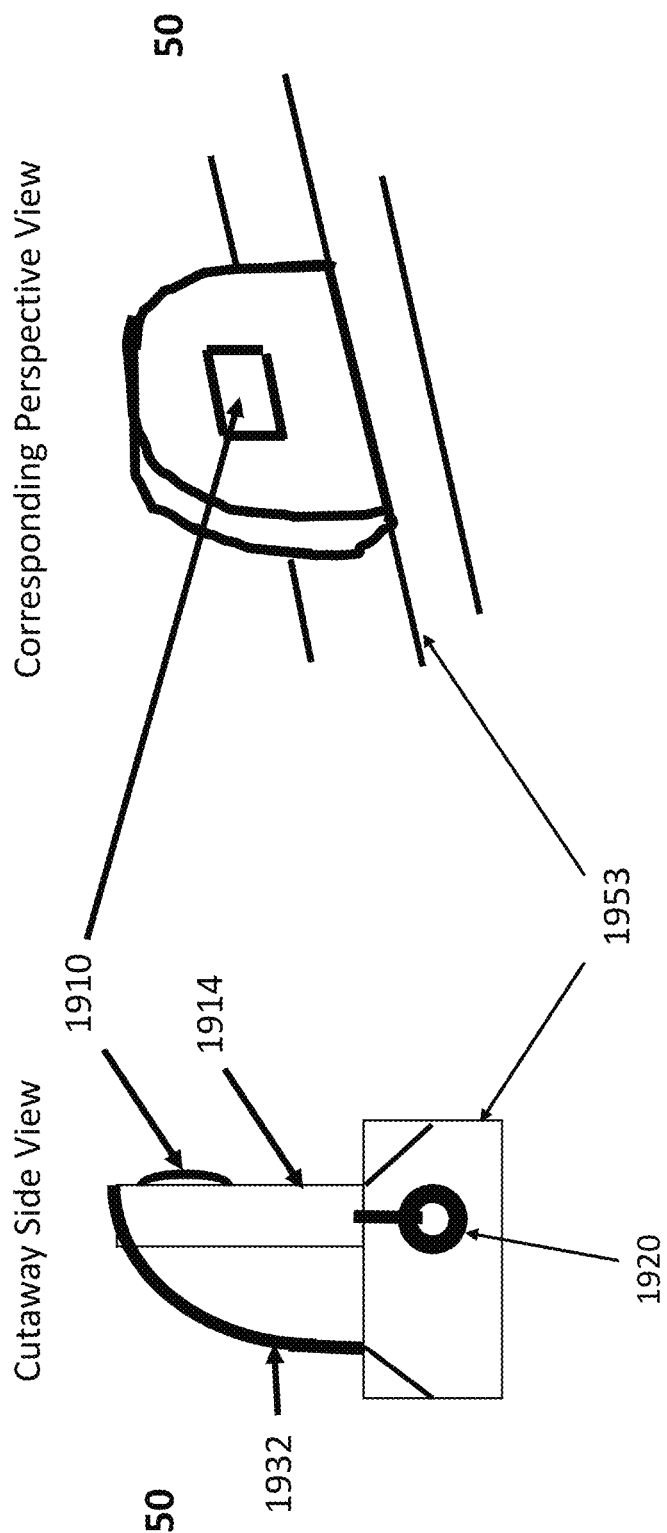
FIG. 21 depicts another example sensor unit having one-sided sensors mounted on a single support plate. A cutaway side view and a top view of the sensor unit are depicted.

FIG. 21 depicts another example embodiment of image sensor unit 50 involving image or other signal sensing in only one direction. Sensor 1910 is mounted on a circuit board 1914 that is attached to a base 1953. In this embodiment, the circuit board 1914 does not tilt and the wiring or leads/pins from the circuit board 1914 go straight down connect with any wiring running in the base 1953 or in the ducts 1920 of the base 1953. The rear cover 1932 is made of thick plastic or a material is more sturdy than the example half-dome see-through covers 1930 (e.g. FIG. 20). In other embodiments, a planar cover similar to that for smartphones, PDAs and tablets also serve as an appropriate housing. The planar cover should be free of touchscreen capability or the touchscreen features can be disabled so that objects in the field do not accidentally cause the image sensor units 50 to respond in an undesirable way.

Figure 22:
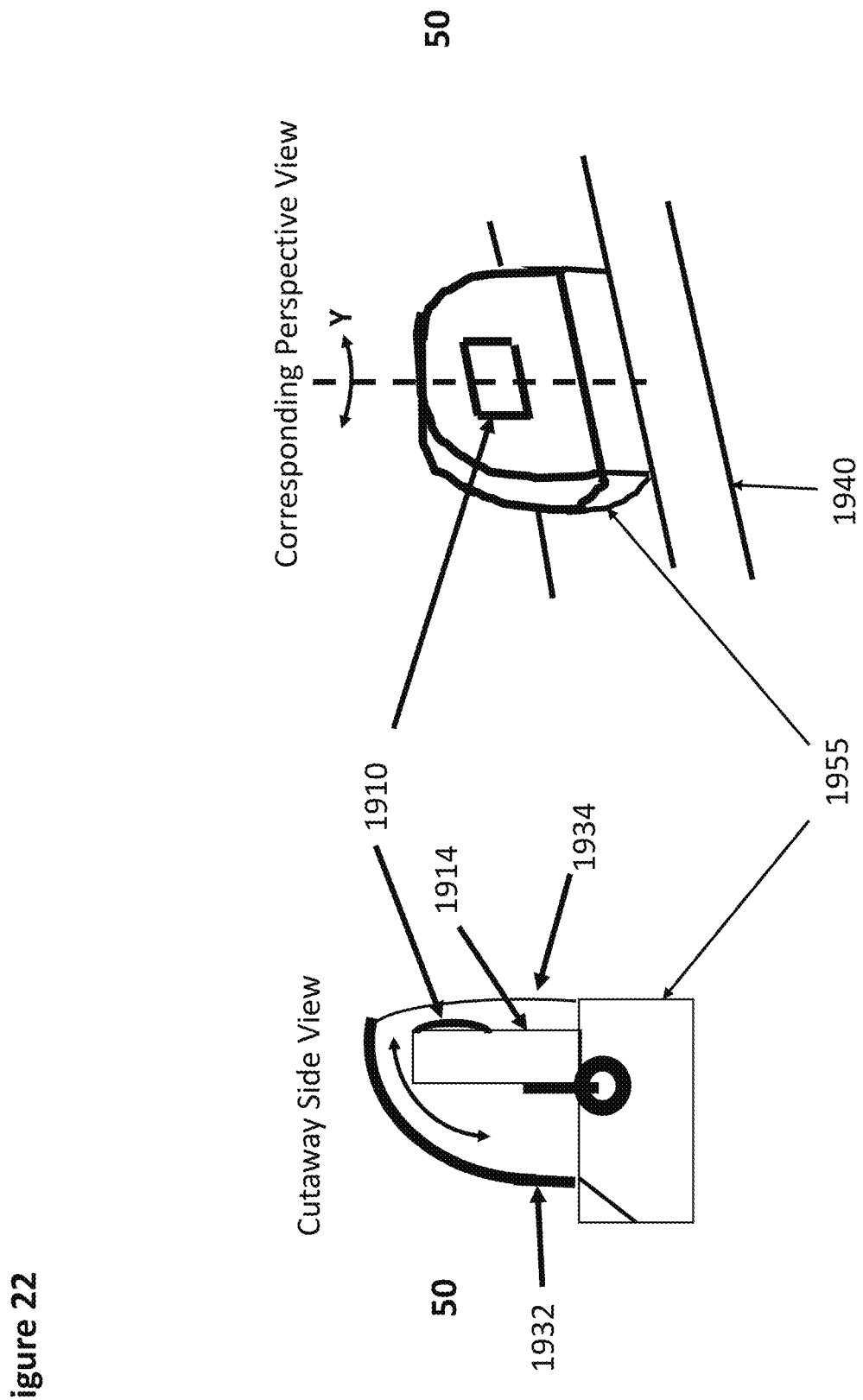
In FIG. 22, the protective housing supports only one side of the support plate. In other embodiments, the housing has other shapes (e.g. box-like, tubular, binocular).

FIG. 22 depicts another example embodiment of image sensor unit 50 involving image or other signal sensing in only one direction. In this embodiment, the rear cover 1932 is made of thick plastic or a material and can be more sturdy than the example half-dome see through covers (e.g. FIG. 20). In addition, there is a front cover 1934 ahead of the sensor 1910 that includes see through material. Further, the sensor unit 50 is able to rotate about a vertical axis Y, and the circuit board 1914 or sensor 1910 is able to tilt back and forth. The image sensor units 50 are mounted to a precise location and tilt angle within a tolerance distance of guide markers or snaps/plugs into a socket. Units 50 are calibrated for distance, lighting, color, and so on to optimize and perform error corrections on an image that is captured. In FIG. 22, the image sensor unit 50 is mounted on a matched base 1955 that shares the same footprint as the base of the sensor unit 50, which is more readily apparent in the perspective view. The sensor unit 50 and matched base 1955 attaches or mounts to a surface 1940 of an agricultural equipment.

Figure 23:
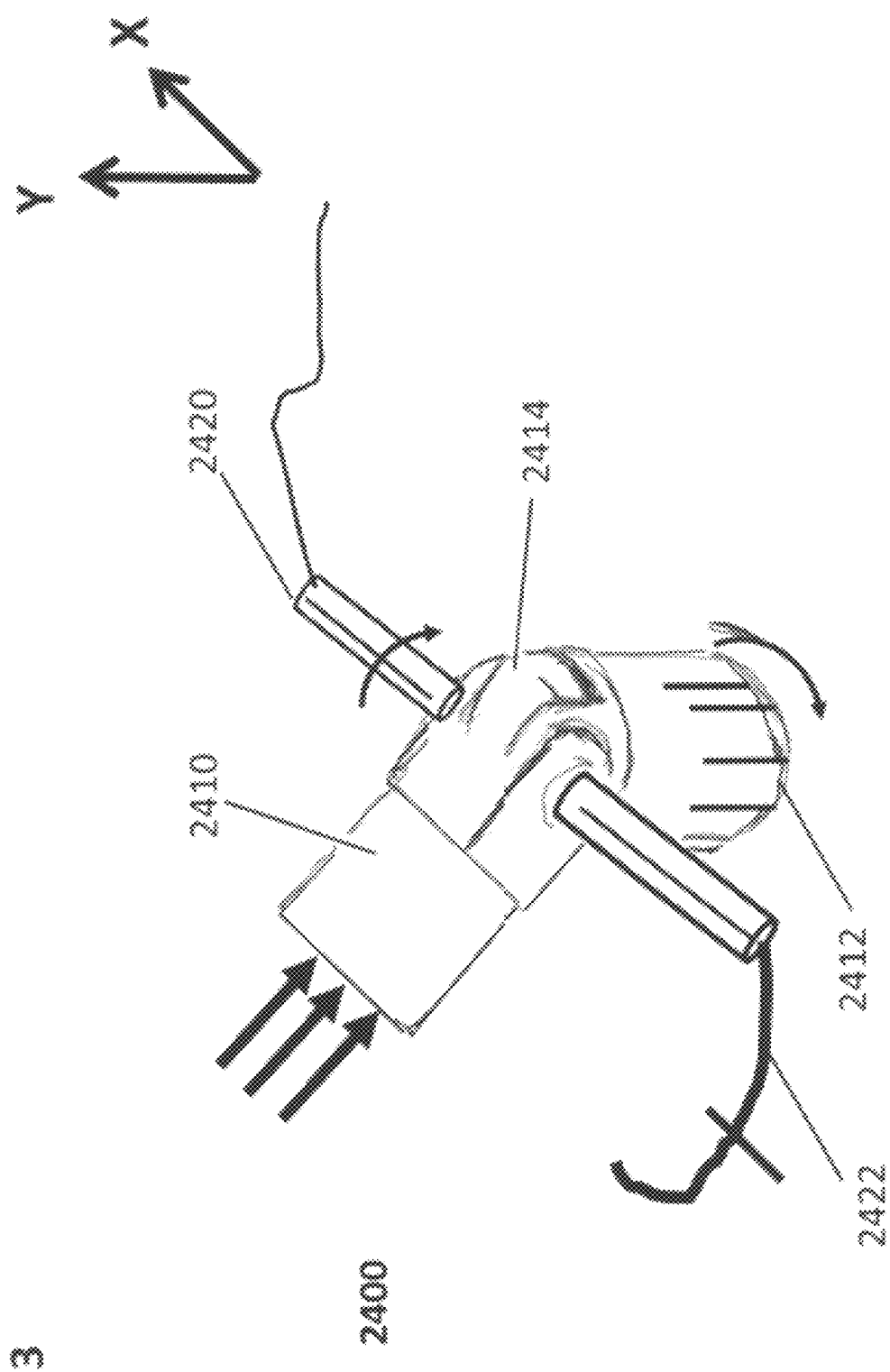
FIG. 23 depicts an example motorized holder to tilt, pivot and rotate a sensor unit or circuit board.

FIG. 23 depicts an example mechanism to tilt (pivot) and/or rotate an image sensing unit 50 or the circuit board 1914. The example pivot joint 2400 includes an electrically controlled servo mechanisms for tilt (pivot) about a horizontal (X) axis and/or rotation about a central vertical (Y) axis. For example, in FIG. 20, the pivot joint in the ducts 1920 can be implemented in various ways, including the example pivot joint 2400 of FIG. 23. The charger barrel 2410 is connected to a base tube 2412 by a bearing or ball joint 2414. The charger barrel 2410 pivots about X axis; and either the charger barrel 2410 or the base tube 2412 rotates about the Y axis. The base tube 2412 rotate about the Y axis when the base tube is inserted in a servo plate. There are mini-rods 2420 that are keyed or fluted to mate to the ball joint or side of the charger barrel 2410 to help pivot the charger barrel 2410 about the X axis. The leads/pins of the circuit board 1914 sockets into the charger barrel 2410; for a more secure fit, in some embodiments, there are notches in the inner wall of the charger barrel 2410. The support stick 1922 or the circuit board leads/pins mate to and insert in the charger barrel 2410. The electrical leads/pins of the circuit board 1914 connect to the bus wire 2422 that are brought out of the mini-rods 2420. Alternatively the power and signal electrical leads/pins from the circuit board 1914 are brought out separate from the pivot joint 2400, and connect to the wiring busses of the agricultural vehicle or other equipment on the vehicle. In some embodiments, the bus wire 2422 also includes power transmission wires to power the circuit board. The bus wire 2422 includes wiring to a micro servo motor to pivot the charger barrel 2410 about the X axis and thereby the circuit board 1914 containing the image sensor 1910.

Figure 24:
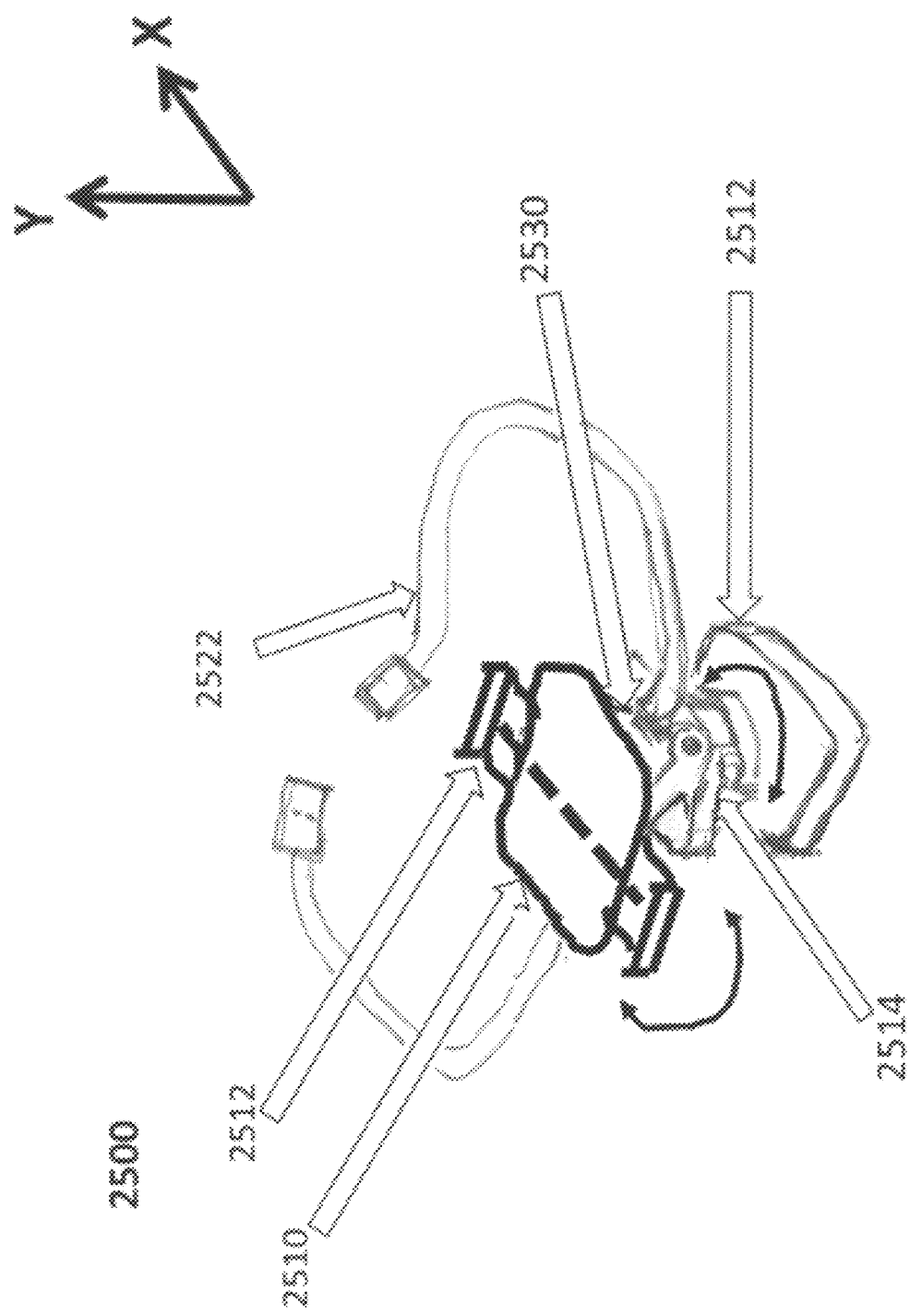
FIG. 24 depicts another example holder to tilt, pivot and rotate a sensor unit or circuit board.
Figure 25:
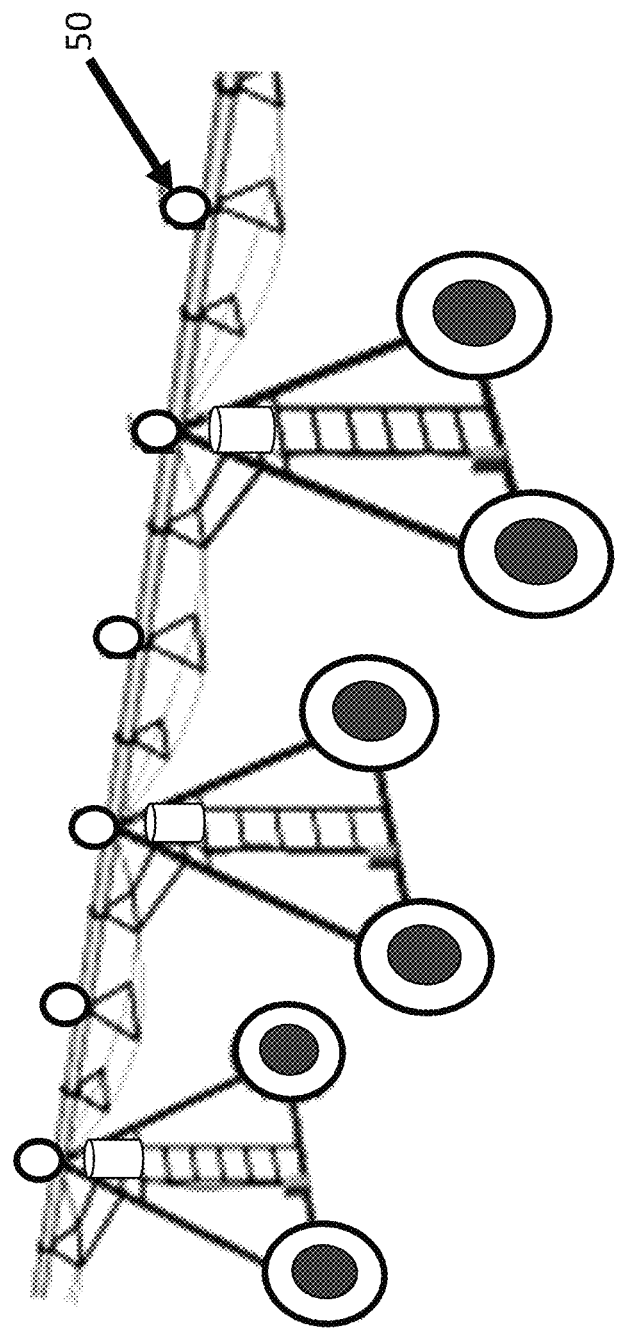
FIG. 25 depicts an example of a self-propelled vehicle (e.g. irrigator or robotic scout).

FIG. 24 depicts another example pivot joint 2500 to tilt (pivot) and/or rotate an image sensing unit 50 or the circuit board 1914. Sensor 1910 or circuit board 1914 is clamped or epoxied to the platform 2510 or grabbed by the arms 2512 above platform 2510. Platform 2510 is able to pivot about the axis shown by dashed line (the X axis). Underneath the platform 2510, there is a cavity 2530 to hold a micro-servo motor to pivot platform 2510. In some embodiments, the pivot joint 2500 also rotates about the vertical Y-axis through the use of a motorized servo plate 2514 that is controlled by the micro-servo motor. The pivot joint 2500 has a bottom plate 2512 to attach to the base of the housing (e.g. 1930) or to attach directly to the attachment fixture 1952. There is wiring 2522 that connects the micro-servo motor to the signal and power bus of the agricultural vehicle, to allow the vehicle or an operator to remotely control the pivoting and rotational motion of the pivot joint 2500 and thereby the motion of a sensor 1910. Wiring for signals and power are brought out separately from the circuit board 1914 containing the sensor(s) 1910, which allows the voltage and current levels to be different from that of the ones used by the micro-servo motor. The signals and power levels from the circuit board 1914 are shifted or start out being compatible with that on the agricultural equipment. For wireless transmission of signals—these voltage levels are compatible with WIFI, LTE, 5G, and so on standards.

Prioritizing Procedures (Computer or Processor Instructions) Within a Targeted Master Application Under each of the Master Applications and other applications, there may be multiple procedures to detect something or to make a decision. If the vehicle travels at 25 mph, this is 0.44 inches per millisecond. To get resolution down to a half inch or an inch, the processing and communication of decisions should be performed on a system having clock speeds much less than a millisecond. For example, if there are multiple individual weed identification procedures, a prioritizing procedure is used.

In some embodiments, all of the individual procedures are performed simultaneously in parallel. If any of these procedures trigger a "yes" decision, then no further analysis is performed and the herbicide spray is released. In some embodiments, the fastest procedure is performed first, or alternatively the fastest couple procedures are performed first, in parallel. If these trigger a "yes" decision, then no further analysis is performed and the herbicide spray is released. In some embodiments. After the first "yes" decision, then no further analysis is performed and the herbicide spray is released.

In some embodiments, an electronic trigger precedes a software trigger—that is, a pipeline of triggers is satisfied before herbicide is released to spot spray a candidate weed. The electronic trigger is set up as analog or fast and simplified so that it will make a fast decision (e.g. in microseconds). If the electronic trigger is not satisfied, no further processing is performed, and the image sensor system and vehicle moves onto the next image. If the electronic trigger is satisfied, then the signal is digitized and sent through a software analysis and trigger. For example, a set of the pixel signal intensity on the green wire (in a RGB set), is an analog signal and is pre-amplified, then input to an analog comparator with a minimal reference signal (or threshold) as the other input. If the green wire analog signal does not satisfy even the minimal threshold, no further processing is performed. In alternative embodiments, where CCD or other image sensors provide digital signals (e.g. digital image sensor) listing information for each pixel, the information related to color are extracted, band-pass filtered and analyzed for green content. In embodiments where calibration is performed, the magnitude of contrast instead of absolute color is another procedure or an additional procedure. The background color (e.g. ground or residue) is contrasted with the candidate signal color. When the contrast passes a threshold, herbicide is released in the area where the candidate object is found.

In some embodiments, the pixel or array/grid element having the highest signal intensity is used to form a center cell around which adjacent cells' signals can also be considered. The center cell and its adjacent cells are considered as a cluster. Triggering off of the cluster (if the cluster's aggregated signal surpasses a threshold) tends to reduce the likelihood of false decisions. For example, a leaf might be large enough that its signals span several adjacent pixels or extended pixels. Alternatively, each member of the cluster may be required to surpass an individual threshold value, and if a sufficient number of members passes a threshold value, then the decision or trigger is consider satisfied. The example cluster method is implemented in mixed-signal and digital electronics or in software. On the other hand, the individual member method may be optionally implemented in analog circuitry.

The partitioning between the electronic circuit triggers versus software/digital triggers for each procedure or Master Application can be set up to automatically depend (unless overridden manually) on the speed of travel of the vehicle. For example, the software or digital triggers may be setup as the default procedures that are exercised when the speed of travel is below 20 miles per hour; and the more-analog trigger is the default if the vehicle is traveling above 20 mph.

In some embodiments, there is also a prioritization of the different Master Applications and other applications based on the vehicle travel speed and operator input as to the importance among the different applications. Unlike Master Applications, the other applications (e.g. collect temperature; calibration) do not involve an immediate hardware response so that these are optionally prioritized last.

Data Processing and Triggers, Further Analysis With High Resolution Images

In some embodiments, the image sensor system causes real time action based on lowered resolution images. In other embodiments for high resolution images (e.g. over 100,000 elements), the image sensor system sends data to the vehicle cab's central computer or to remote servers or to memory so that the data can be further analyzed, a method that is useful for more complex analysis that includes too many instructions to be executed while the vehicle is traveling. Instead of buffering all the data, a trigger is implemented to decide which data should be saved. This reduces the amount of data sent to the server or the amount of data kept by the server. For example, the higher resolution image sensor images can be temporarily stored on the vehicle's central computer, along with the precise location of where the data was taken. Methods in the computer's background process the freshly-collected data. If the fresh data is tagged as interesting, then the data is sent to the server (e.g. cloud) for full blown analysis. Examples of "interesting" data include events where a sum or plurality of the pixel images characteristic is different from the expected color, texture, moisture reflectance or some other designated characteristic. Along with image data, other sensor data and field location data are also saved. The saved data is analyzed by more sophisticated or computationally intensive methods at the server's computer or some computer later in the processing chain. For instance, complex methods include specific leaf patterns or patterns plus surrounding neighbors' characteristics. Other complex methods search for correlations among the pixel images. Along with the location data (e.g. GPS, GNSS, along with RTK (real time kinematic) or A-GPS), the results of the complex methods may be used to make decisions for the next vehicle pass through the field or for a human or an autonomous vehicle to get out in the field to fix the situation.

In some embodiments, there is a pipeline of triggers to decide whether to log the data to the server or to some computer for further processing. For example, the image sensor image data that triggered the real time action are also logged for more detailed analysis or are further analyzed, and should pass another criterion before being logged to the server. This is to triage the amount of data logged. The detailed analysis uses the full set of pixel images instead of the coarse set. This data provides a history log (data set) to help determine next year's crop practices.

In some embodiments, some percentage of all of the data (every sensor, vehicle speed and position, and every image, pixel or array member, i.e. completely unbiased data) is logged so that a secondary or tertiary analysis aids in improving or corroborating (e.g. a cross check of) the initial on-vehicle, real time trigger analysis used to decide the real time action. For example, the software instructions or the circuit thresholds in the initial trigger procedure are adjusted to be more consistent with the decision of the offline, full blown trigger or analysis. The image data can also be combined with data from other sensors (e.g. wind, temperature, moisture, amount of fertilizer or herbicide used) to aid in understanding and improving the farm field or crop yield and lowering costs, and so on.

In yet other embodiments, the data from the video or image sensors (e.g. CMOS imaging chips or integrated circuits) or other sensors are stored locally on-chip memory associated with each processor or sensor. When the vehicle pauses, the locally stored data is uploaded to the cloud server or to a bigger memory storage that is on the vehicle (e.g. in the cab).

Additional embodiments include different image sensor configurations. For example, the attachment fixtures may be designed to be extendable so that they can telescope out to the side of the vehicle or boom. For manufacturing ease, the telescopic attachment fixtures that protrude upwards in the air are very similar or identical to the image sensor attachment fixtures that are mounted to the boom and they are both extendable. With motorized extendable image sensor, the farmer places these "rods" 52 in numerous places or on different types of farming or construction equipment to perform other tasks (e.g. check if the flow in the dry spreaders is moving evenly, if cotton pickers are stuck).

Another embodiment of the image sensor units 50 includes separating the front-back looking capability. For instance, purely-forward image sensor and purely backward-looking image sensor are alternated along the attachment fixture. Or there may be more or fewer forward image sensor instead of rear-looking image sensor. The forward image is detect weeds, and other issues that are ahead of the vehicle, while the back image sensor are for monitoring and taking images to create (prescription) maps. Then on the next round when the vehicle (e.g. spray vehicle or autonomous vehicle) traverses the field, it can address issues identified in the previously-gathered maps. For example, if there are poor growth regions that may need more fertilizer or watering, then the vehicle can spray nutrients and water.

Yet another embodiment includes placing attachment fixtures or smaller attachment fixtures having image sensor system on autonomous scouts (e.g. flying drone or ground scout). Some types of the algorithms (e.g. weed identification, small crops) lend themselves to immediate response while the air or ground scout are traveling over the area. For instance, spot spray or laser zapping can be carried out with the drones. Bigger or heavier tasks are left to the heavy duty vehicles (e.g. sprayer, crop management).

In some embodiments, the adjacent image sensor facing the same direction (e.g. forward looking) are paired together. Alternatively, any two image sensor facing the same direction are selectively paired depending on the purpose and distance of interest (e.g. distance between crop rows, length of the spray boom, or distance of the targeted image from the vehicle). The pairs of image sensor are used together to create a stereo image or to stitch together to create a wider image whose pixels or array elements are then analyzed or searched for some desired object (e.g. fungus or weed). The pairs of image sensor images are also used to estimate distance to a desired object. The image from single images can also be analyzed. If there is overlap between images from adjacent image sensor, the redundancy may be exploited in some embodiments. For example, the redundancy is used to check for false triggers.

The image sensor unit 50 are affixed to attachment fixtures 1952, plate or a platform 52 so that the image sensor are at known fixed distances from one another. Then the attachment fixtures are at fixed locations on the crop management vehicle (e.g. along the spray boom). Distances from the image sensor units 50 to the target area can be calibrated prior to operating the spray vehicle, based on known distances to the target. Since the image sensor (e.g. camera) "rods" 52 (attachment fixtures include other shapes) are portable and may be purchased separately, an operator may elect to get only a few attachment fixtures or even elect to order a different number of image sensor per attachment fixture 1952 from one image sensor unit 50 to a maximum number of units per attachment fixture. Even if there is only one image sensor unit 50 per attachment fixture 1952, the longer plate of the attachment fixture 1952 helps stabilize the image sensor unit 50 from motion of the vehicle from rough terrain or wind conditions.

Alternative Example Implementations

Another embodiment includes the use of re-purposed smartphones electronics where the processor circuits have been re-programmed so that the smartphones perform the different functions in real time. This disclosure is not limited to smartphones (e.g. smart notepads, smart watches). Rather, any electronics instruments having many of features such as on smartphones (e.g. in 2017) can be re-purposed for agricultural monitoring, control and analysis use. The "smartphones" electronics mounted on attachment fixtures may not have the touch screen, but much of the rest of the electronics still remain. For example, smartphones have fast and slower speed communications channels. The LTE, Bluetooth, 5G and WIFI speed processing are suitable and compatible with speeds for weed identification. The voice-band frequencies on smartphones are comparable with fast CAN-bus. Smartphone electronics include two or three processing circuits: DSP, a CPU logic microprocessor, and a Graphics processor unit. The image sensor (e.g. cameras) on the smartphone electronics have front and back lenses, and there are many apps to control the image sensor to adjust for light and color conditions and provide zoom. For yield analysis, especially for beans and small grain types of crops, it is optimal to zoom in on the part of the plant with the seeds. Smartphones are already data-communication ready and have many instruments and applications already built in, such as GPS, inertial sensors, tilt and motion adjust. Smartphone systems also have voice and sound capabilities so that an operator has the feature to hear if something is going wrong. They also include security systems to avoid hacking and are optimized for low power operation. In any case, they have many features that can be adapted to serve as a framework for the image sensor system having a bank of algorithms for agricultural practices. As an alternative, e.g. tablets, laptops, have electronics, image sensor (e.g. camera) and baseline software similar to that of the smartphone. These systems are alternatively adapted to the agricultural applications. The size of the circuit boards from the smartphones, however, is smaller and thus tends to be more suitable for the agricultural framework described herein. For example, without the touchscreen and keypad, the smartphone electronics and sensors (in this case, image sensors) occupy for example 2×3 inches-square depending on the number of phone features, which is readily mounted in a housing (e.g. 1930 and a bottom plate to fasten to a universal attachment fixture 1952) on the spray booms, planter units, and so on.

In other embodiments, a tablet or smartphone including its touchscreen is used when it is cost effective. Either the trouchscreen or voice commands are convenient tools for the operator to check or interface with individual image sensors. Although reference is made to "smartphones" (e.g. Samsung Galaxy S4, Iphone 4S), the term refers to electronics and sensors having attributes like those on the smartphones, including the image sensors, the multi-frequency communications capabilities, the bank of software to correct images, control communications, etc. Tablets, laptops, etc., also include many attributes that a smartphone has and therefore they are also "smartphone-type." Further, for the electronics to work in the bumpy dusty agricultural environment, the printed circuit board is ruggedized and encased and then mounted in a shell with gyroscopes an accelerometers so that the electronics with image or other sensors remain upright. The printed circuit board is re-shaped or shaped so that it and its encasement have a small footprint and protrudes only a little above (e.g. less than 2-5 inches) above where they are mounted to the spray boom, planter etc.

Rather than the smartphone, tablet, and the like, serving their original purpose, they are re-purposed and their embedded processors are re-programmed with instructions to carry out the agricultural crop management procedures. Many of the software already existing on the smartphone-type printed circuit boards and processors remain to serve and support the agricultural algorithms. For example, the software to correct photographs or videos taken by an actual smartphone (e.g. color correction, magnification, light correction) would still be kept because the software is helpful to provide contrast during evening farming and to enhance particular colors (e.g. green).

By including existing smartphone-type electronics in some embodiments saves much time and costs associated with developing the agricultural solutions from scratch, which has been the practice to date (i.e. new electronics is designed and serves as an ASIC, application specific for a specific agricultural management ask). By contrast, smartphone-type electronics are very carefully well developed, and older models are cheap and yet they have desired features. For example, they have fast, beefy processors: CPU, DSP, and Imaging/Graphics processors. They have electronics that is broadband and wideband capable, Wifi, mobile 5G, Bluetooth, LTE that are good for a high speed data bus, voiceband frequency that is compatible with the CAN bus on agricultural machines. They have cameras, front/rear, having many features: e.g. light correction, color correction, and zoom. They are datacomm, protocol ready. They include many applications: e.g. GPS, inertial sensors. They have Video/Motion/contrast/shadow/intensity adjust. They are security ready, power optimized, temperature, ESR, EM, interference ready. Moreover, the bill of materials and licensed software are relatively cheap. For instance, not including the touch screen, the bill of materials is approximately less than $120 USD.

In an embodiment of the implemented product that is sold to customer farmers and operators or dealers, they would purchase the framework (installed on the farm machine) and segments of the sensor attachment fixtures. The customers receive a portable system that can be moved from planter to tillage to sprayer to combine and other vehicles. They save money because they purchase a single set of hardware electronics rather than different, individual products—which is the present practice. They subscribe to only-desired algorithm or methods packages. The overall system is simpler to use because they do not buy and learn different individual products; also calibration and self calibration packages are part of the system—to complete calibration that depends on the environment of the particular farm site. The algorithms and methods have different benefits: improvement of safety, reduction of back aches and eye and muscles strain on the operator trying to see what is happening behind him or out past the machinery, reduction of down-time, improved autonomous operation. There should be an improvement in the crop yield per input dollar spent. The environment is also greatly improved by a reduction in the amount of hazardous materials (e.g. herbicide) sprayed and spread, drift of noxious spray, and the like.

To expand on the procedures associated with FIG. 8, there are other embodiments or additional details related to spray pattern on the ground or spray drift detection. In some embodiments, spray drift detection is coupled with spray overlap calculations for a spray pattern, which predicts the spray that lands on the ground in the forward-rear (fore-aft) vehicle travel direction and in the side-side direction (perpendicular to fore-aft direction). The image of the spray cones that are dyed or illuminated is analyzed (e.g. pattern color and intensity) to determine the average spray envelope of the cone, then correlated with a calibrated envelope threshold value with a known spray envelope (e.g. 90-95% droplets within an envelope) with respect to droplets, using the color/intensity image captured for each particular angle of view of the spray cone. In some embodiments, the calculated or predicted spray cone value is determined and then compared with the detected spray cone to check the validity of the predicted value under different environmental conditions and to improve the spray application methods. A calculation of a predicted spray cone is obtained by using the same procedures as the calculations of overlap for spray painting a surface from a particular height for a particular fan angle of the spray nozzle type (e.g. car industry, "CAD-based Automated Robot Trajectory Planning for Spray Painting of Free-form Surfaces," Heping Chen, et al., Industrial Robot: An Int'l Journal Vol. 29, No. 5, pp. 426-433 (2002)) or from calculating the overlap along the axes of two ellipses (http://mathworld.wolfram.com/Circle-CircleIntersection.html)). In the automotive paint industry, the paint is applied in a closed environment where there is no wind. To accommodate the effect of wind, the calculations are performed first in the stationary reference frame, then the results are transformed into the reference frame of the crop field; or alternatively the comprehensive equation for the calculation already includes the transformation. The spray cone envelope calculations are performed in a reference frame where the effective central axis is determined based on instantaneous wind and travel directions (vector sum of the vehicle travel velocity and wind velocity) with respect to the ground. In some embodiments, to reduce the complexity of the calculations, only the slice of the spray cone that is projected to land on the ground, the cone envelope vectors transverse to the central axis (but parallel to the ground) in the fore-aft and side-side directions and transverse drift relative to that effective central axis. Some embodiments apply an assumption of a symmetric cone about the effective central axis, obtain the planar slice of cone parallel to and landing on the ground for a particular height of the spray nozzle off the ground, transform the vectors back to stationary frame of the ground to get the predicted drift of the spray in the fore-aft and side-side directions. Briefly, the effective rest frame central axis is determined based on the effective wind direction and vehicle travel direction. Compute the parallel and transverse drift relative to that central axis. Transform back to the ground frame of the crop field to get amount of spray and pattern on the ground. To reduce the amount of computation, some embodiments project the vectors and calculate along only two dimensions (e.g. the "fore aft" direction, and side-to-side direction). Yet another embodiment project the vectors and perform calculations along the two axes parallel and perpendicular to the geometrical boundaries of the field in order to assess if the spray has gone beyond the boundary or if the spray pattern on the ground indicate uneven coverage ("skipping"). Aside from using the ellipse or paint overlap models, the calculation simplification and frame transformation methods can be applied to using other spray models, e.g. the plume, Silsoe, AgDrift, AGDISP models. The results of the calculation is sent from the image sensor units 50 to the vehicle cab or to the associated spray nozzles or spray boom section controller to adjust the spray release. For smaller vehicles, the computer or controller in the cab performs the calculations and revise the spray released from the boom sections or nozzles.

If the spray is skipping and not properly or completely covering the ground (i.e. lacking sufficient spray overlap on the ground or overly-overlapping), the fan angle of the spray nozzle is either narrowed or increased to adjust for spray drift or spray pattern in addition to changing the pressure and droplet size of the fluid. Additionally or alternatively, in-tube chemical additives can be directly injected into the spray nozzle on the fly into the original liquid (e.g. herbicide) to adjust its cohesion and dispersion properties. Example spray nozzles have adjustable partitioning doors, valves, or "blinders" that are remotely controlled to close or open to adjust the spray fan angle in the side-side and/or fore-aft direction. In other embodiments, different spray nozzle tips are rotatably and pivotably mounted on a spray nozzle unit, for example using the same mounting devices like in FIGS. 23 and 24 to remotely select a different spray tip or to tilt the present spray nozzle or nozzle tip.

In yet another embodiment, the calculated predicted spray drift are compared with the detected spray drift based on a color image (e.g. spray dye of the end units). If the predicted and detected spray drift pattern on the ground agree to within a predetermined threshold (e.g. 85 to 95%), and over-or-under spraying or drift is found, the spray nozzles or agricultural vehicle take corrective actions and/or alert the operator. For example, the spray nozzles are raised or lowered, a different spray nozzle is rotated in place, the spray release fan angle is increased/reduced, the spray pressure is adjusted, direct injection of other substances take place, and so on. This is method is especially useful for the spray nozzles where the spray is not dyed or foamed.

In some embodiments, regardless whether spray drift or weeds are detected, the calculated amount of spray released from each nozzle is recorded and correlated with a position in the crop field. The calculated amount of spray is calculated based on the fluid flow rate, the fluid pressure, location of the nozzle along the spray boom, wind velocity, and the vehicle travel velocity. These information, together with a spray pattern calculation, the amount of fluid landing on the ground is predicted and correlated with a position in the crop field. This spray information is then correlated with the plant yield or crop yield data for each specific location that was gathered and uploaded for offline analysis. The correlations with the crop yield help determine best practices for the next crop cycle (e.g. whether to reduce or increase the amount of herbicide, fertilizer, and so on) for each location in the crop field.

Any of the aforementioned sensors (image sensors, microwave, proximity) interfaces with and plugs into the local framework electronics and suite of algorithms (e.g. a local computing device including a smartphone type electronics with stored instructions), where the sensor signals are amplified, digitized then analyzed, or amplified and trigger a comparator, or the amplified information is stored for subsequent processing. Based on the analysis results and decision whether there is e.g. too much residue, existence of weeds or fungus, the agricultural machine responds by adjusting its aggressiveness (e.g. to leave or overturn residue), by spot spraying the plants, raising the spray boom, and so on. One embodiment of the local framework includes a smartphone-type electronics having at least the forward-rear image sensors. The smartphone-type electronics (e.g. Samsung Galaxy, Iphone) have many electronic circuit attributes that can be revised and then adapted specifically to the agricultural environment. For example, the multiple processors of the smartphone are re-programmed to serve the purpose of the agricultural methods and procedures. However, the imaging type of software already found on many smartphone-type electronics are kept; for instance, the software that corrects the color of the images taken by the camera or video is kept to be applied to the agricultural algorithms. Multiple crop management agricultural algorithms are programmed into the memory associated with the processors on the smartphone-type electronics, forming a framework. Multiple local frameworks are mounted to a stationary structure (e.g. attachment fixture) for easy transfer from machine to machine.

The example sensors capture information periodically (e.g. camera, one image at a time) and/or capture information continuously (e.g. video, continuous images). Periodic capture of data reduces the memory and processing overhead; on the other hand, continuous capture of data reduces possible issues with motion jumps and eases synchronization to stitch frames together, to remove shadow and glare, to correct for tilt etc. Even in some embodiments where the sensors are operated continuously, specific frames are grabbed during the data acquisition of the sensor data. The sensor follows the motion jumps and two or more sensors are operating simultaneously at a fixed distance on the attachment fixtures or other platform. Depending on the situation (e.g. rough field or smooth field, night time versus day time, purpose of application, speed of travel), the sensors are operated in either one mode or the other.

FIG. 25 depicts an example application on other vehicular equipment such as an irrigator where the image sensor units 50 are mounted to an upper side of the fluid carrying pipe. In this example, the sensor units 50 are spaced at every other crop row 12; irrigators travel slowly (e.g. 3-5 mph) and there is plenty of time to process the images and to issue decisions and commands to an associated spray nozzle. The captured images are analyzed in real time by the circuits and processors on the sensor units 50 so that the irrigator responds, e.g. by slowing down, spraying more or less fluids, perform direct injection, performing spot spray or re-positioning a nozzle to reduce spray drift and so on. In some embodiments, the sensor units 50 not only pivot and rotate, but control each spray nozzle; each nozzle is mounted on a servo fixture such as shown in FIGS. 23 and 24 in order to pivot or rotate the spray nozzle to point the spray tips in a particular direction. In other embodiments, the captured image signals are uploaded to a remote operator who then controls the irrigator, fluid flow, fluid-content mixture (in the tank or at the nozzles) and nozzles remotely. The sensor units 50 get their power from the main power source that is operating the irrigator; so the power and signal voltage levels from the sensor units 50 have level shifters to make the levels compatible with those of the irrigator. For wireless signal transmission, the voltage/current levels are made compatible with that of 802.11, LTE, 5G, or other standards.

As an example of another vehicle, such as for monitoring the health of vegetable types of crops, detecting weeds between plants along the crop row, or checking the underside of leaves (e.g. for aphids), and sampling for moisture content or water shortages, a short vehicle or a robotic scout (e.g. small wagon or truck that straddles a plant or fits between crop rows) that travels down the soil path between the crops. The robotic scout has the height of the crop leaves (e.g. 1 to 3 feet tall) or include lower arms or wagon platform to hold sensor units 50 that look upward at the leaves. The robotic scout includes image sensor units 50 and also battery packs to energize the scout and sensor units 50.

Figure 26:
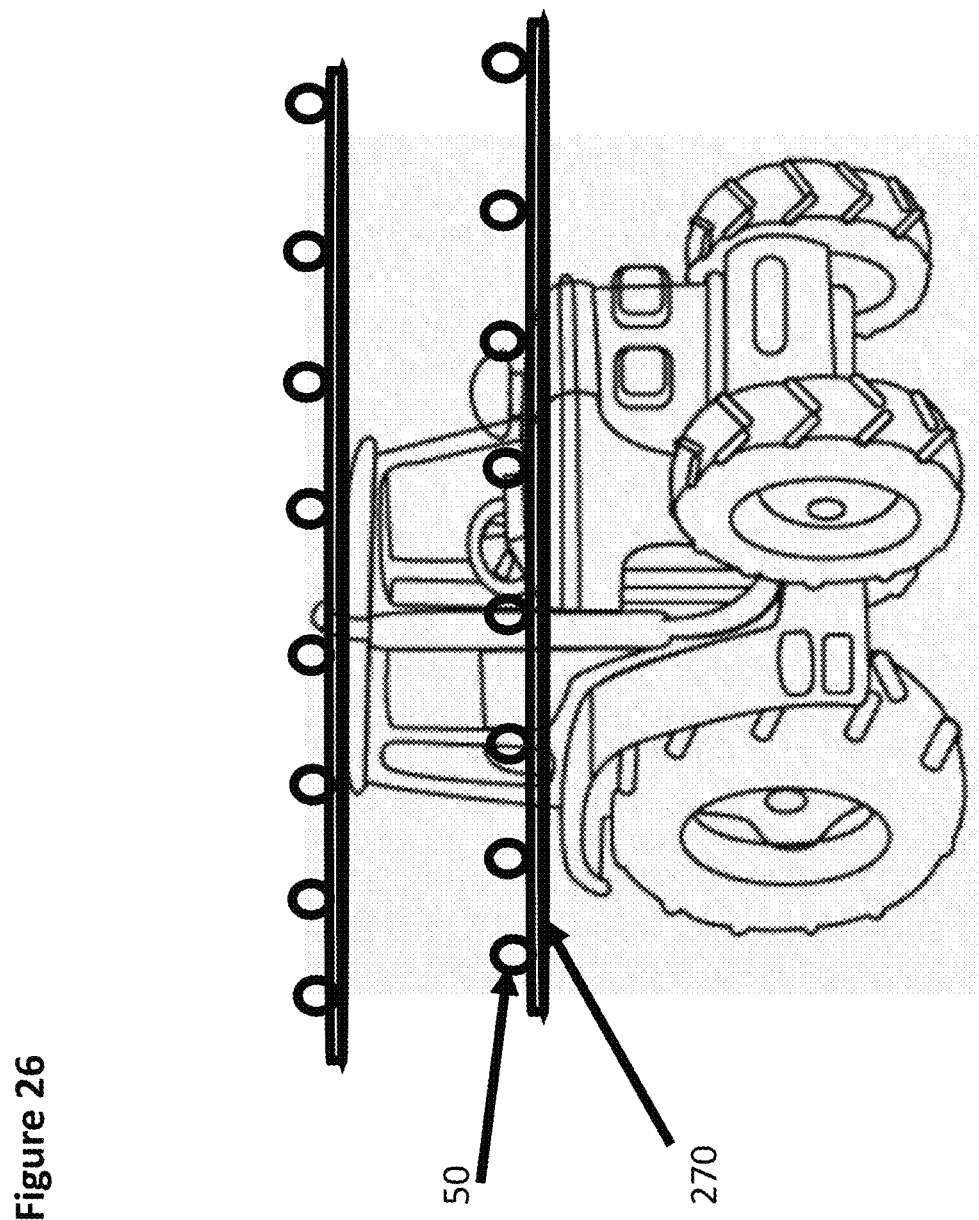
FIG. 26 depicts an example of articulated beam(s) mounted on a tractor, where the sensor units are mounted to the beam(s).

FIG. 26 depicts an example application on an agricultural vehicular equipment, although the vehicle could also be for non-agricultural purposes (e.g. construction, forestry). For smaller or hilly farms or where the span width is narrow, the image sensor units 50 are mounted to a beam 270 rather than to an attachment fixtures 1952. In this example, the housing includes a base and the base is attached to the articulated beam. The beam or beams 270 are affixed horizontally on the hood or on top of the cab depending on a desired viewing angle. Because the sensor units 50 are light weight (e.g. less than a pound), the beams 270 can be made of light weight material (e.g. aluminum, thick plastic, fiber or fiberglass). Longer beams 270 are articulated so as to fold or raise vertically or at an angle, so that the overall width spans approximately the transport width of the vehicle or other permitted widths. The beams 270 are hollow or able to carry electrical wiring or traces that are connected to the sensor units 50.

In the Field Operation

Figure 27:
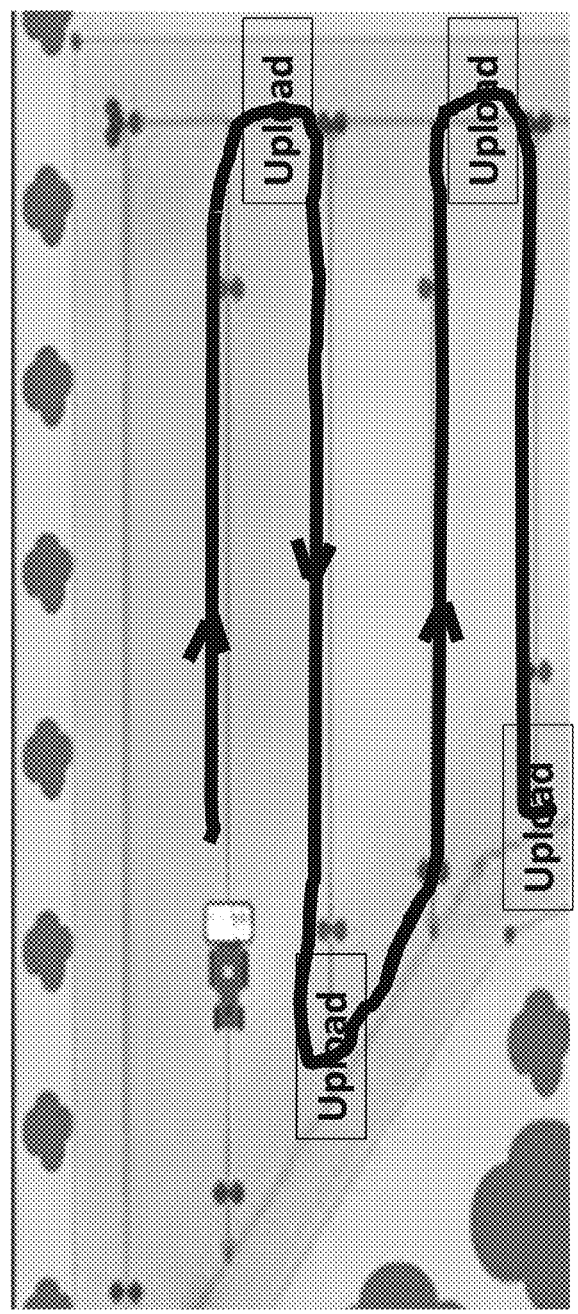
FIG. 27 depicts an example method of uploading data and optionally perform sensor unit calibrations when the vehicle slows down, makes a turn or stops in the field.

FIG. 27 depicts a method to upload the data from the captured images such as from the Master Applications. The data from the image sensor units 50 have an associated time stamp and field location or can be coordinated with other data from the agricultural vehicle to be uploaded together. In one embodiment, data is uploaded at the end of the crop row 12 when the vehicle slows down to make a turn (labeled "Upload" in FIG. 28). Data is stored in local memory of the sensor units 50 until the end of the row is reached. The type of data collected depends on the application, but most applications include targeted data gathering information along with environmental information such as location of the plant or crop row (or sensor position), the weather conditions, zoom level, time of day or lighting condition (that is often sensed automatically for camera units), accelerometer. The data is uploaded to data storage units in the cab or alternatively, the data is uploaded to a cloud or other remote server. Wireless transmission of the data such as for example through a LTE, 5G or next generation WIFI network is preferred, but wireless transmission may have to overcome signal interference or reflection issues because agricultural vehicles are often very large and mostly metallic. High speed wired communication is an alternative embodiment after some preliminary signal processing to compress or condense the amount of data in order to transmit a reduced or summarized version of the data. In addition, decisions made by the signal processing on an image sensor unit 50 is also transmitted to the local electronics associated with the application (e.g. Master Application) to control the vehicle machinery, e.g. boom, header, reel, draper.

Figure 28:
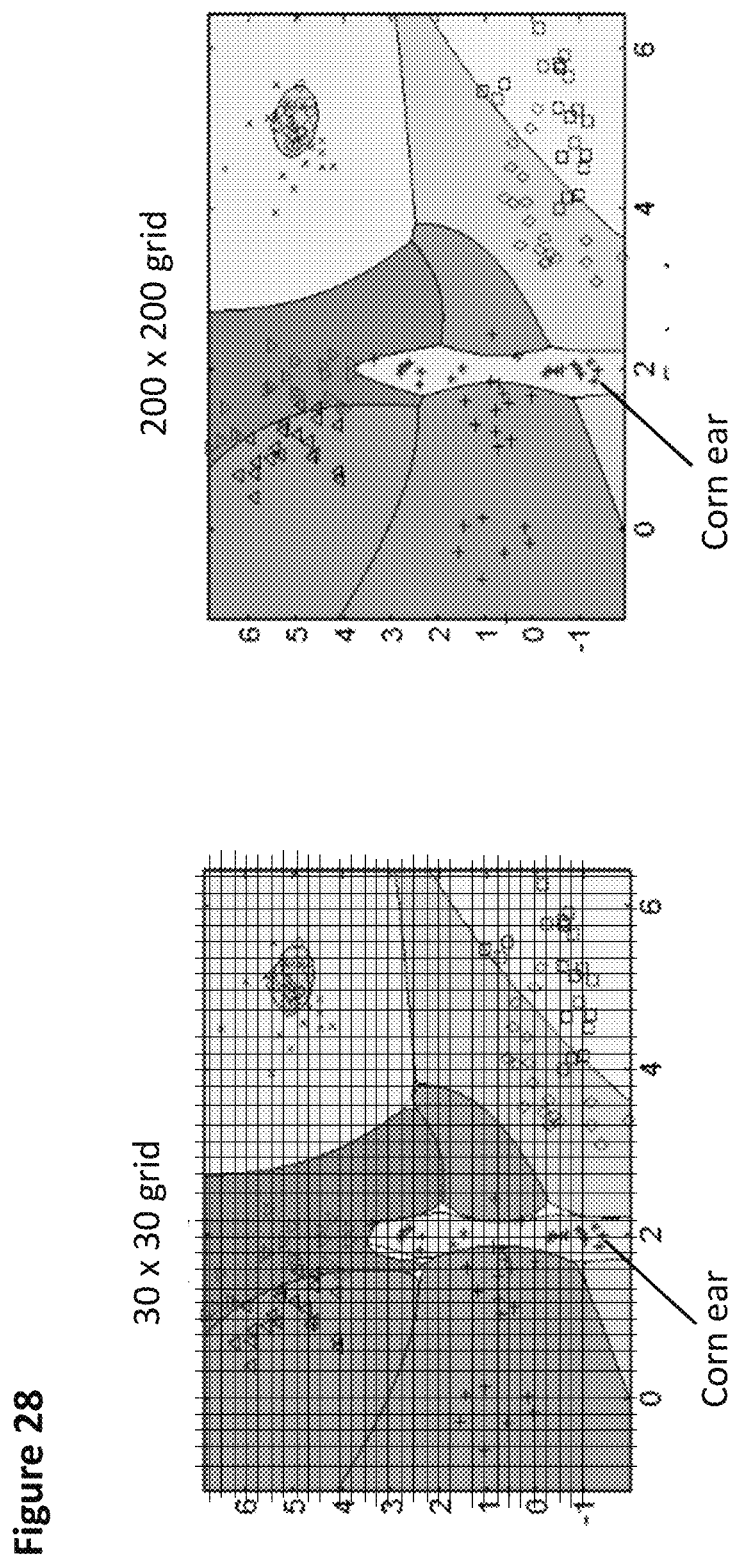
FIG. 28 depicts an example method to reduce the amount of data analyzed or uploaded based on reducing the number of pixels or image elements sufficient to distinguish an object to meet the goals of an application (e.g. identifying a vegetable to determine size and yield).

FIG. 28 depicts example data reduction methods include reducing the grid or pixel resolution under a software color classification analysis (in this case Matlab was used, but there are several open source tools too). Even a lower number of data points or grid size or number of pixels (30×30) is often adequate to pick out the target (e.g. pod or corn ear) as shown in FIG. 28, which compares results using a 30×30 grid versus a 200×200 grid. That is, a coarse grid or low resolution (e.g. image sensor or camera) suffices for many applications. The resolution is lowered, for example, by averaging signal results (e.g. color) among adjacent or near neighbor pixels, or by using movie mode, but extracting a still image among the movie mode images. Such resolution reduction increases processing speed and also reduces the amount of data to upload to a server or cloud. As another example, in applications that may be analyzed offline or where information is not needed for every plant, averaging or extrapolation is substituted in some embodiments. For example, instead of operating the image sensor continuously (e.g. movie mode), timed snapshots are taken at specific time intervals where the interval is correlated with the speed of the moving vehicle or sensor unit 50 and plant distance interval in order to gather an image (e.g. snapshot) just before the vehicle reaches the plant but after the previous plant ("image isolation"). That is, instead of movie mode, two or three still images are captured and the results of the corresponding pixels are averaged.

When operating in the field, many applications depend on knowing or identifying the location of the crop rows 12. For example, for spraying herbicide or fungicide (e.g. FIGS. 5 and 6), it is useful to know the location of the crop rows 12 to determine whether the spray has drifted past some lanes or the border of the field. Alternatively, crop row identification is used along with yield analysis to help ensure accurate counting for each row rather than for adjacent rows. After the vehicle travels through the crop field the first time, by storing the GPS data and path traveled, the vehicle already knows the location of the crop rows 12. This information is transmitted to the image sensor units 50 to process to determine location of other targets (e.g. weed).

Figure 29:
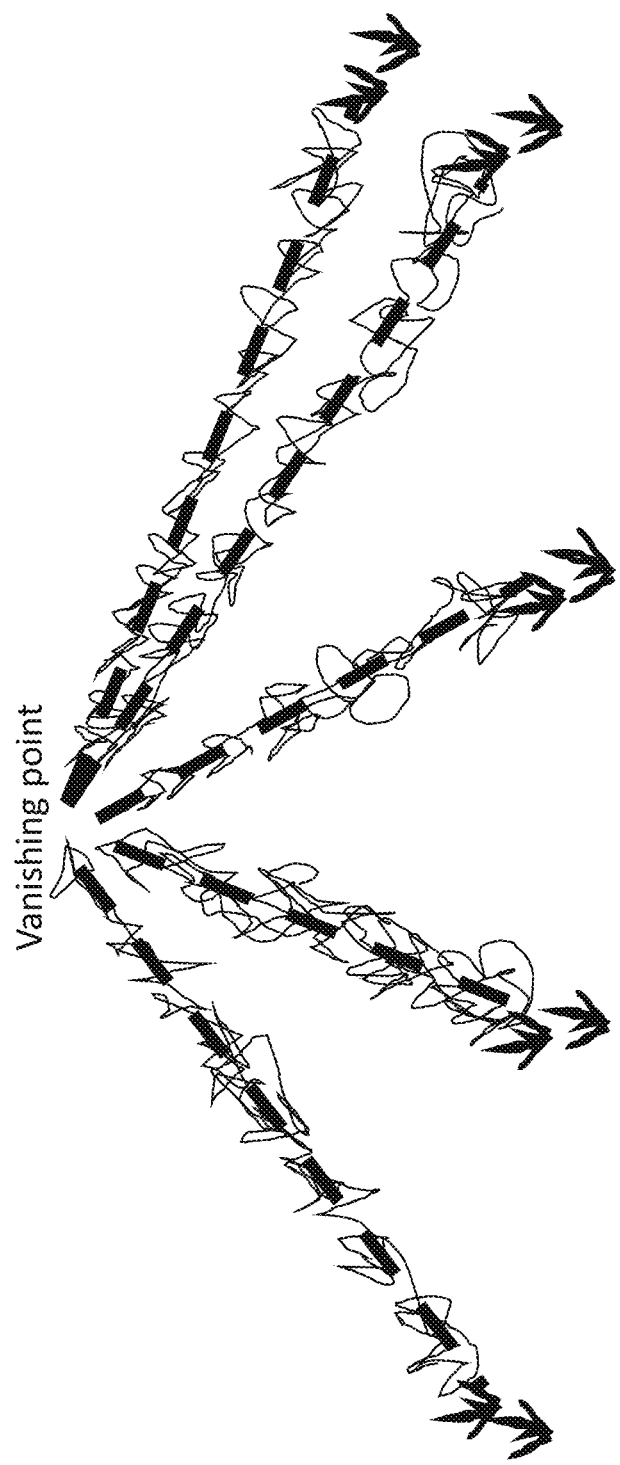
FIG. 29 depicts an example method of identifying crop lanes or rows.

FIG. 29 depicts an example dynamic technique for crop row identification based on line-fitting or on self driving car lane identification or on seed planting position. Lane or row identification includes detecting a vanishing point and applying maximum likelihood methods to guess where the lanes are and hone in on the guess by using spline modeling for parallel lines. Other methods include applying a threshold to the elements or pixels of the captured image (e.g. color threshold), performing a line-thinning technique (to hone in on the most salient features) to speed up a Hough transform, line collection reduces noise not belonging to the crop rows 12 to identify location of crop rows 12. Applying a line model (the midpoint of an image sensor unit 50 is the x coordinate and the vanishing point is the y coordinate), keeps the image sensor unit 50 located between two parallel, adjacent crop rows, and distance to objects are determined based on the location in the x-y coordinate system. Applying distance constraints (between the sensor unit 50 and the found crop rows 12 can also ensure keeping the vehicle traveling along the path). If the Master Application entails weed, once the crop row 12 is identified, anything that is not on a crop row is classified as a "weed" and is sprayed. The average width of a crop row can be determined when the crop lane is identified, or the value is entered by the operator before driving through the field, and anything on the ground that is outside, say, one or two standard deviations from the crop row width, would be sprayed.

Each image sensor captures a wide enough field of vision so as to determine the crop rows closest to the path traveled by the particular image sensor. As another example, if the crop leaves have already emerged, color contrast analysis determines where the crop rows are. The method and software instructions for identifying lane markers are installed on a "smartphone" type electronics processor and used instead to identify the crop rows, implemented, for example, as API (application programming interface) instructions for an android platform. In some embodiments, the original GPS and RTK position information from planting the seeds (e.g. GPS position and spacing between seed drops and spacing between crop rows) are used to identify the crop rows based on a stored mapping of the farm field and coordinate system. Alternatively, the vehicle operator uses a feeler guidance system (e.g. tactile sensor mounted to the tires to detect location of plants) and/or visually sees the location of rows and positions the tractor (e.g. tires, headers) so as to traverse the field appropriately centered about the rows.

Figure 30:
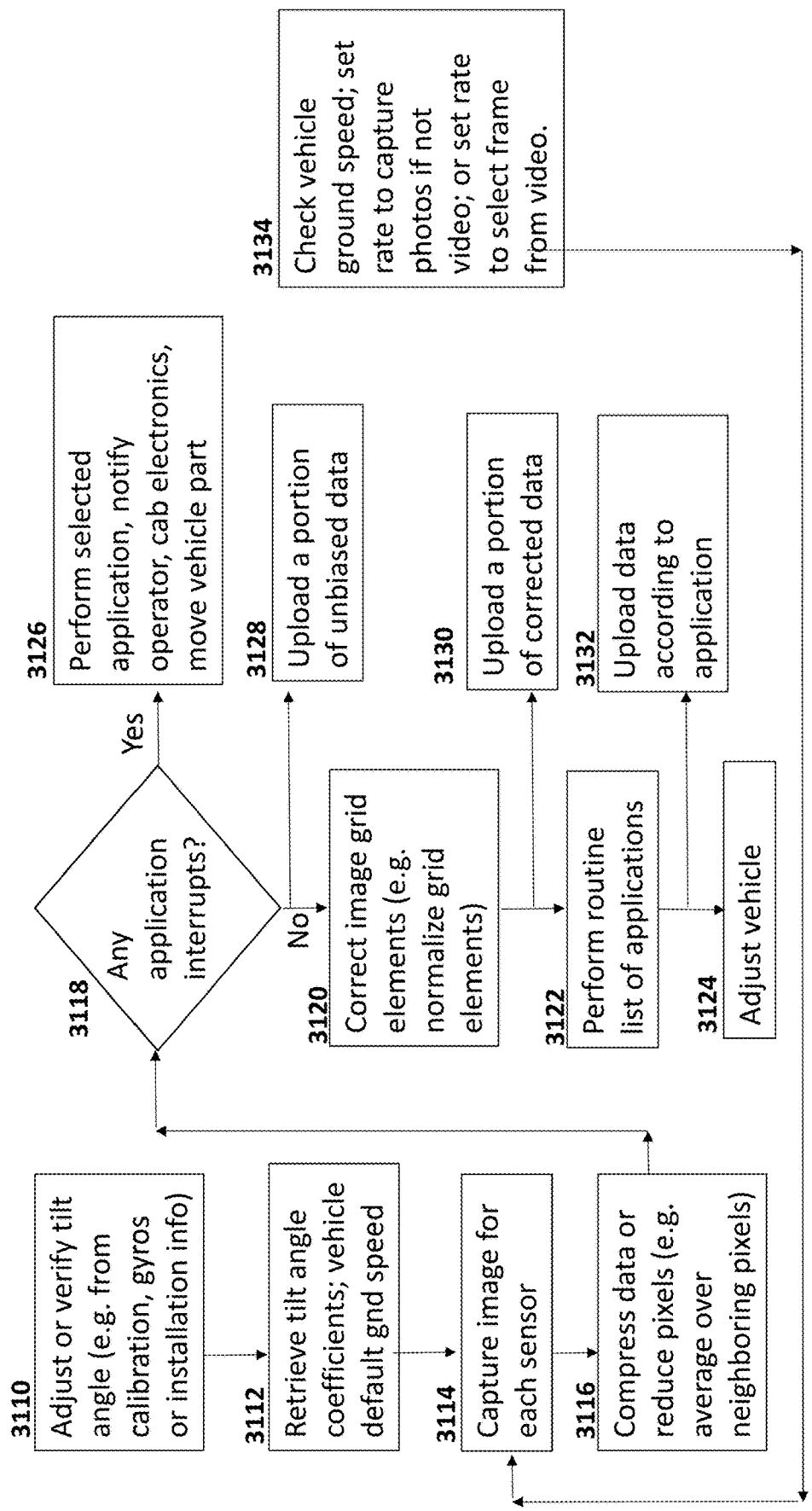
FIG. 30 depicts a flowchart of an example method of operating an imaging system and its accompanying bank (set) of algorithms.
Figure 31:
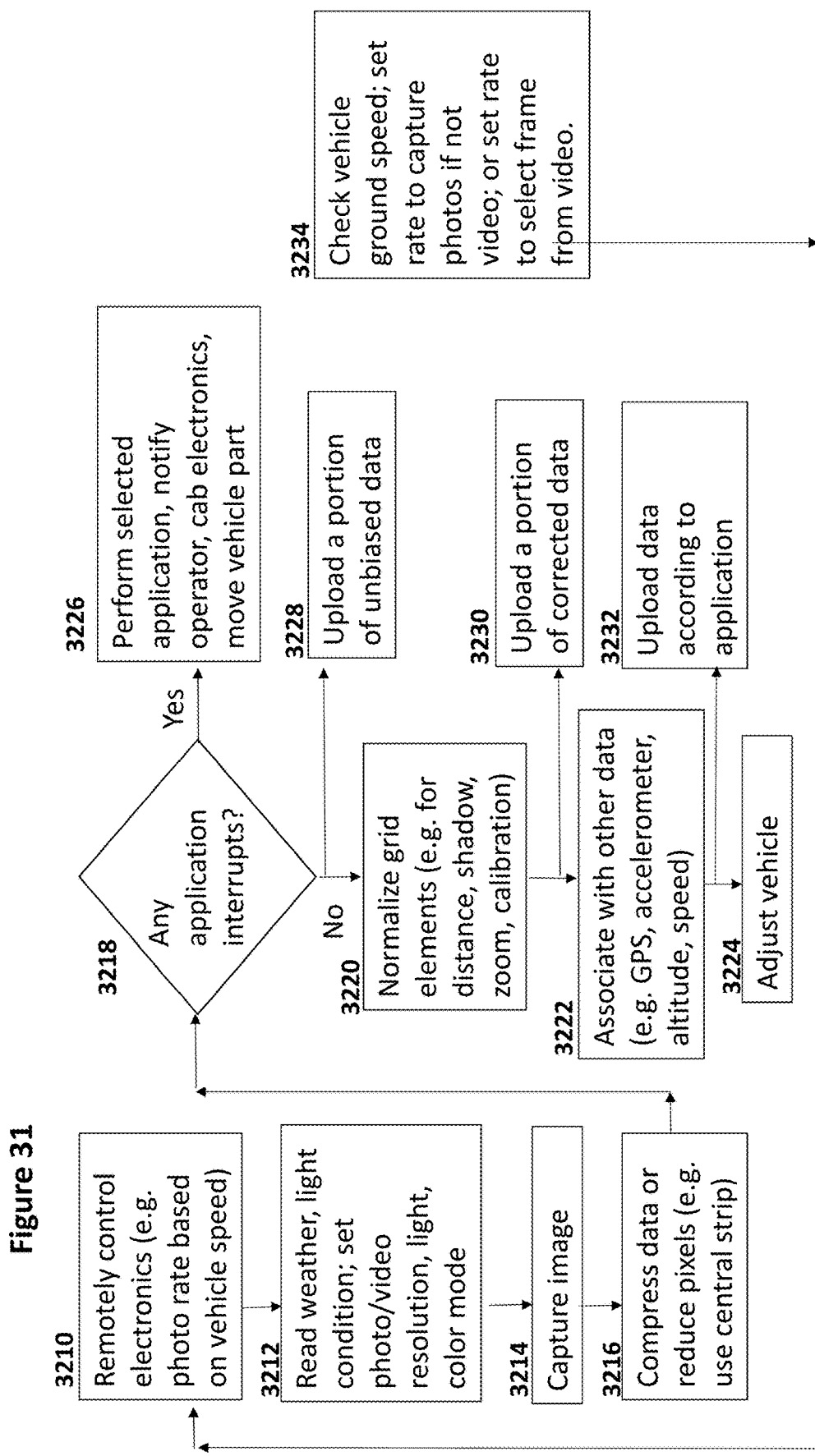
FIG. 31 depicts a flowchart of another example method of operating an imaging system and its accompanying bank of algorithms.

FIGS. 30 and 31 depict flowcharts for example methods to operate within the framework of the image sensor units 50 or image sensing system 60, and accompanying bank of procedures with instructions that are stored in memory and exercised by the processor, with results transmitted to the agricultural equipment or to cab of the agricultural vehicle to cause a response (e.g. speed up reel speed, adjust the quantity and type of data uploaded for analysis). The method of FIG. 30 includes instructions 3110 to adjust the pivot angle of the image sensor units 50 based on calibration and use of gyroscopes or installation information—to optimize the viewing direction and to ascertain distances. Instructions 3112 include retrieving stored correction coefficients and parameters to be used with the different algorithms, and retrieving external information used in the calculations (e.g. speed of vehicle). Instructions 3114 include the image sensor unit 50 capturing an image. Instructions 3116 include reducing the amount of data by, for example, image cropping or image compression or averaging. Instructions 3118 include checking whether there are any interrupts received by an image sensor unit 50—for example to exercise a different Master Application or other application, to upload data because an end row is reached, and so on. If there are interrupts, instructions 3126 include exercising the new application, notifying the cab computer or operator, sending decisions or commands to an associated agricultural equipment (e.g. raising the height of the shanks and disks to reduce digging depth). If there are no interrupts, there is a periodic request at 3128 to upload a pre-determined fraction of the unbiased data (e.g. no cropping, no triggers) to be checked offline. Instructions 3120 include correcting the captured image, e.g. apply color correction, normalize/equalize for depth and angle, shadows, stitch together image from neighboring image sensor unit 50. Instructions 3122 include exercising the instructions for the list of applications selected by the operator or set to be exercised (e.g. check that the pixels or image elements pass a threshold (e.g. for a color), then perform the pattern extraction algorithms, reach decisions, transmit decisions to agricultural vehicle). Instructions 3124 include receiving controller information, enacting decision (e.g. the hydraulics raise and lower cultivator frame, the cutting speed is reduced). Prior to massaging the data, performing transformations, applying corrections, a portion of the data is saved and uploaded to local memory in instructions 3130 and 3132. At a later time (e.g. when the vehicle stops or slows down), the data is uploaded to a remote computer or server for offline analysis to check if there are any biases in the processing of the data. In this manner, the data to determine yield is cleansed of biases and over-corrections, or that biases are at least known and taken into consideration, in order to generate quality data to determine yield and best practices for the next crop cycle. While the image sensor units 50 are performing their tasks, the operator and agricultural vehicle are doing other things, sometimes independent of the sensor units 50. For example, the operator or vehicle may speed up, the rate of image captures is revised, and so on. The resulting information or command is transmitted to and received by the image sensor units 50.

FIG. 31 depicts a flowchart for other example methods to operate within the framework of the image sensor units 50 or image sensing system 60, and accompanying bank of procedures. A remote operator, the agricultural vehicle or the image sensor units 50 exercising instructions 3210 that include setting the image capture rate based on the vehicle speed. Instructions 3212 include collecting environmental conditions, e.g., weather, time, light conditions, then setting the parameters of the image sensor units 50 (e.g. zoom, exposure time, operation mode video or still shots). For yield analysis, it is more optimal to zoom in on the plant so that the seed (e.g. cob, beans) portions take up more than 15% of the captured image. The image sensor units 50 capture images of the crop field or crop rows in 3214. The rest of the instructions are similar to those described for FIG. 30. However, instructions 3222 include associating the captured images with other data collected by the vehicle such as the speed and acceleration of the vehicle, GPS or RTK location, pitch of the vehicle, elevation of the land, weather conditions. In addition in 3218, instead of accepting interrupts as they come in, there is a prioritization of the interrupts and order of performing the applications. For example, the operator sets a priority level or revises a default priority level. Those that require fastest processing might have higher priority than instructions that can be performed at any time or that would not affect yield as much.

The application procedures (e.g. Master Applications) have instructions that are stored locally in memory circuits in each image sensor unit 50 and exercised locally by a processing circuit (e.g. CPU, logic circuits) on the image sensor unit 50 that accesses the memory circuits. The image sensor units 50 also have transceiver circuits so that input signals (e.g. speed of travel, wind velocity) and output signals (e.g. "weed pattern found" or "uneven residue pattern found") are transmitted either directly to another equipment on the agricultural vehicle (e.g. reel, spray nozzle to exercise actions) or they go to the central controllers in the cab or main computer hub of the agricultural vehicle. The main computer then exercises some action on the agricultural vehicle such as speed up reel, slow down vehicle, raise shanks, release spray. Data signals that are used for offline analysis are uploaded to a remote server or go to the cab or main computer hub for further processing. If the agricultural vehicle is small (e.g. a robo-scout) enough that signals between the main computer hub the image sensor units 50 travel fast enough to execute the instructions and provide output signals, then instructions and commands can instead or in conjunction be sent from a remote processor rather than have the image sensor units 50 store and exercise local instructions. That is, the related circuits are partitioned either remotely or locally depending on costs and instruction response and exercise times.

Another example method of controlling the imaging system and agricultural vehicle include the following procedures. Instructions are downloaded or factory-stored on each image sensor unit 50. Depending on signal and instruction exercise and response times, the following procedures are controlled and exercised either locally or remotely from the image sensor units 50. In 901, Automatically or manually adjust photo taking rate based on vehicle travel speed. 902, Control photo taking zoom, lighting, color and other modes (e.g. night mode, panoramic mode) based on type of vehicle and selected applications (procedures). 903, Control video mode—remotely change from video to photo mode and vice versa depending on environmental conditions and selected application. 904, Control resolution of video mode, to increase resolution from default resolution. 905, An operator or a cab or main controller circuit drives agricultural vehicle, position the equipment on the vehicle (e.g. extend and unfold cultivator frame, lower reel in front of combine, adjust height of cutting blades of a windrower, unfold and extend spray boom) 906, the image sensing system or units 50 identify crop rows as the vehicle travels. 907, Identify lanes—the horizon or fade (vanishing) point helps determine distance also. 908, The sensing units 50 capture images. 909, Store data based for example on a surpassed trigger level. 910, Remote control transmit image data and sensor position/unit identification from one image sensor unit 50 to another image sensor unit 50. Stitch together adjacent images on each unit 50. 911, Perform data compression. 912, Remote control transmit data to cloud or remote server: Image data, zoom level, light sensing data, plus GPS data, altitude, plus accelerometer data. 913, Remote control transmit data through wired connection (data files uploaded), from electronic sensor hubs, IoT gateways or cloud connectivity or plug and play sensor interfaces. 914, Optionally add another form of data "compression." Sum or average neighboring pixels to reduce size of image grid (e.g. for fast image processing) in real time. E.g. analyze only core strip part of image to focus on only central strip or crop the captured image, then further reduce size of strip from 2000×2000 to 50×50 (for example) by averaging and filtering. 915, Equalize or normalize the elements (farther image elements are multiplied by some factor based on height at which the sensor is mounted, pointing angle, distance to the point of view. E.g. normalize an isosceles trapezoid into a rectangle. 916, Decode the row and column number of each pixel, raster or bitmap array of the captured image to form an array or grid mapping of the captured image. 917, Identify patterns based on selected applications. 918, Correct for shadows, zoom, time of day or lighting, smearing (jitter)). 919, Real time identify colors of grid elements of the central strip. 920, Real time enhance, then identify color clusters in the grid elements in the central strip. 921, Calculate distance to the targeted pattern. 922, Identify distance from the image sensor unit 50. 923, Include precision GPS data for the farm. 924, Include distance calibration correction. 925, Correct for jitter. 926, Optionally use two or more images (cameras) for improved estimate of how far away is the object. 927, Apply automation and/or provide alerts to notify the vehicle operator for identified patterns, potential harms, obstacles, predicted patterns. 928, Vehicle responds to instruction as a result of identified patterns (e.g. change height of cultivator shanks and disks, release spray, hot inject additional chemicals, adjust reel speed, depending on the type of agricultural vehicle that is in motion). 929, Perform offline analysis to obtain crop yield for each crop row and plant location in the file. 930, Perform offline analysis to find patterns and compare found-offline patterns with the real-time patterns calculated results found in real time. Adjust real-time pattern recognition and calibration when major discrepancies are found. 940, Collect data on each pass of the vehicle through the farm field. 941, Perform precision planting and crop maintenance. 942, Re-position and move vehicle containing the intelligence between the crop rows based on crop lanes identified, positioning the vehicle equipment to optimize performance of the response to the found patterns for each of the applications. 943, Plan for next crop growth cycle. Save the previously obtained data containing the amount of residue, fertilizer, herbicide, crop yield and other information that are correlated with the plant, row, weather, time and field location. Perform prescription farming in the next crop cycle. If the crop yield is past a threshold of good or high, the prescription would remain the same and can be applied to the same location in the field in real time.

In some embodiments, a distance from the agricultural vehicle or equipment to a target is used to determine or optimize the time to take some action. In the field, different applications depend on determining the distances to the target in order to act on the target (e.g. turn on the spray nozzle equipment). For example, the location and distance to a weed or other anomalous object 11 should be determined before the spray vehicle and spray nozzle reach close enough to spray object 11. For example, we can use calibration results (e.g. location on image grid elements mapped to the time to turn on the spray nozzle, travel to the weed and spray the weed), calibrate distance to a target given the angle of two parallel lines disappearing to a vanishing point, use images from one or multiple cameras to determine depth along with calibration, use the location of the plants as a guide to distance (crop seeds are planted at precise locations). Distances from the image sensor (e.g. camera) to the target area are calibrated before operating the agricultural vehicle. For a given angle and height that an image sensor is positioned, the image sensor can capture images of a number of targets with known distances from the vehicle or boom or windrower. The location of the known targets in the image ("photo") provide a ruler or scale by which to determine locations and distances to new objects in new images captured. Electronic signal latency due to time it takes to issue communications (e.g. commands) with a part of the agricultural vehicle, actual delays in response time, offsets can be calibrated out. Manual adjustments can also be made by an operator. For instance, if the spray release is systematically slower and the vehicle already traveled past a weed before the spray is released, an operator can make adjustments in the calculated or estimated distance. By tweaking the calibrated distance higher or lower has an effect of causing the equipment to respond slower or faster. In other embodiments, other variables can be tweaked to achieve a similar effect, such as adjusting the apparent speed of the vehicle when calculating the time or distance to reach a detected weed, stone or other targets on the ground.

Figure 32:
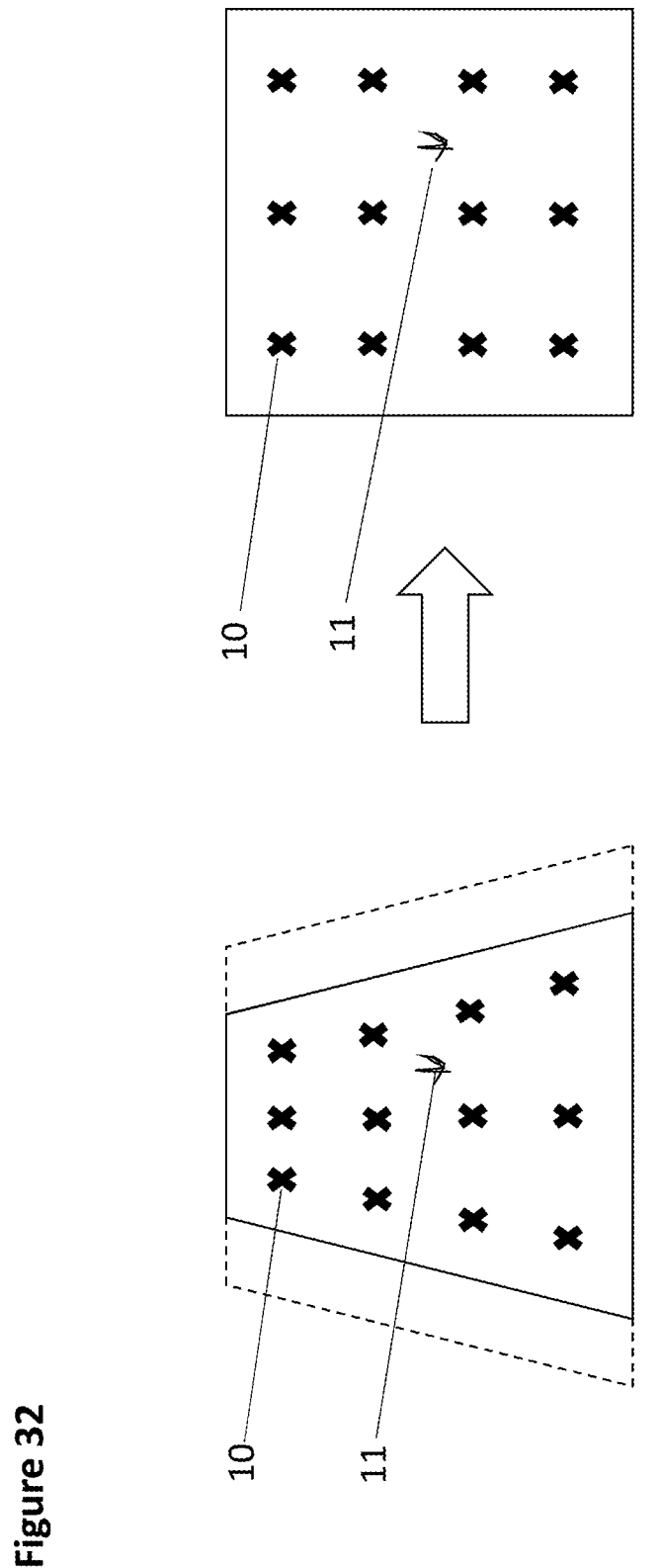
FIG. 32 depicts an example method to reduce and normalize the data from a captured image.

In some embodiments, the distance is not determined. Rather, the captured image pattern (or overlaid grid 100) is pre-populated with the locations of known planted seeds or plants as shown in FIG. 32. If any unexpected pixels or image element are not co-located with the expected ones or within a pre-determined distance from the expected ones, the unexpected pixels are attributed to an anomaly object 11. The location of the anomaly object 11 on the image grid is associated with an actual ground position X in the crop field, for example, based on a priori calibration of the field of view of a captured image versus the actual ground locations and thus distances, for a given angle or tilt of the image sensor units 50. Depending on the speed of travel of the vehicle, and time=distance/speed, the time to reach the distance to ground position X is also calculated (e.g. and the spray nozzle for the crop row 10 is then turned on to release herbicide within the time that the actual ground position X is reached by the vehicle).

FIG. 32 depicts an example data processing procedure that includes data reduction and normalization. If the captured image is taken from an angle, it is a perspective view with a vanishing point as depicted on the left-side drawing of FIG. 32. For analysis purposes, it is sometimes useful to normalize the image elements, by multiplying or scaling up the elements that represent the farther away image (effectively, scaling an isosceles trapezoid to a rectangle). Data reduction can be optionally performed as well. For either real time processing or data upload purposes, the amount of data is reduced by cropping the image either as a rectangle or parallel to the crop rows (e.g. see dash lines for the image on the left side of FIG. 32). Even if there is image cropping, the procedure still maintains some overlap between images from two adjacent image sensor units 50. The number of elements (e.g. pixels) of the post-cropped image is also optionally reduced by averaging the color in each area (e.g. near neighbors) or zooming into an area of the image and discarding the other pixels. For some applications such as size estimation, the elements of the remaining image grid are normalized to remove the depth or distance effect as shown below. For offline analysis in some embodiments, the amount of data is reduced and then compressed before uploading the data.

Figure 33:
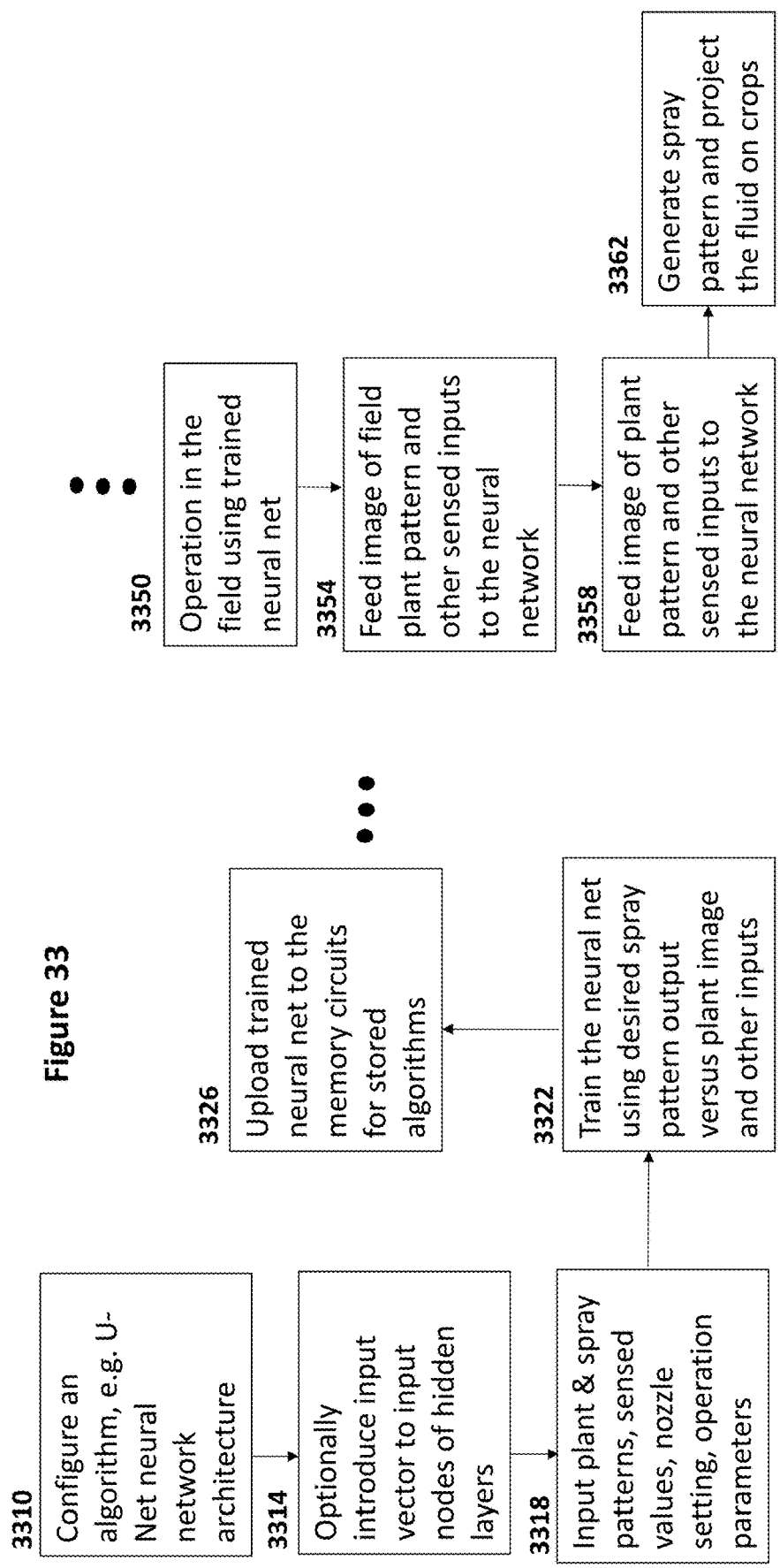
FIG. 33 depicts an example method of generating an optimized algorithm and applying the algorithm during field operation for a sprayer application.
Figure 34:
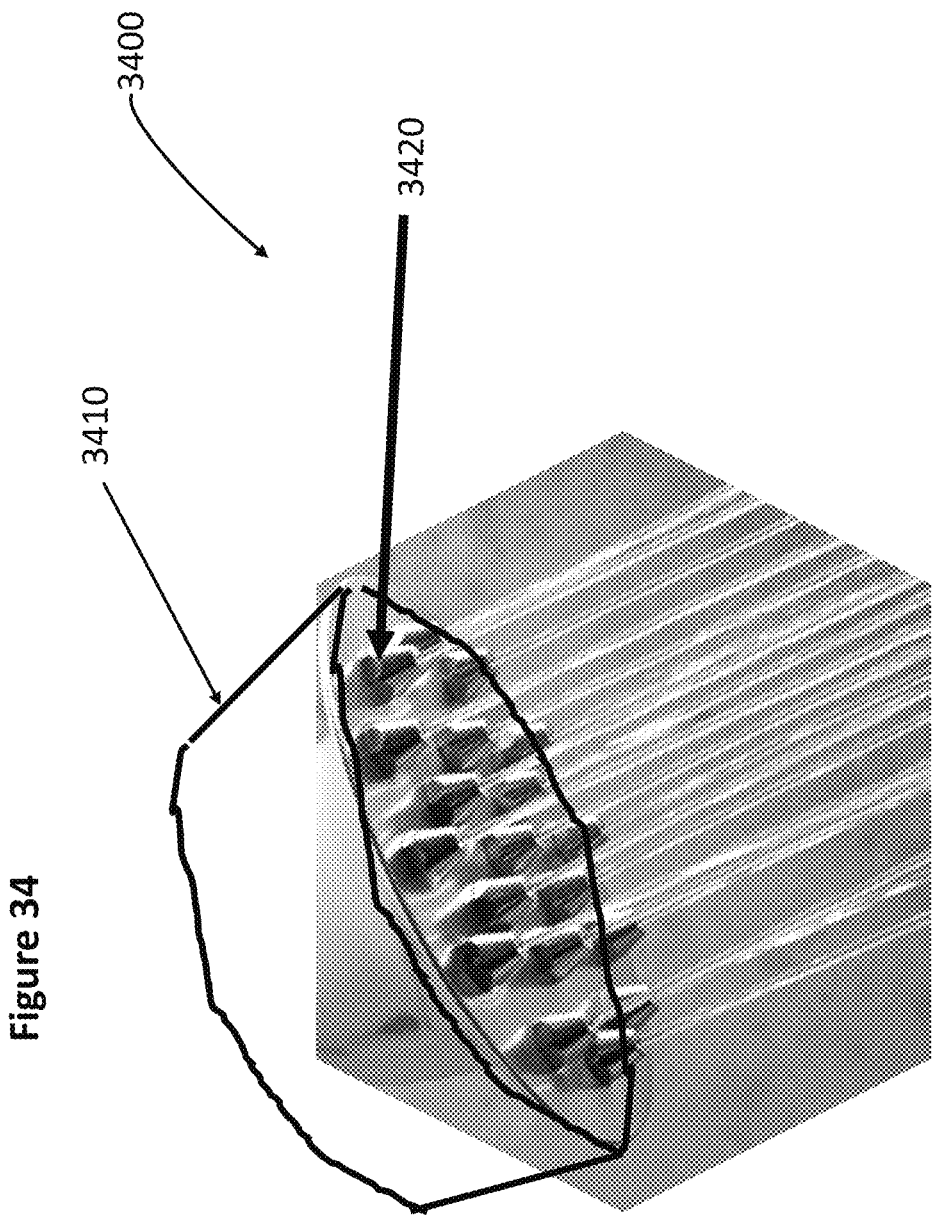
FIG. 34 depicts an example spray nozzle head that projects fluid in a pattern and pressure based on the example algorithm of FIG. 33.

For a spray application in a crop cycle, FIG. 33 depicts an example method of optimizing an algorithm and then applying the algorithm during field operation for spray applications to disperse fertilizer, nutrients, herbicide, fungicide, or even water. After much experimentation and analyzing crop yield data at each location in the field versus the amount of fertilizer, water, herbicide, fungicide, weather condition, we went about optimizing different types of artificial intelligent algorithms, a neural network, support vector machines, regression parameter fits, and ensemble or random forest algorithms. In procedure 3310, an example algorithm includes a neural network such as a 2-dimensional convolutional U-Net neural network that has a contracting path to capture the properties of the input image sensor signals, necked down to a flat layer, then followed by an expanding path to the output spray patterns. An alternative architecture includes the autoencoder neural networks. The expanding path may mirror the contracting path if each of the layers in the contracting path feeds forward to a corresponding layer in the expanding path, such as shown in the Ronneberger reference. The inputs to the neural network include image patterns from the images taken by the image sensor units 50. Neighboring pixels are aggregated or averaged to reduce the physical number of inputs to the neural network, such as down to 50×50 inputs or even 30×30 inputs like in FIG. 28. In procedure 3314, other inputs to the neural network are either introduced at the input layer or may be introduced as an input vector or normalized input values to an intermediary convolutional layer in the contracting path of the neural network. In procedure 3318, other inputs include the type and settings of the spray nozzle, the weather condition (e.g. wind speed and direction, air temperature, humidity, time of day), type of spray used, and travel speed of the vehicle or autonomous self-propelled machinery, and so on. The number of outputs from the neural net depends on the configuration of the spray nozzle such as the number of spray outlets or spray tips shown in FIG. 34, or such as the amount of fluid pressure and droplet size to apply along with direction and angle of the spray tip if only one nozzle outlet is used at any one time (e.g. FIG. 3). To train the neural network in procedure 3322, the desired spray pattern is correlated with the crop yield, the better the crop yield, then the particular spray pattern is deemed to be more desirable. Such more desirable spray patterns are used to train the neural network using deep learning procedures of trial and error to adjust the different training parameters and architecture of the network. Alternatively, other measures of goodness include reducing the amount of spray (e.g. herbicide) used, use of the least harmful type of spray, and so on, in using reinforcement neural net training techniques. In 3326, the trained network is uploaded to the memory circuits of the image sensors 50 or to a master controller overseeing multiple image sensors 50. In 3350, during field operation, the output spray patterns are generated by the stored optimized (or trained) neural network equation, which maps the 2-dimension plant or crop field images to a desired spray pattern that is to be applied to the plants as the spray vehicle or autonomous vehicles traverse a field. During field operation, the sensor images and other inputs are continuously fed to the trained neural network, and the spray nozzles project the herbicide, fertilizer, water, etc., onto the crop field in the spray patterns and conditions (e.g. pressure, amount) generated by the neural network based on the inputs. The field (crop row) location is also recorded so that there can be a precise correlation of the crop yield at that field position with the amount and type of chemical or mixture of chemicals (e.g. fluid, water, herbicide, fertilizer) released to that location of the field.

As an example of a specific artificial intelligent method using the neural network architecture, the input layer of the neural network is followed by multiple sandwiches (e.g. three) of 2-dimensional layers of convolutional-dropout-max pooling layers. An example filter or activation function to use in these convolutional layers is the ReLU rectified linear unit function. These sandwiches are followed by a flattening layer that makes the inputs into an one dimension vector. The flattened layer is followed by sandwiches of fully connected layers (e.g. three if the input layers are being mirrored and fed to a corresponding fully connected layer), then to the final outputs. The activation function for the fully connected layers include the ReLU function or the sigmoid function. For the very final layer, the sigmoid or other continuous function is used for the activation function. In some examples, to reduce processing time during operation, the neural net generated output spray pattern is generated only if something else first triggers, such as evidence of a aphid, fungus, weed or unexpected objects. The trained neural net algorithm is not exercised until a lower level trigger activates first. During the algorithm optimization phase, this lower level trigger would also be applied to the training samples. In this example, only those training samples that pass the lower level trigger would serve as input patterns to train the neural network.

Training sample patterns include images of bare field (with and without remaining plant residue), tilled fields, plant patterns, plant foliage, sickly plants, defective plants, wilting leaves, and so on. Desired spray patterns corresponding to these different input images and other inputs (e.g. vehicle speed, wind, humidity) are used to train the neural network or other artificial intelligent algorithms. In some embodiments, the training samples are divided up based on category such as pre-emergent fields, post-emergent fields, corn field, wheat field, rice field, day time, dusk time, rainy weather, drought conditions, and so on. Each neural network architecture would then be trained or optimized for that particular category. Then during actual field operation, the appropriately trained algorithm would be exercised to match the field scenario. Although the artificial intelligent methods are described here in the context of field chemical applications, the methods can also be applied during harvesting or other times in the life cycle of a crop. For example, for harvesting, pairs of input images and desired output action can be used to train a neural network. Input images include the plants and the fields, and the desired output action include slowing down a harvester, lowering the headers, slowing the draper, adjusting the cutting blade widths, and so on.

FIG. 34 depicts an example spray nozzle 3400 that projects fluid in a pattern, amount, direction, pellet or droplet size, mixture, and pressure based on the example algorithm of FIG. 33. This example spray nozzle has a nozzle head 3410 that may be tilted at an angle relative to the spray boom. The nozzle head 3410 includes multiple spray outlets 3420 to better adapt to and be able to project any spray pattern that the trained algorithm may dictate.

Figure 35:
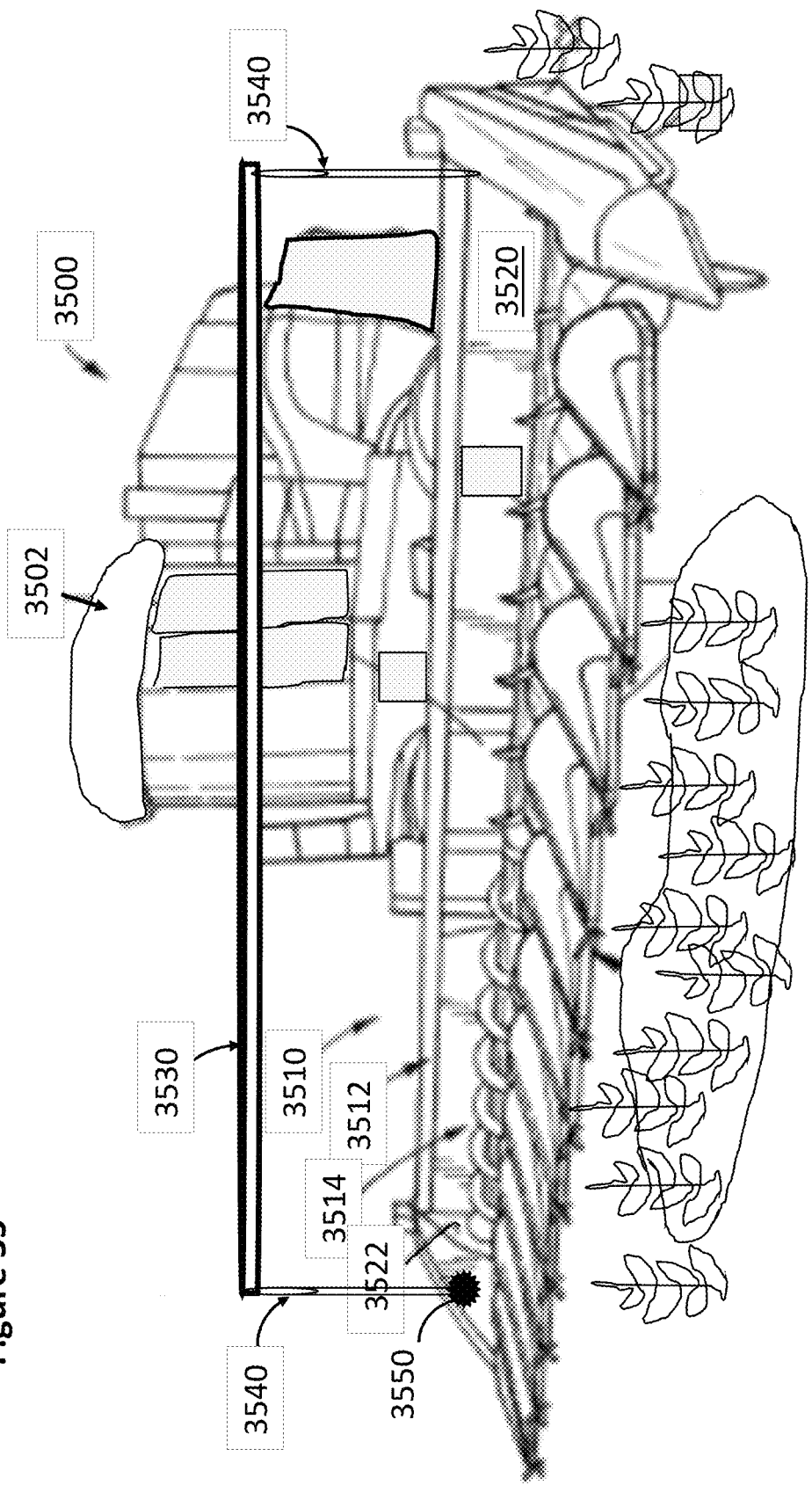
FIG. 35 depicts an example of a beam mounted on a harvesting machine, where example sensor units can be attached to the beam.

Depending on the configuration of some machines, sensor units 50 are mounted higher up or extended more outward to better capture clear images. FIG. 35 depicts an example of a beam 3530 mounted on front end or rear end of a harvesting machine 3500, where example interface paddles or attachment fixtures 1952 can be attached to the beam 3530 either above or below the beam 3530. Alternatively, sensor units 3650 can be directly attached to the beam 3530. Instead of mounting the image sensor units 3650 to a backplate of a crop header (e.g. 3510 on the top part 3512 of the plate 3514), the beam 3530 is attached on either end to poles 3540 that are optionally upward-extendable and retractable. In the example of FIG. 34, the poles 3540 are attached to the inside end walls 3522 of the header 3510 with rotatable sockets 3550 so that the poles 3540 and beam 3530 may rotate more forward of the cab 3502 towards the crop field. If beam 3530 is attached to a rear part of a machine such as the harvesting machine 3500, the beam 3530 can be rotated more rearward of the machine.

Figure 36:
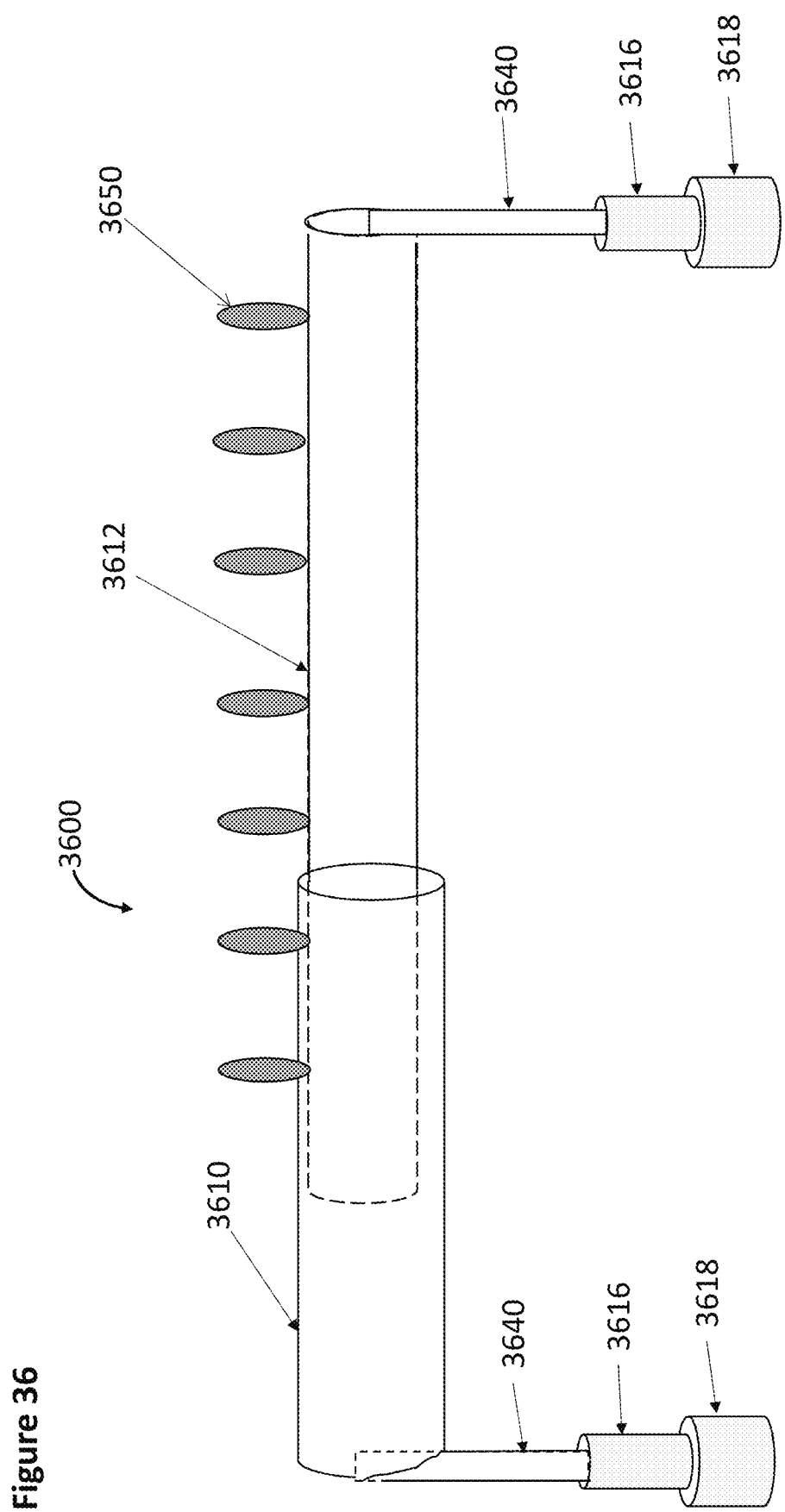
FIG. 36 depicts an example of an adjustable beam or boom with example sensor units mounted to the beam or boom.

FIG. 36 depicts another example of a mounting structure (3600) for the sensor units 3650 or for interface paddles or attachment fixtures 1952 (sensor units 3650 are mounted to 1952, which are then attached to the mounting structure). The adjustable beam (or boom) 3600 has example sensor units 3650 attached to the top or underside of the beam 3600 (or sensor units 3650 are mounted to interface paddles or fixtures 1952). Although beam 3600 is depicted as having a circular cross section, the cross section could instead be rectangular or triangular so that there is a flat surface to mount the interface paddles or attachment fixtures 1952 or sensor units 3650. In this example, beam 3600 is adjustable both in width and height from the vehicle to which beam 3600 is mounted. One way to adjust the width is to have concentric multiple beams that can slide within another one, as illustrated by a more-slender beam segment 3612 that is inserted into and can slide into beam segment 3610. The height of the beam 3600 is telescopically adjustable when example tube 3640 slide past tubes 3616 and 3618, or when tube 3616 slide past tube 3618. Although these example mounting structures (e.g. 3530 or 3600) are shown with a harvesting type machine, they can alternatively be mounted on a sprayer machine, on a planter, tillage, tractor, baler, or other agricultural machinery, and on the forward or rear side of the machine either to check the upcoming crop row, field terrain, crop and residue left behind, and so on.

There are many advantages of the aforementioned framework to combine different solutions to agricultural issues. By using a framework approach and modular portable devices, multiple tasks and problems are treated by the same single framework and devices, allowing for shared resources and data and re-use, cost reduction, ease learning and upgrades. Further, the same devices include the same properties and calibration constants (e.g. color correction constants, position offsets from the rod 52) so that the same correction and adjustment travel from machine to machine through the different stages of crop growth. There is one universal system for different crop vehicles, where "different" vehicles refer to vehicles for different phases of a crop cycle. The housing and the imaging system are portable, and the universal adapter also electrically and mechanically attaches the housing device to a second fixture on a second type of agricultural vehicle for a different phase of the crop cycle. Compatibility issues are also greatly reduced since the same devices are repeatedly re-used. The government and many agricultural equipment companies have focused on Big Data, but collecting quality small data would greatly improve the analysis of Big Data, reduce data biases or biases due to different data collection equipment. In addition, the techniques could also apply to the construction industry for the booms, lifts and cranes that are also very long and large where visibility is a problem.

Although this disclosure focused on a comprehensive framework having devices to implement a system of crop monitoring instructions and crop-field management instructions (circuits or ASICs or software programs) related to a multitude of crops and different farm vehicles, it is also possible that more specific vehicles have a limited set of crop monitoring and crop-field management programs. For example, an irrigator (e.g. FIG. 26) or special purpose vehicles (e.g. self-propelled windrower) are dedicated to only one or two phases of a crop cycle or serve only one purpose (e.g. spray or gather). If an operator leaves the portable image sensor units 50 on only one machine, the units 50 might be limited to only a few programs and procedures. For example, during installation or manufacture, an image sensor units are pre-loaded with basic common crop and field instructions (e.g. field and color calibration, crop row detection or location navigation) along with one type of specialized set of instructions such as only windrower management software or only spray weed and drift pattern detection.

Finally, some of the stated directions, e.g. "behind" are merely illustrative and do not orient the embodiments absolutely in space. Also, in actual usage, for example, the image sensor system may be positioned at an angle and "top" and "side" becomes similar. Also regulatory vertical height or horizontal length restrictions may exist, and the retractable fixtures would have to be sized accordingly. The section labels are not exclusive: descriptions in other sections may also relate to the contents of a particular section. There are also variations in the describe embodiments that may be made without departing from the scope of the claims.

What is claimed is:

1. An automated agricultural spray vehicle having an image sensor system comprising:
    a modularized plug and play unit relocatable between a crop management machine and the automated agricultural spray vehicle;
    wherein the modularized plug and play unit includes multiple image sensors mounted along a common platform;
    wherein the common platform is portably mounted onto a boom on the autonomous agricultural spray vehicle;
    each of the multiple image sensors having a non-transitory computer-readable circuit and memory encoded with rule-based instructions and artificial-intelligent instructions;
    wherein each of the multiple image sensors is programmed to record images periodically at a rate proportional to a speed of the automated agricultural spray vehicle;
    wherein recorded images are divided into a grid map, wherein each grid member depicts a representative particular field area;
    wherein the modularized plug and play unit further includes a trigger system based on at least a color signal intensity surpassing a pre-determined threshold, projects an artificial-intelligent output chemical pattern; and wherein at least one of the multiple image sensors is in electrical communication with a corresponding spray nozzle attached to the boom, and wherein the spray nozzle releases the chemical pattern responsive to a decision of the trigger system.

2. The automated agricultural spray vehicle of claim 1, wherein the spray nozzle releases a chemical mixture in the artificial-intelligent output chemical pattern using a trained U-Net neural network architecture.

3. An autonomous agricultural spray vehicle having an image sensor system comprising:
    a modularized plug and play unit that relocates between a crop management machine and an automated sprayer machine;
    the modularized plug and play unit including multiple image sensors mounted along a common platform;
    the common platform portably mounted lengthwise parallel to a spray boom on a motor vehicle of the automated sprayer machine;
    each of the multiple image sensors set to capture images periodically at a rate proportional to a speed of travel of the motor vehicle;
    each of the multiple image sensors having a non-transitory computer-readable circuit and memory encoded with instructions and capturable images;
    the capturable images divided into a grid map, and each grid member depicting a representative particular field area;
    the modularized plug and play unit further including a trigger system that responds based on at least a peak value or one grid member having a color signal intensity surpassing a pre-determined threshold; and
    wherein at least one of the multiple image sensors is in electrical communication with a corresponding spray nozzle attached to the spray boom, and wherein the spray nozzle releases a chemical responsive to a decision of the trigger system.

4. The image sensor system of claim 3, wherein the spray nozzle releases the chemical in a desired spray pattern based on a trained neural net having an U-Net architecture, and wherein the trained neural net maps representative field areas to the desired spray pattern.

5. The image sensor system of claim 3, wherein images from adjacent image sensors are stitched together, forming a redundant overlapping representation of a strip of a field area; and wherein a redundant member is checked for a false trigger based on an image from another one of the adjacent image sensors.

6. The image sensor system of claim 5, wherein the trigger system responds based on any one of the redundant members surpassing the pre-determined threshold, regardless whether any of the adjacent image sensors has a sensor failure.

7. The image sensor system of claim 3, wherein the instructions stop searching for a further weed candidate among grid members after one candidate surpasses the pre-determined threshold in a spray area covered by one spray release.

8. The image sensor system of claim 3, further comprising a first program that analyzes colored grid members that align within three sigma to calculate a position of a crop row on the grid map; and wherein the first program further analyzes a distance between colored grid members associated with the crop row and a grid member that is associated with a candidate weed.

9. The image sensor system of claim 3, wherein data collected from a previous pass of a seed planter machine through the field are stored in memory circuits of the modularized plug and play unit; and wherein the trigger system is programmed to make a subsequent decision in a later pass through the field by the automated sprayer machine.

10. The image sensor system of claim 9, further comprising a second program that looks up stored data about a location of a planted seed on the grid map and associates a stored location datum with an associated seed grid member; and wherein the trigger system is further based on the at least one grid member surpassing a pre-determined distance from the associated seed grid member.

11. The image sensor system of claim 3, wherein the representative particular field area is located ahead of the spray boom in a direction of travel of the motor vehicle; and wherein each of the multiple image sensors also includes a rearward looking sensor that captures a rearward image, away from the direction of travel.

12. The image sensor system of claim 11, further comprising a third program that analyzes a captured rearward image using a color difference and a reflectance difference to distinguish between spray released from a spray nozzle and a drift of the released spray, wherein the color difference is based on an a priori color calibration of a background field without spray and of a lighting condition.

13. The image sensor system of claim 11, further comprising a fourth program that analyzes the captured rearward image using a color difference to detect spread patterns of dry fertilizer released from a spray nozzle, wherein the color difference is based on differences in color among grid members in the rearward image; and wherein the spray nozzle is mounted on the spray boom.

14. The image sensor system of claim 11, further comprising a fifth program that analyzes the captured rearward image to detect a spray pattern skipping or patchiness among grid members representing a ground region behind the motor vehicle, based on a reflectance difference among the grid members.

15. The image sensor system of claim 3, wherein the multiple image sensors include two adjacent image sensors spaced apart on the common platform by a crop row spacing; and the trigger system includes a fifth program that estimates a depth distance to form a 3-D map in a forward direction using images from the two adjacent image sensors.

16. The image sensor system of claim 15, wherein the trigger system analyzes the 3-D map to instruct the spray boom to adjust its position in response to terrain changes in an upcoming crop surface.

17. An autonomous agricultural spray vehicle having an image sensor system comprising:
    a modularized plug and play unit relocating the modularized plug and play unit from a crop management machine to the autonomous agricultural spray vehicle;
    wherein the modularized plug and play unit includes multiple image sensors mounted at a regular interval along a common platform;
    wherein the common platform is portably mounted lengthwise parallel onto a boom on the autonomous agricultural spray vehicle;
    each of the multiple image sensors having a non-transitory computer-readable circuit and memory encoded with instructions and data;

wherein each of the multiple image sensors is programmed to record images periodically at a rate proportional to a speed of the autonomous agricultural spray vehicle;

wherein recorded images are divided into a grid map, wherein each grid member depicts a representative particular ground area ahead of the autonomous agricultural spray vehicle;

wherein the modularized plug and play unit further includes a trigger system based on at least a peak color signal intensity surpassing a pre-determined threshold; and wherein at least one of the multiple image sensors is in electrical communication with a corresponding spray nozzle attached to the boom, and wherein the spray nozzle releases a chemical responsive to a decision of the trigger system.

18. The autonomous agricultural spray vehicle of claim 17, wherein the representative particular ground area is located ahead of the boom in a direction of travel of the autonomous agricultural spray vehicle; and wherein each of the multiple image sensors also includes a rearward looking sensor that records a rearward image, away from the direction of travel; and the instructions include analyzing the recorded rearward image to detect a spray pattern skipping from a discontinuity among grid members representing a ground region behind the autonomous agricultural spray vehicle, based on a value of reflectance difference among grid members.

19. The autonomous agricultural spray vehicle of claim 17, wherein each of the multiple image sensors is in wireless communication with a central computer; and wherein each of the multiple image sensors downloads a new agricultural algorithm relevant; and wherein each of the multiple image sensors periodically uploads the recorded images.

20. The autonomous agricultural spray vehicle of claim 17, wherein at least one of the multiple image sensors includes a lens filter that sharpens a contrast between a desired color and other colors; wherein a targeted object has the desired color.

* * * * *